US011863403B2

(12) United States Patent
Cioffi et al.

(10) Patent No.: US 11,863,403 B2
(45) Date of Patent: Jan. 2, 2024

(54) SYSTEMS AND METHODS FOR REMOTE COLLABORATION

(71) Applicant: ASSIA SPE, LLC, Wilmington, DE (US)

(72) Inventors: John M. Cioffi, Atherton, CA (US); Chan-Soo Hwang, Seoul (KR); Peter Joshua Silverman, Evanston, IL (US); Tuncay Cil, San Francisco, CA (US); Philip Bednarz, Palo Alto, CA (US); Peter Chow, Los Altos, CA (US); Carlos Garcia Hernandez, Campbell, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 0 days.

(21) Appl. No.: 17/879,786

(22) Filed: Aug. 3, 2022

(65) Prior Publication Data
US 2022/0400065 A1 Dec. 15, 2022

Related U.S. Application Data

(63) Continuation of application No. 17/223,790, filed on Apr. 6, 2021, now Pat. No. 11,411,840.
(Continued)

(51) Int. Cl.
*H04L 41/5009* (2022.01)
*H04L 41/5006* (2022.01)
(Continued)

(52) U.S. Cl.
CPC ...... *H04L 41/5016* (2013.01); *H04L 41/5006* (2013.01); *H04L 41/5019* (2013.01); *H04L 43/55* (2022.05)

(58) Field of Classification Search
CPC . H04L 41/5016; H04L 43/55; H04L 41/5006; H04L 41/5019
(Continued)

(56) References Cited

U.S. PATENT DOCUMENTS 6,463,295 B1 * 10/2002 Yun ................ H04W 52/50
455/562.1
10,251,178 B2 * 4/2019 Franklin ........ H04N 21/64723
(Continued)

FOREIGN PATENT DOCUMENTS

WO 2010100315 A1 9/2010
WO 2019101193 A1 5/2019

OTHER PUBLICATIONS

International Preliminary Report on Patentability dated Oct. 6, 2022, in related PCT application No. PCT/US2021/026045, (8 pgs).
(Continued)

*Primary Examiner* — Melvin H Pollack
(74) *Attorney, Agent, or Firm* — North Weber & Baugh LLP; Michael North

(57) ABSTRACT

Described herein are systems and methods for work from home solutions according to various embodiments of the invention. These solutions accurately diagnose connectivity issue locations and severity from any, some, or all points in a network framework. Embodiments of these solutions may also use artificial intelligence and machine learning to process customer quality-of-experience (QoE) feedback and other relevant indicators. The solutions may improve network connectivity based on these measurements and processes.

19 Claims, 15 Drawing Sheets

Related U.S. Application Data

(60) Provisional application No. 63/076,209, filed on Sep. 9, 2020, provisional application No. 63/057,806, filed on Jul. 28, 2020, provisional application No. 63/026,112, filed on May 17, 2020, provisional application No. 63/006,628, filed on Apr. 7, 2020.

(51) Int. Cl.
*H04L 41/5019* (2022.01)
*H04L 43/55* (2022.01)

(58) Field of Classification Search
USPC .......................................................... 709/224
See application file for complete search history.

(56) References Cited

U.S. PATENT DOCUMENTS

| | | | |
|---|---|---|---|
| 10,339,456 B2* | 7/2019 | Hui | G06N 5/04 |
| 10,602,383 B1* | 3/2020 | Horton | H04L 41/0663 |
| 10,674,409 B2* | 6/2020 | Chitrapu | H04L 47/805 |
| 10,805,171 B1* | 10/2020 | Anwer | H04L 41/5019 |
| 10,862,771 B2* | 12/2020 | Tomkins | H04L 69/22 |
| 10,880,439 B2* | 12/2020 | Scivicque | H04L 45/302 |
| 11,018,958 B2* | 5/2021 | Tapia | H04L 43/065 |
| 11,049,005 B2* | 6/2021 | Gopalan | G06N 3/08 |
| 11,063,745 B1* | 7/2021 | Du | H04L 9/0825 |
| 11,146,640 B2* | 10/2021 | Rath | H04L 67/125 |
| 11,232,100 B2* | 1/2022 | Bhattacharjee | G06F 16/2272 |
| 11,290,854 B2* | 3/2022 | Natarajan | H04W 24/02 |
| 11,336,506 B1* | 5/2022 | Li | H04N 21/2402 |
| 11,350,150 B2* | 5/2022 | Jain | H04N 21/2662 |
| 11,363,345 B2* | 6/2022 | Wang | H04N 21/44227 |
| 11,373,108 B2* | 6/2022 | Fang | H04L 41/5009 |
| 11,405,318 B2* | 8/2022 | Wong | H04L 63/20 |
| 11,431,780 B2* | 8/2022 | Halepovic | H04L 65/61 |
| 11,461,334 B2* | 10/2022 | Bhattacharjee | H04L 67/1097 |
| 11,483,220 B2* | 10/2022 | Ikegami | H04L 67/02 |
| 11,671,341 B2* | 6/2023 | Jain | H04L 43/062 709/224 |
| 11,678,252 B2* | 6/2023 | Dao | H04M 15/66 370/329 |
| 11,695,818 B2* | 7/2023 | Kleinrouweler | H04L 47/225 709/224 |
| 11,706,110 B2* | 7/2023 | Patil | H04L 43/065 709/224 |
| 2003/0191795 A1* | 10/2003 | Bernardin | G06F 9/505 709/201 |
| 2004/0078733 A1* | 4/2004 | Lewis | H04L 41/5067 714/57 |
| 2014/0229210 A1 | 8/2014 | Sharifian et al. | |
| 2019/0222491 A1 | 7/2019 | Tomkins et al. | |
| 2020/0296011 A1* | 9/2020 | Jain | H04L 41/40 |
| 2020/0336373 A1* | 10/2020 | De Buitleir | H04L 41/0823 |
| 2020/0351173 A1* | 11/2020 | Vasseur | H04L 41/0681 |
| 2020/0366948 A1* | 11/2020 | Ye | H04L 43/08 |
| 2020/0382387 A1* | 12/2020 | Pasupathy | H04L 43/091 |
| 2021/0014141 A1* | 1/2021 | Patil | H04W 24/02 |
| 2021/0021906 A1* | 1/2021 | Boliek | H04N 21/25875 |
| 2021/0029559 A1* | 1/2021 | Agarwal | H04L 41/14 |
| 2021/0044496 A1* | 2/2021 | Snyder | G06N 20/00 |
| 2021/0064436 A1* | 3/2021 | Calmon | G06F 9/5016 |
| 2021/0092026 A1* | 3/2021 | Di Pietro | H04L 61/5014 |
| 2021/0092036 A1* | 3/2021 | Jain | H04L 43/062 |
| 2021/0174189 A1* | 6/2021 | Guven Kaya | G06N 3/08 |
| 2021/0192413 A1* | 6/2021 | Shirazipour | G06T 19/006 |
| 2021/0204011 A1* | 7/2021 | Jain | H04L 65/80 |
| 2021/0243728 A1* | 8/2021 | Lee | H04L 5/0044 |
| 2021/0263779 A1* | 8/2021 | Haghighat | G06F 9/5061 |
| 2021/0264456 A1* | 8/2021 | Kiani | H04L 41/30 |
| 2021/0281491 A1* | 9/2021 | Yelahanka Raghuprasad | G06N 3/0454 |
| 2021/0287115 A1* | 9/2021 | Woods | H04L 41/147 |
| 2021/0303632 A1* | 9/2021 | Parthasarathy | G06F 11/3006 |
| 2021/0352516 A1* | 11/2021 | Sawabe | H04L 67/61 |
| 2021/0365811 A1* | 11/2021 | Xu | G06N 5/022 |
| 2022/0116814 A1* | 4/2022 | Di Girolamo | H04W 4/027 |
| 2022/0191831 A1* | 6/2022 | Park | H04L 1/1812 |
| 2022/0197773 A1* | 6/2022 | Butler | H04N 21/234 |
| 2022/0210028 A1* | 6/2022 | Chen | H04L 41/0896 |
| 2022/0232398 A1* | 7/2022 | Yoshimura | H04W 24/02 |
| 2022/0264622 A1* | 8/2022 | Lee | H04W 72/1231 |
| 2022/0271999 A1* | 8/2022 | Jeong | H04L 41/16 |
| 2022/0303332 A1* | 9/2022 | Szász | H04L 65/80 |
| 2023/0232272 A1* | 7/2023 | Puente Pestaña | H04L 41/5067 370/252 |

OTHER PUBLICATIONS

Australian office action dated May 26, 2023 in related Australian patent application No. 2021252927, (4 pgs).

Tsaregorodtseva, D: "Using Machine Learning to Predict Quality of Experience of Video in LTE Networks", Master Thesis, Apr. 12, 2019 (Apr. 12, 2019), The University of Dublin, Trinity College Dublin, School of Computer Science and Statistics, XP055866218, available from the Internet: <https://www.scss.tcd.ie/publications/theses/diss/2019/TCD-SCSS-DISSERTATION-2019-014.pdf>, (67 pgs).

Chinese Office Action dated Sep. 7, 2023 in related Chinese patent application No. 202180027644.8, (10 pgs).

* cited by examiner

| Name | Type | Media Ports (Layer 4) | Default DSCP/WMM (Layer 3) |
|---|---|---|---|
| Zoom | Tele conference | TCP 8801-8802 UDP 8801-8810, 3478, 3479 | 56 for audio, 40 for video & signalling |
| GoToMeeting | Tele conference | UDP 8200, 1853 | Video (Cos=5) for both audio and video |
| WebEx | Tele conference | TCP 8554 UDP 7500, 7501, 9000 | 34 for audio, 46 for video |
| G Suite | Telework | TCP/UDP 19305-19309 | 20 for all |
| Office 365 | Telework | TCP: 50000-59999, UDP: 50000-59999, 3478 | 46 for audio, 34 for video |
| Box | Cloud drive | TCP 443 | 0 |
| Open VPN | VPN | UDP 1194 | Configurable |

FIG. 7

| Device | User confirmed WFH device | $P_A$: Prob. Device is used for WFH | $P_B$: Prob. Device Application used | $P_A \cdot P_B$ | Is WFH Device |
|---|---|---|---|---|---|
| Laptop 1 | TRUE | 0.5 | 0.15 | 0.075 | TRUE |
| Laptop 2 | Unknown | 0.5 | 0.1 | 0.05 | FALSE |
| Desktop 1 | Unknown | 0.25 | NA (default 0.2) | 0.05 | FALSE |
| Printer | FALSE | 0.1 | 0.1 | 0.01 | FALSE |
| TV | Unknown | 0.1 | 0.9 | 0.09 | TRUE |
| Xbox | Unknown | 0.01 | 0.1 | 0.001 | FALSE |
| ... | | | | | |

*FIG. 9*

|          | Zoom   | GoTo Meeting | Box    | Netflix | Bit-Torrent | Web    |
|----------|--------|--------------|--------|---------|-------------|--------|
| Laptop 1 | High   | High         | High   | Low     | Low         | Medium |
| Laptop 2 | Medium | Medium       | Medium | Lowest  | Lowest      | Low    |
| Desktop 1| Medium | Medium       | Medium | Lowest  | Lowest      | Low    |
| Printer  | Medium | Medium       | Medium | Lowest  | Lowest      | Low    |
| TV       | High   | High         | High   | Low     | Low         | Medium |
| Xbox     | Medium | Medium       | Medium | Lowest  | Lowest      | Low    |
| ...      |        |              |        |         |             |        |

*FIG. 10*

SYSTEMS AND METHODS FOR REMOTE COLLABORATION

CROSS-REFERENCE TO RELATED APPLICATIONS

This patent application is a continuation of the U.S. nonprovisional patent application Ser. No. 17/223,790, filed on Apr. 6, 2021, entitled "SYSTEMS AND METHODS FOR REMOTE COLLABORATION," and listing John M. Cioffi, Chan-Soo Hwang, Peter Joshua Silverman, Tuncay Cil, Philip Bednarz, Peter Chow, Carlos Garcia Hernandez, which claims priority benefit under 35 USC § 119(e) to the following commonly-owned U.S. provisional patent applications: U.S. Pat. App. Ser. No. 63/006,628, filed on Apr. 7, 2020, entitled "USER PREFERENCE BASED HOME NETWORK OPTIMIZATION," and listing Chan-Soo Hwang, John M. Cioffi, Peter Joshua Silverman, Tuncay Cil, Philip Bednarz, Peter Chow as inventors; commonly-owned U.S. Pat. App. Ser. No. 63/026,112, filed on May 17, 2020, entitled "SYSTEMS AND METHODS FOR TELEWORK," and listing Chan-Soo Hwang, John M. Cioffi, Peter Joshua Silverman, Tuncay Cil, Philip Bednarz, Peter Chow as inventors; commonly-owned U.S. Pat. App. Ser. No. 63/057,806, filed on Jul. 28, 2020, entitled "SYSTEMS AND METHODS FOR TELEWORK," and listing Chan-Soo Hwang, John M. Cioffi, Peter Joshua Silverman, Tuncay Cil, Philip Bednarz, Peter Chow, Carlos Garcia Hernandez; and U.S. Pat. App. Ser. No. 63/076,209, filed on Sep. 9, 2020, entitled "SYSTEMS AND METHODS FOR REMOTE COLLABORATION," and listing John M. Cioffi, Chan-Soo Hwang, Peter Joshua Silverman, Tuncay Cil, Philip Bednarz, Peter Chow, Carlos Garcia Hernandez as inventors. Each reference mentioned in this patent document is herein incorporated by reference in its entirety.

BACKGROUND

The recent global pandemic has caused a large number of companies, educational institutions, and government agencies to transition employees and students to work and learn remotely from home. What was a proportionately small pre-pandemic telecommuting workforce has burgeoned rapidly into a much larger remote workforce resulting in a strain upon public network resources being used to support work-from-home ("WFH") activities. This strain on network resources has been amplified by the large number of students engaged in remote learning from home. While the stress on networks has been problematic, the productivity levels from remote work and school activities have surprised many experts, and many companies have publicly announced future support for WFH opportunities within their business models. This trend will likely continue as those employees and their companies continue to find new and more efficient ways to collaborate and work remotely.

This transition to a work-from-home model has also resulted in new issues facing companies in their employees' and business' management. A company's reliance on residential and public network connectivity for its WFH employees has increased dramatically. Employees, students and other users depend on Internet connectivity to interact with colleagues, customers, and others across a variety of applications using a diverse set of networks and Internet Service Providers (ISPs). User productivity can fall sharply if, for instance, video-conferencing applications fail during an online meeting, bandwidth issues arise during the storage or retrieval of large files, or other network issues occur that result in a failure or under-performance of application software operating on a home computer terminal. WFH's long-term effectiveness will depend on a company's ability to ensure network resources are efficiently allocated across its at-home employee base. These same issues apply to educational institutions that employ remote learning, and in various other applications where there is a need for a user on a home network to communicate with others on home networks.

FIG. 1 plots Internet traffic growth 100 in terms of uplink traffic volume during March 2020, when many companies started implementing their WFH policies. This significant 80% increase 110 in uplink traffic volume is a direct result from the increased number of employees and students working from home while sheltered in place during the 2020 COVID-19 pandemic. This increase in uplink traffic caused performance issues across many applications operating on home computer systems. Some frequently observed consequences of an uplink data transmission limitation include poor audio-conference voice quality, sticky video, or connection loss resulting in a need to re-establish connection and repeat the interrupted activity. These issues were not only present on typical home Internet connections, where internet access is provided by DSL, fixed wireless, or cable modem, but also occurred over very high-speed fiber-to-the-home (FTTH) connections during March 2020.

These network connectivity limitations and disruptions will lead to user frustration and negatively impact an employee's productivity and a student's ability to learn. Collaboration is fundamental to both work success and educational achievement and when participants are unable to collaborate efficiently, then work and educations success diminishes. Downlink connection issues can also affect productivity in similar ways when the downlink data rate peak needs exceed any collaborator's connection's capability to support the necessary data transfer reliably.

The throughput bottleneck's source may occur in any link within the end-to-end transmission path. For example, this source may be on the in-home Wi-Fi system uplink, where various devices may compete for limited overall uplink Wi-Fi bandwidth. It may also occur on the fixed line backhaul link itself, or it could be at the edge, in the core, or at the peering network link(s). In some cases, the application server itself may not have sufficient processing power, memory, or other resources. Compared to a more traditional model where a company has full access to its networks, servers, and computers to operate its services and applications, the WFH model implements network connections and devices that are oftentimes controlled by a third-party service provider. This may have implications beyond network connectivity issues; for instance, the transition to a WFH model has also reduced a company's ability to use the network to manage and monitor employee activity and effectiveness as the network being used by its employees is no longer in direct control of the company.

In summary, companies, educational institutions and other entities which rely upon remote collaboration require improved visibility, control, and management functionality across the diverse set of network connections and at-home applications now deployed in a remote collaboration model to ensure their employees, students and other users meet or exceed acceptable productivity levels.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

FIG. 7 illustrates flow identification possibilities within a home gateway according to embodiments of the invention.

FIG. 9 shows a computer process that identifies a WFH devices based on user preference and QoS operational data according to embodiments of the present disclosure.

FIG. 10 is a chart that shows a correlation between a plurality of devices, a plurality of applications, and a priority ranking or value according to various embodiments of the invention.

DETAILED DESCRIPTION OF EMBODIMENTS

Figure 1:
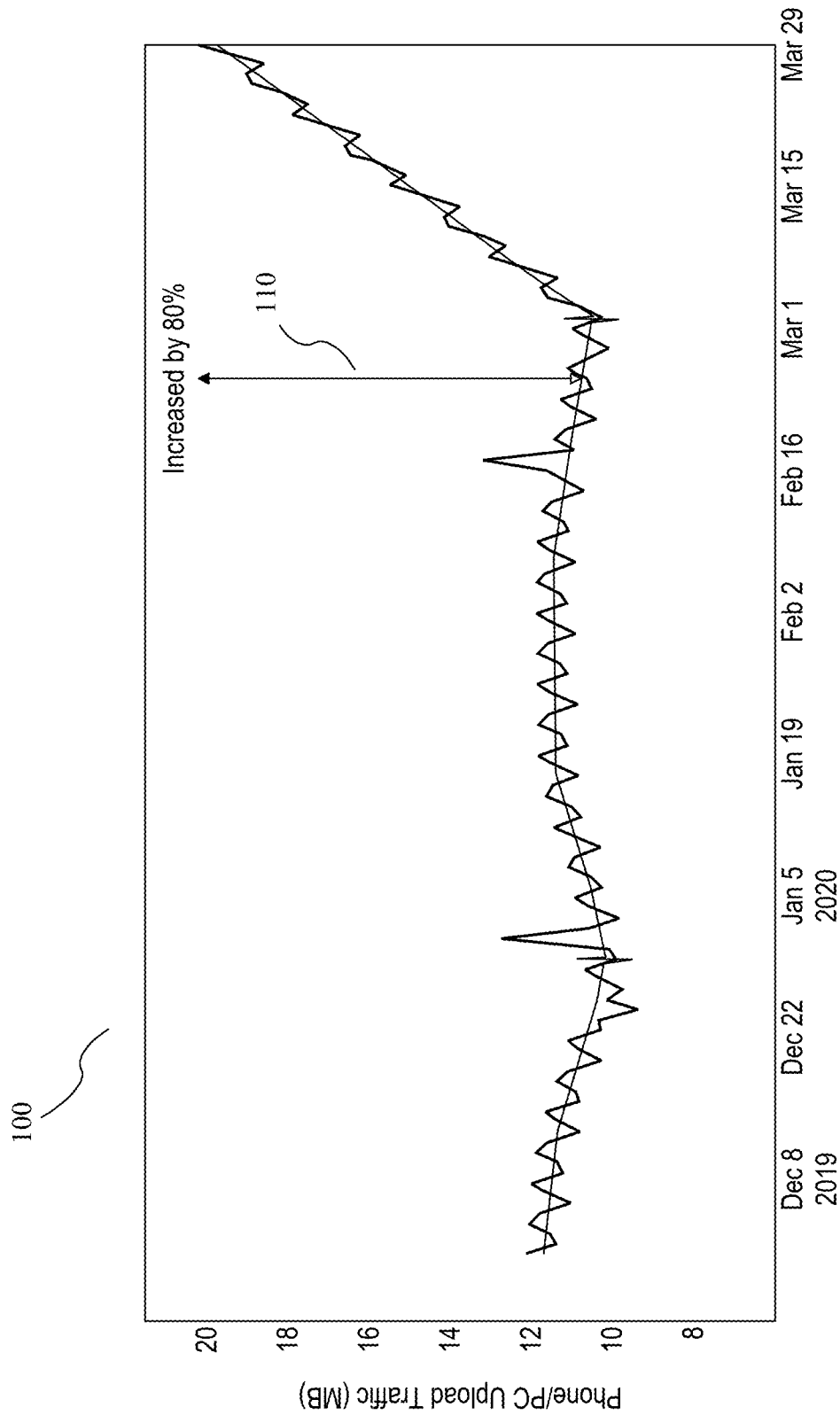
FIG. 1 is a graph illustrating the overall Internet traffic growth in terms of uplink traffic volume over the month of March 2020 as WFH became more prevalent.

In the following description, for purposes of explanation, specific details are set forth to understand the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, logical connections, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and they may be used interchangeably.

It shall be noted that: (1) certain steps may optionally be performed; (2) steps may not be limited to the specific order set forth herein; (3) certain steps may be performed in different orders; and (4) certain steps may be done concurrently.

It shall also be noted that although certain embodiments described herein may be within the context of wireless communication networks, wireline communication networks, and combination thereof, aspects of the present disclosure are not so limited. Accordingly, the aspects of the present disclosure may be applied or adapted for use in wireless communication networks and other contexts.

In this document, "MIMO" refers to Multiple Input Multiple Output systems, which utilize several antennas per user. Orthogonal Frequency Division Multiplexing (OFDM) refers to a system that uses equal energy on all of a set of adjacent frequency dimensions that often appears in wireless communication standards like Wi-Fi and LTE. A group of channels may be referred to as "band" and may be labeled with the same or similar indices.

The following terms may be used within the specification and are defined as follows:

WFH: WFH (Work-From-Home) occurs when one or more users remotely performs work-related tasks using a network connection, where "remotely" means that the one or more users may be located within a residence or yard, library, coffee shop, hotel, park or any other location outside of a physical building where the work related tasks would traditionally take place (such as an office, school, hospital, medical office, etc.). Examples of WFH situations or activities include video-conferencing, document management, audio conference calls, interactive document or project sharing among collaborators, or other instances where an user is engaged in work-related activity using one or more network connections from the remote location.

Application Specific Connectivity (ASC) and Application Specific Connectivity Metric (ASC Metric): Application specific connectivity (ASC) is a defined metric that measures a connection's specific influence on productivity level of a specific application; e.g., WFH. In general, the ASC metric is an aggregated, overall metric derived from a family or class of metrics related to a specific application's productivity influence and defined as functions of various parameters that may include link or transmission channel operational/performance data (X), user feedback data (F), user preference data (P), time-stamping information/data (T) or other parameters relevant to a connection's specific influence on productivity. Specific applications include, but are not limited to, WFH, telemedicine, remote-learning and instruction, remote (including multi-player) gaming, delivery of entertainment, and meetings of religious institutions, social clubs, or family gatherings.

Productivity and Productivity Metric: Productivity measures the value of one or more activities performed by the user(s) of a specific application (e.g., WFH), considering the nature and value of those activities. Productivity may vary across different users based on, for instance, the type of activities, context of the performed activities, quality and volume of the activities, financial return of the activities, etc. In certain situations, the stakeholder may determine what is the appropriate Productivity metric.

Stakeholder: The stakeholder is a business, educational institution, service provider, parent, employee manager, or other entity/individual who may oversee/monitor the application-specific (e.g., WFH) activities. In certain instances, a networked-device's user within the application-specific activities may also be a stakeholder, while in other instances the stakeholder may not be directly engaged within the application-specific activities.

User Feedback: User feedback comprises information about the performance and/or usability of users' activities (e.g., video-conferencing). User feedback may be directly provided by the user or may be indirectly determined based on user action or other information related to the application specific activities. Examples of indirect user feedback for WFH video-conferencing activities include measures of churn (e.g., either switching the user's ISP or switching the video-conferencing software provider), refusals to use a particular video-conferencing software, counts and characterization of the nature of calls and/or emails to help desks, excessive repeats of collaborative sessions, etc. In certain instances, user feedback may be a component in determining Quality of Experience (QoE).

Quality of Experience (QoE): QoE measures user satisfaction during an application-specific activity. This measurement may indicate the usability or performance of specific software tools(s) and/or applications, user-perceived network performance, the performance of other participants' software or network tools and/or applications, or other metrics related to user satisfaction during an application specific activity.

Quality of Service (QoS): QoS is data that is monitored, measured, retrieved, or otherwise obtained that quantify the performance of a network or software tool during application-specific activities. The network may comprise multiple connections that are controlled by different third-parties or by a single entity. QoS data may include packet loss count, signal levels, noise levels, outages, margin levels, data rates, throughputs, latency (delay), and all other forms of both current and historical operational and performance data. QoS performance data relate to the performance of a communications link (e.g., throughput, jitter, packet loss, etc.), while QoS operational data relate to the operation of the communications link (e.g., queue length, target data rate, port usage, etc.). Both operational data and performance data can affect QoS.

Estimation: Estimation determines a function of input data that produces outputs based on those inputs. The estimating function or estimator may be parametrized, and estimation often includes learning or otherwise computing and/or inferring the parameter values from QoE data or from other knowledge about the function's desired behavior. For example, an estimator may learn from a set of QoS data, plus user feedback information, and labelled QoE from earlier or training uses, and generate a function that will predict the current QoE measure. This estimated QoE parameters are often learned by correlating a user's QoE training or other data indicative of QoE within application-specific activities to the network performance measured by QoS data. This estimated data may be used to train a second machine-learning model that attempts to optimize or improve the values of the parameters and their consequent function output's predicted QoE by adapting various user profile parameters.

Prediction: Prediction is the application of a trained or otherwise derived model to input data to generate outputs based on the inputs. A trained model can predict QoE, ASC or other productivity-related metrics for specific applications based on a variety of different inputs. For example, a machine-learning model may be trained using correlated QoE, productivity metrics such as diminished work throughput, or other information related to the desired output of the model.

Because WFH provides the most likely commercial application of the inventions described herein, many embodiments are described with reference to a WFH application; however, this should not be read to suggest that the sole application for the present inventions is WFH. Indeed, many applications of the present inventions may not involve employment or work; for instance, other, non-work applications include tele-medicine, remote learning/teaching, interactive gaming, virtual gatherings of families, religious institutions, or social clubs, remote security applications, distribution of streaming entertainment media, etc. Moreover, the present invention provides a mechanism for various applications (WFH and remote learning, for instance) to be improved when running simultaneously on the same remote network.

The disclosed architecture may provide, for instance, a business the ability to track its employees' productivity, improve employees' home network connectivity, and collect and manage business-related information across a diverse and large WFH network comprising a diverse set of network connections provided by a variety of ISPs. It could, alternatively, be used to provide a university the ability to track its students' productivity, improve students' home network connectivity, and collect and manage learning-related information across a diverse and large remote learning network comprising a diverse set of network connections provided by a variety of ISPs. Other applications of the disclosed architecture will be readily understood by those of skill in the art, notwithstanding the description herein as being related to, for instance, a WFH application.

As is understood, households with multiple household members can present a particular challenge to working from home. For example, a home worker may find the quality of a video conferencing call is impacted upon by another household member playing a video game in another room. In such circumstances, it may be desirable to prioritize the connection of the home worker. The solutions as herein described can also address this problem.

In addition, with more companies' employees working from home, much of the usual network traffic has moved from closed company networks, which in-house company IT Departments can easily monitor and control, to traffic across multiple public and private networks, which are traditionally not monitored or controlled in the same way by those IT Departments. For example, the intra-company network traffic of a given company will be dispersed across multiple ISPs when the workforce is WFH, and the company IT Department does not generally have access to the relevant ISP's data for analysis. Thus, it is desirable to be able to provide the same monitoring and control to companies in these circumstances. The solutions described herein also aim to provide virtual company networks which can fulfill this role.

Previously, many home internet connections and home networks were used primarily for entertainment (e.g. streaming audio and video, social media, video gaming, etc.). However, with many more people now working from home, network usage has changed considerably. For example, entertainment-based network use is generally asymmetric, with a higher amount of download data than upload data. In contrast, working from home tends to be more symmetric in terms of uploaded and downloaded data (e.g. video-conferencing is fairly symmetric). Similarly, the daily cycle of connectivity from home has changed. Previously, many home networks were used most heavily in the evenings and on weekends. In contrast, working from home means that bandwidth requirements during weekday daytime have increased significantly. The solutions described herein therefore aim to monitor and improve network usage in view of these changes Diagnostics provided by the disclosed architecture will accurately find a problem location and severity and will determine the problems' likelihood to recur at certain times and/or under certain operating conditions. Data from ISPs can improve remote collaboration solutions with information regarding overall access network performance (e.g., copper, fiber, wireless, etc.). This overall network performance data will assist remote collaboration solutions to consider location, severity, time of occurrence, and other parameters. This combined data's net effect is better end-user experience and satisfaction; and in the case of working from home, will translate directly to improved remote worker productivity and efficiency, which can be accurately and concisely captured by a variety of performance and productivity metrics.

Figure 2A:
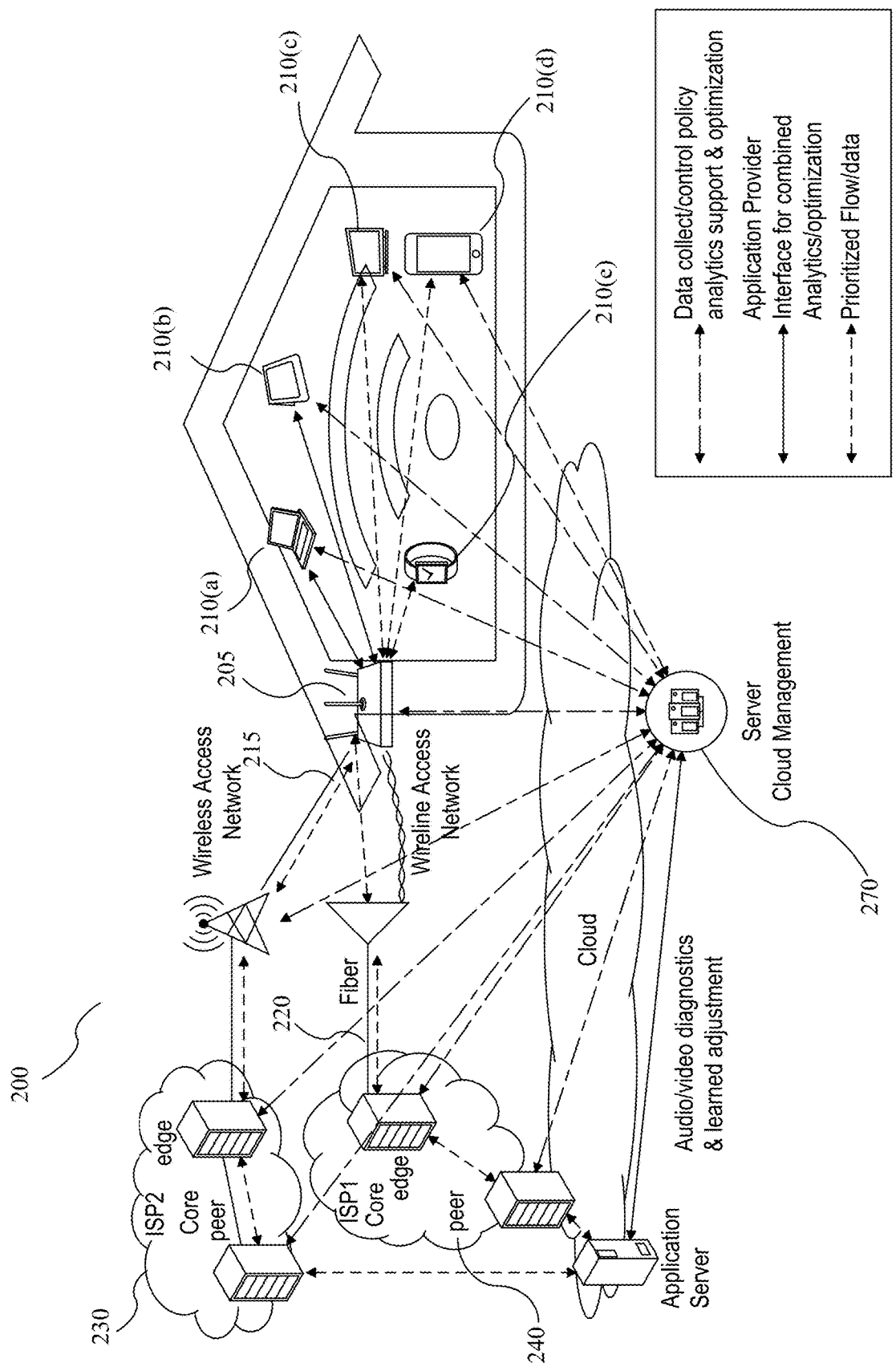
FIG. 2A shows an example overall framework for WFH solutions according to various embodiments of the invention.

FIG. 2A shows an example overall framework 200 for WFH solutions according to various embodiments of the invention. These solutions accurately diagnose connectivity issue locations and severity from any, some, or all points in this framework 200. The solutions may use artificial intelligence and machine learning to process customer quality-of-experience (QoE) feedback and other relevant indicators. As shown in this framework 200, a WFH user may connect to a network access point 205 using a variety of different types of device 210. These devices 210 may interface with the network access point 205 using a wireless connection or a wireline connection, each having potentially different connectivity issues. The connectivity between devices 210 and access point 205 may be a point-to-point network, a mesh network, star topologies and other network architectures known of skill in the art.

The network access point 205 may connect to a backhaul using a wireless connection 215 and/or wireline connection 220 depending on the particular access point. In one instance, a first ISP 240 may provide network connectivity for some of the various devices via the wireline access network 220. In other instances, a second ISP 230 may provide different network connectivity for some of the various devices via a wireless access network 215. The diversity of network connections and potential connectivity issues is clear to one of skill in the art and results in a significant increase in network management complexity relative to private networks controlled by a single business or education entity. As different households across multiple cities participate in a company's WFH model and interact with each other across these diverse networks, the complexity in managing and monitoring the network performance further increases.

Embodiments of the invention provide a system-level, cloud-based management system that interacts with various connections within this diverse network. The management system may comprise a server 270. The server 270 is defined as one or more servers or computing device coupled to one or more interfaces within the remote collaboration architecture. The server 270 may be coupled within a cloud, a private or public network, or directly to a device within the remote collaboration architecture. This server 270 is able to measure network metrics, analyze, and improve connectivity through this system. Furthermore, the server 270 can monitor remote worker productivity and business-related activities to better understand how employees are operating within the WFH environment. In so doing, the server 270 is able to take multiple network measurements, improve performance by adjusting parameters, interact with one or more software agents located on devices within the WFH architecture, and monitor network traffic across the diverse set of WFH users and connections that enable work collaboration. Aspects of this server 270 are described below and allow a company, education institution, or other collaboration sponsor visibility in the WFH network, provide the ability to improve network performance and productivity for employees, students, and other collaborators, and manage business throughput and educational achievement accordingly.

Dynamic Analytics, WFH Diagnosis, and the Application Specific Connectivity (ASC) Metric Internet connection variability occurs in many ways. For example, wireless connections can experience variability through communicating devices' movements, as well as movements of nearby non-communicating people and objects. Such movements cause changes in the physical radio path characteristics that affect transmission quality. Wireless and wireline connections can also experience variability through electromagnetic interference generally, and particularly from other nearby communicating systems that share the same spatial, time, and/or spectral domains. Variability is also evident indirectly through the transmitted data types. For instance, high quality video signals require the transmission to have better performance than a short email download. Different users may also perceive the same connection quality differently based on their own perspectives, and this induces a form of variability as well. Various embodiments of the invention learn and/or estimate the different variabilities through collected connection quality and/or operational data. Connection quality, throughput, or stability is a function of many or all the parameters specific to a connection of which can be derived an application specific connectivity (ASC) metric.

Application specific connectivity (ASC) is a defined metric that measures a connection's specific influence on an user application or class of applications, and in the case of WFH, the application specific connectivity metric measures a connection's influence on the WFH productivity level, particularly in but not limited to the context of online collaboration with co-workers, customers, and/or partners. In general, the ASC metric is an aggregated, overall metric derived from a family or class of WFH metrics defined as functions of various parameters that may include link operational/performance data (X), user feedback data (F), user preference data (P), time-stamping information/data (T), etc. This definition of ASC metric for WFH is intentionally defined to be broad such that it captures a wide array of metrics that relate to a variety of different combined network connectivity measurements that affect a remote worker's ability to operate within the WFH environment.

Those of skill in the art will realize that the use of an ASC metric is an appropriate measure of usefulness, that is productivity, for an application supporting a variety of on-line collaborative endeavors, regardless of whether it specifically supports employment and work or is for other purposes. Similarly, those of skill in the art will realize that techniques for improvements in WFH performance or productivity would also apply to many other collaborative activities, not all of which involve employment or work. Examples of such collaborations include but are not limited to tele-medicine, remote learning/teaching, interactive (multi-player) gaming, virtual gatherings of families, religious institutions, or social clubs, remote security applications, distribution of streaming entertainment media, etc.

In certain embodiments, the ASC metric measures and determines an application-specific economic value to any, or all, of internet service providers, application providers, and most importantly, employers and their employees (or any other stakeholders). A user's quality-of-experience (QoE) and ASC metric can also depend on all the above-mentioned variables and variabilities in different ways at different times and with different devices. The sections below describe these variabilities, and how dynamic, analytic WFH solutions address them. Various embodiments of the invention expand to consider WFH improvement solutions that exploit the learned analytics for automatic, proactive and reactive connection repair and improvements, as well as instruction-based manual repair when necessary, in the context of the ASC metric and remote worker productivity associated therewith.

System Overview and Description

Figure 2B:
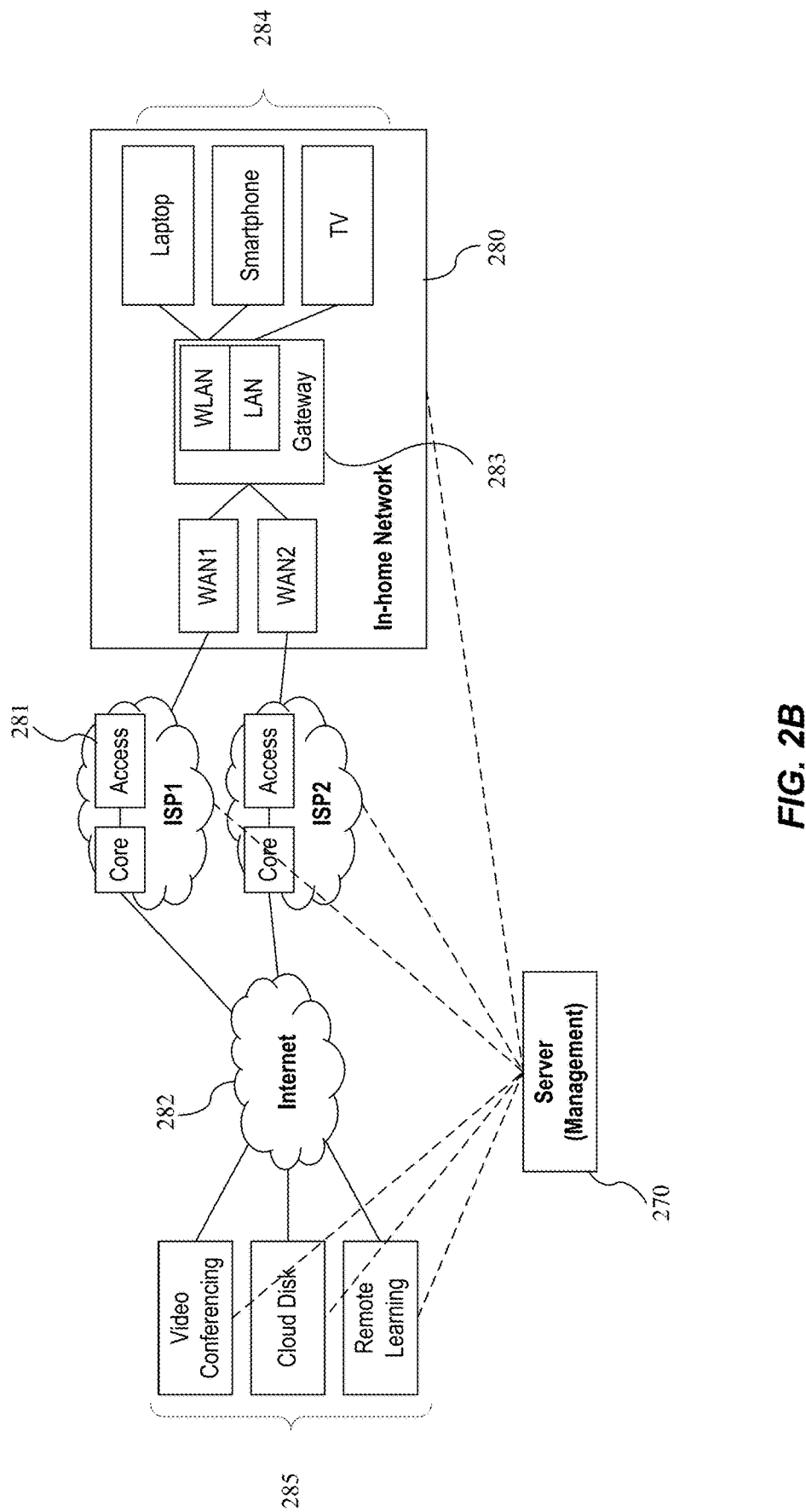
FIG. 2B shows the WFH system architecture according to various embodiments of the invention.

FIG. 2B shows a WFH system architecture according to various embodiments of the invention. In this example, the WFH system consists of three component networks: the in-home network 280 (e.g., local area networks or LAN and/or wireless local area network or WLAN), the ISPs' access networks 281 (e.g., wide area networks or WANs), and the Internet 282 to which application servers connect through peering points. The ISP thus connects the LAN to the application servers through one or more WAN backhauls. The server 270 collects quality of service (QoS) operational/performance, user QoE feedback, and user preference data at any or all of the three networks. The server 270 determines a preferred policy (sometimes referred to as a profile as well) and/or policies to provide to at least one (or more) network component and/or devices. This preferred policy and associated improvement will impact the currently active WFH service application's QoE or ASC metric.

The in-home network's gateway 283 connects LAN devices 284. These LAN devices 284 thereby connect through the Internet 282 to application servers via the ISPs' WAN backhaul(s) and the core ISP network. A gateway 283 can prioritize applications/devices through priority queues that allow fail-over service by switching to an alternative ISP (e.g., switching from wireline to cellular) when the primary ISP's connection has insufficient positive ASC metric effect. The server 270 may interface to a gateway-located agent, described in detail below, to collect QoS operational/performance data and correspondingly to re-profile (i.e., improve) based on the WFH policy. The agent may collect data from all in-home devices, but it also can collect data from WLAN interfaces at routing points, from Ethernet routers/switches, from the WAN, and from other supportive network points.

The server 270 may also use an agent to a user interface (UI) to collect the user's preferred service category and/or to collect user QoE feedback. The server 270 may collect device information directly over an Internet connection to devices or indirectly gather such information from the gateway agent, or possibly also from the application server(s). Each LAN device 284 may be categorized according to its preferred service category (or categories), particularly including WFH devices 284. The server 270 may detect and analyze the application use based on the collected QoS operational/performance data, if receiving direct user QoE feedback is difficult or infrequent. Other servers and computing devices may also collect QoS and/or QoE feedback within the architecture including, but not limited to, application servers running the application software 285, ISP equipment 281, and the devices themselves including software within the applications operating on the device or discrete performance software.

The collaboration architecture may improve (through policy or direct re-profiling) more than one access connection. These may be from the same or different ISPs. Each ISP's core network connects the access network to the Internet. It is possible to bond these access connections in the core network (at a common server point) so that they appear as one connection to the home, or to the user, using multipath Internet protocols such as MP-TCP (Multipath Transmission Control Protocol) and other technologies known in the art, which also allow fail-over reliability improvement. The server 270 may require a gateway agent and/or network edge device API to collect data and subsequently to improve the access network and/or the core network profiles (or policies implemented through the agents). Agents may also be located either in the access network, core network, or the OSS/BSS (i.e., operations support system and business support system).

The server 270 can collect data from the access network and then control access network operation using an auto-configuration server; such as those compliant with TR-069 or TR-369 discussed below. ISP networks may provide network slices with different service level agreements (SLAs), which can prioritize different applications or devices described in detail below.

The application server connects to devices through the ISP's network (via Internet), unless the ISP also provides the corresponding applications (in which case the server is likely in the ISP's core network). In general, application servers 285 may support WFH video conferencing, remote learning, entertainment, etc. through user applications on the in-home devices. Application servers may collect QoS data using various techniques such as Real-Time Control Protocol (RTCP) or others known to one of skill in the art. The application servers may also provide application profiles that help adapt functions; such as, video/audio encoder data rates and resolution.

In certain embodiments, an application may have direct user feedback, such as thumbs-up and thumbs-down buttons that indicate user satisfaction or dissatisfaction, respectively, or other direct QoE indications. The application server may also collect or derive indirect user QoE feedback such as decreased use, churn (rate at which customers stop doing business with an entity), complaint emails/calls, user activity (e.g., keystroke counters, audio activity, video activity/expression), etc. WFH application servers may deliver analytic results directly to the application's stakeholders, which may be different from the application's user (for instance, their employer). Furthermore, devices 284 may monitor user activity to measure the frequency and manner in which a user is interacting with the device and/or application such as keystroke counters, voice monitoring, etc.

Server

Figure 2C:
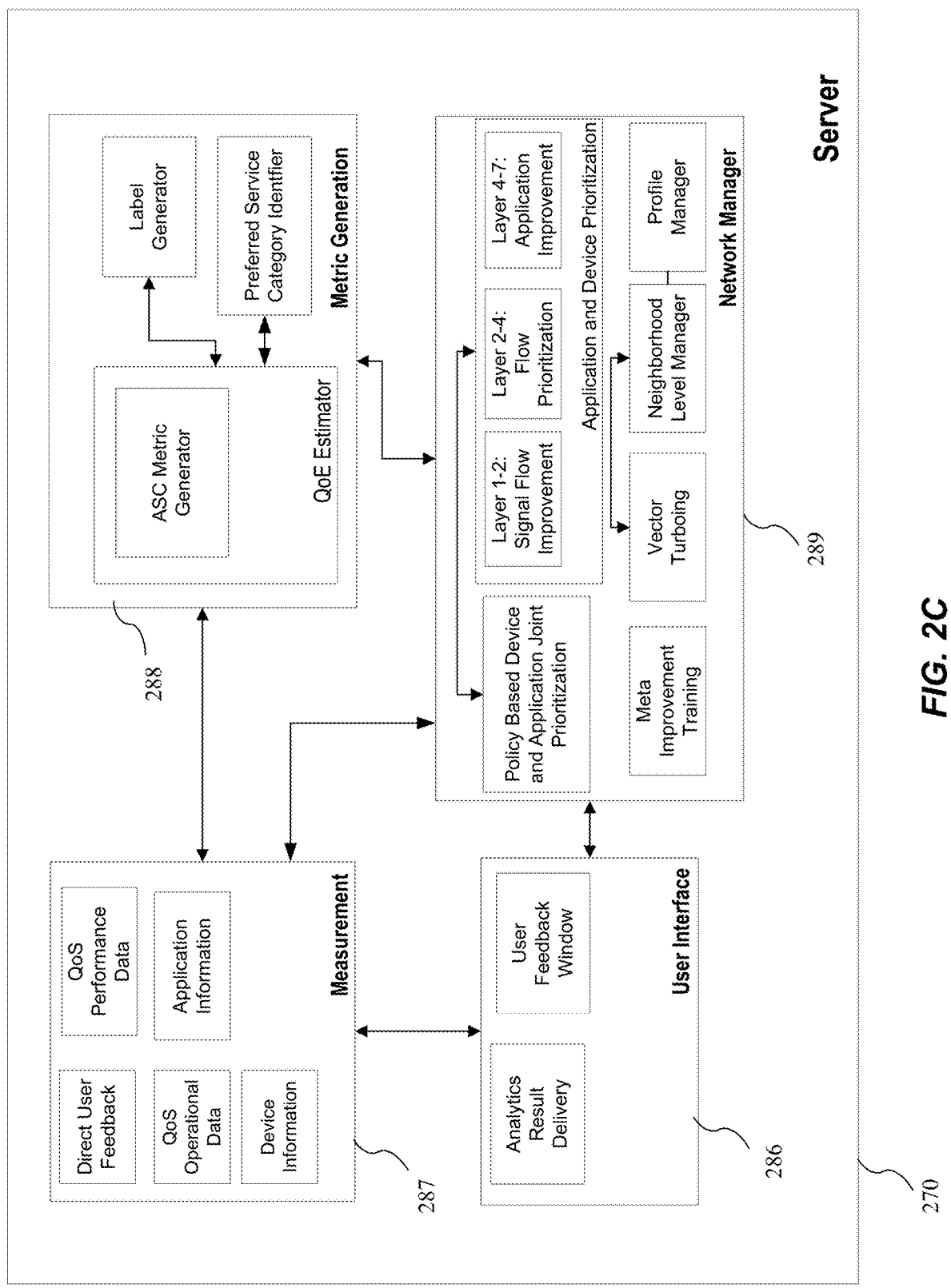
FIG. 2C illustrates a work-from-home server in accordance with various embodiments of the invention.

FIG. 2C illustrates functionality which can be part of a server 270 in accordance with various embodiments of the invention. The server 270 measures network connectivity, calculates network metrics, manages and improves the network performance, and communicates with devices within the architecture.

The server 270 comprises a measurement apparatus 287 that takes a variety of different measurements across the framework. These measurements may include QoS performance data, QoS operational data, application information, device information, direct user feedback, etc. Each of these types of measurements is described in detail below in accordance with various embodiments of the invention.

The server 270 also comprises a metric generation apparatus 288 that generates a single aggregated and/or a plurality of different metrics applicable to the framework. These metrics include QoE metrics, including ASC metric(s), which all or some may be associated with a label or service category identifier. Each of these types of metrics, labels, and identifiers are described in detail below in accordance with various embodiments of the invention.

The server 270 also comprises a network manager 289 that uses the network measurements and metrics to improve performance of the framework. Network performance is improved using at least one of prioritization structures and functionality, policy and profile managers, network-level managers, vector turboing, and meta improvement training. Each of these network improvement components is described in detail below in accordance with various embodiments of the invention.

The server 270 further comprises a user interface 286 that supports bi-directional communication between the server 270 and the user/employee working from home, the employer's IT support group, the ISP(s), and/or the application provider(s) in certain embodiments of the invention. This user-interface infrastructure may include any analytics result delivery apparatus that communicates information and analytic results to a user and supports a user feedback window that allows a user to communicate feedback and information to the server 270. Each of these user-interface components are described in detail below in accordance with various embodiments of the invention.

System QoE Dynamics

QoE measures an application user's (either a human or a machine) perceived contentment or satisfaction. QoE can be, and is often related to, but is not necessarily equal to (in fact it is rarely equivalent to), Quality-of-Service (QoS). QoS metrics are usually strict and specific electronic-signal-related measurements largely of interest to engineers and/or designers. Comparatively, QoE measures consumer (or user) reaction to the performance of one or more applications operating on a networked device. In the WFH context, employers value QoE metrics when those metrics measure their employees' productivity level. For example, user feedback such as a "thumbs-down" QoE metric suggests an user's general dissatisfaction, which likely incurs some level of current or future cost to the WFH application provider and to the Internet service provider, along with immediate loss of user/employee or employer productivity. Conversely, a "thumbs-up" QoE metric suggests overall user satisfaction and likely indicates a more productive employee, who is able to complete his/her assigned work in a timely manner and with satisfactory quality through an efficient work-from-home environment.

QoE may be based on user feedback, when available. WFH analytics may alternatively, additionally estimate QoE from QoS via correlation or relationships learned through artificial intelligence, machine learning, and/or rule-based designer ingenuity/experience. Such learnings often involve trainings that use actual user QoE reactions (or data), sometimes known in adaptive learning as labels that help create models. Those models then apply to estimate these QoE reactions from future users when these labels are not present.

Figure 3A:
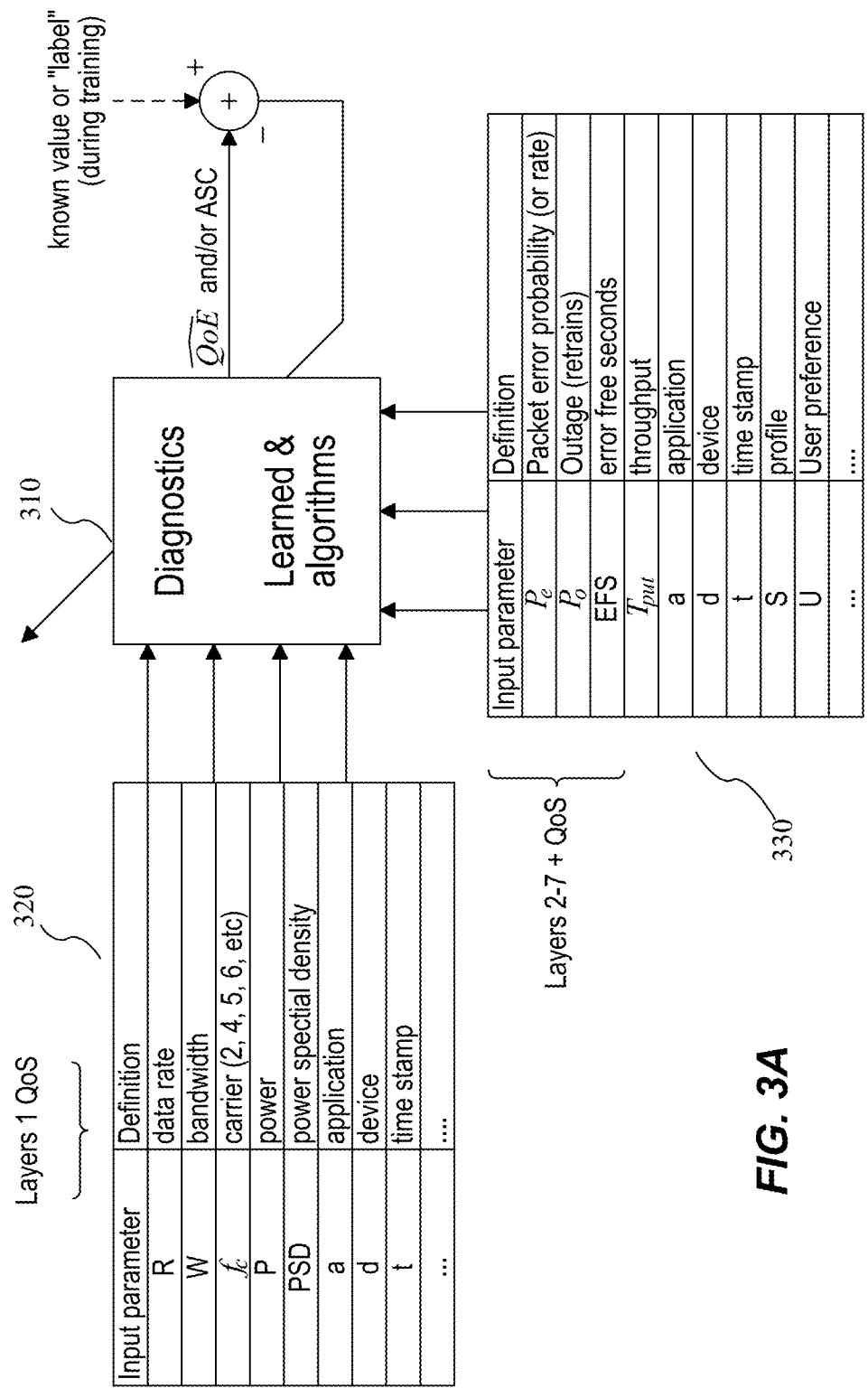
FIG. 3A illustrates aspects of an exemplary quality of experience (QoE) learning method that may be implemented within a diagnostics engine and applied to WFH activities according to various embodiments of the invention.

FIG. 3A illustrates aspects of an exemplary QoE learning method that may be implemented within a diagnostics engine 310 and applied to WFH, such as one applied to the ASC metric. In various embodiments, the diagnostic engine 310 may be implemented within the WFH metric apparatus 288 of the server 270. The diagnostic engine 310 receives a plurality of OSI (Open Systems Interconnection) Layer 1 QoS parameters 320 that will change as network demand, capacity, bandwidth, data rate, application, etc. vary over time. In addition, OSI Layer 2 and above QoS parameters are also inputted into the diagnostics engine 310. Based on machine learning methods and processes discussed later, labels are generated that are associated with direct or indirect user reactions and the state of the network being used.

The labelled user reactions may be instantaneous or time delayed, and they may include feedback such as thumbs-down buttons, help calls, help chat-box attempts, support escalations like technician dispatch to a complaining customer, etc. In fact, just about anything that measures possible user dissatisfaction, discontent, or difficulty can be a source of labeling, and some additional examples of user reactions include but not limited to a loss of service (temporary drop of attention or permanent disconnection of service), mean-opinion scores, exit or other survey scores, etc. In the WFH context, this also expands to employee-productivity indications that correlate with connection issues. The ASC metric is particularly valuable when it helps to improve the productivity component that derives from the worker's home internet connection in terms of the worker's effective collaboration with co-workers, customers, and others. ASC analysis from QoE estimates provide a utility or cost measure of the WFH improvement's effectiveness.

Remote workers may experience frustrating teleconference moments, where poor uplink audio quality often causes an entire group to spend unnecessary time repeating themselves. Disconnection and re-start of call also reduce productivity, and thus changes the ASC metric. Loss of group time in videoconferences multiplies by the number of participants, and consequently causes reduction of the entire groups' enterprise-employee value, or equivalently, their productivity associated with the ASC metric.

In response to a learned ASC analysis, ASC improvement solutions address possible corrective actions, pro-active or re-active, that may dynamically tune or improve the internet connection's tunable parameters. These actions will lead to the connection's "current state" or "profile," which FIG. 3A also shows is an input to the learning process, being improved such that the QoE of users on the network improves and associated productivity increases. Additionally, QoS data associated with one user may impact other users within the WFH activity. The potential relationship between QoE of users within the WFH activity is apparent and may be included in the analysis of QoS, QoE an ASC to improve network performance.

Figure 3B:
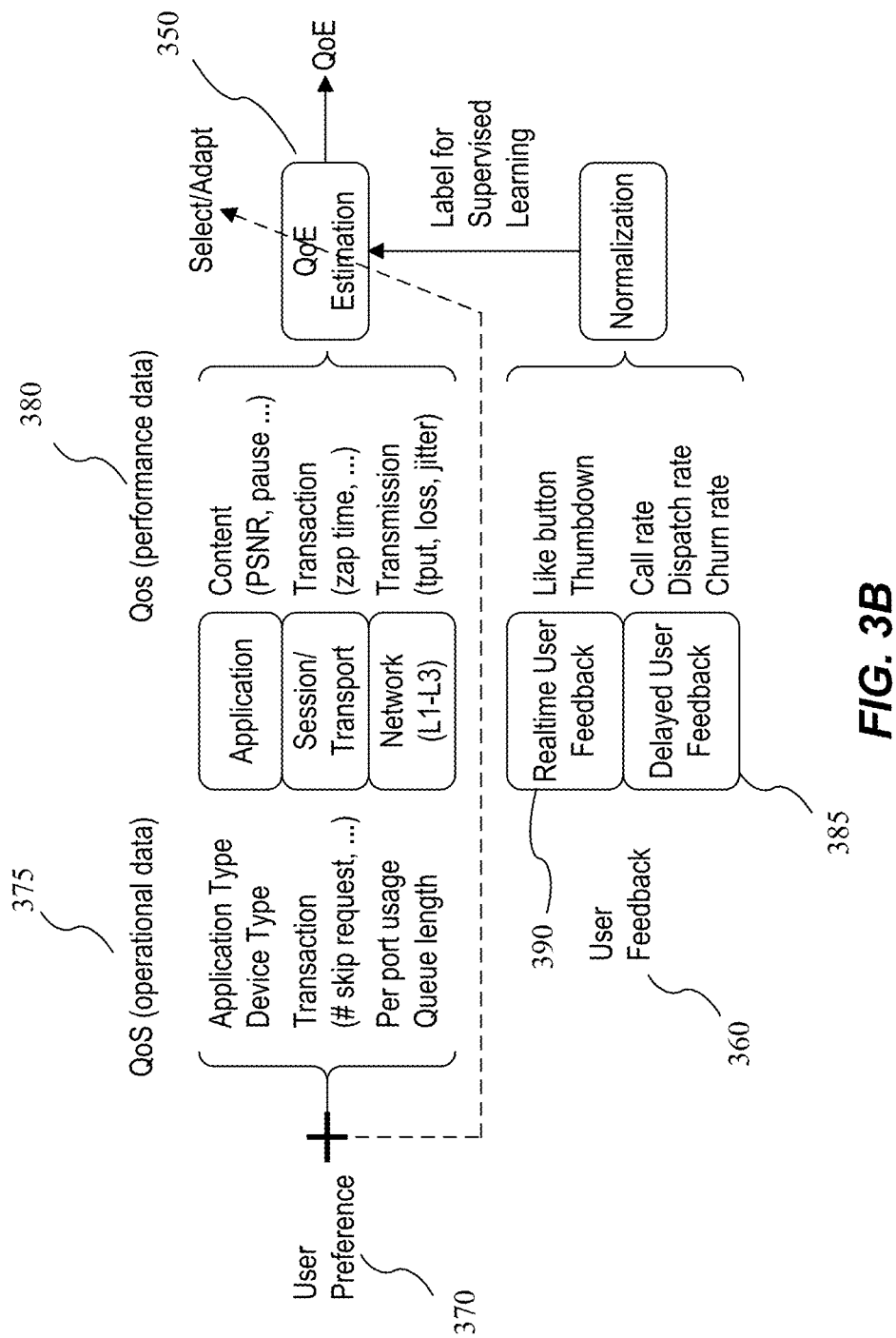
FIG. 3B illustrates a generalized QoE estimation model that trains and adapts on normalized and aggregated user QoE feedback, quality of service (QoS) data, and user preference data according to various embodiments of the invention.

FIG. 3B illustrates a generalized QoE estimation that trains on normalized and aggregated user QoE feedback data according to various embodiments of the invention. The QoE estimator 350 results provide indications, or sometimes just a single number, that can be used to gauge network performance, employee-user performance, and WFH success. The QoE estimator 350 may be located within the WFH metric apparatus 288 of the server 270, In various embodiments, the QoE estimator 350 receives a set of user preference inputs 370, operational data 375, performance data (QoS) 380 and direct user feedback 360. The operational data 375 may include informational data such as an application type, a device type, etc., transaction data, and other data such as port usage, queue length, etc. Performance data 380 may include QoS data from various OSI layers. User feedback data 360 may, but is not required to, include both real time and delayed user feedback.

Direct user QoE feedback 360 is often rare. However when present, this direct QoE feedback 360 can help machine learning methods to learn how QoE may be estimated from continuously available QoS data like packet losses, signal levels, noise levels, outages, margin levels, data rates, throughputs, latency (delay), and all other forms of both current and historical operational/performance data. The estimated QoE from QoE estimator 350 replaces the QoE data whenever direct QoE feedback data are not available. An example of such QoE-from-QoS learning can use for instance, logistic regression where a server 270, constructs a logarithmic WFH QoE estimate from a learned linear combination of QoS variables (or functions of those QoS variables).

The training illustrated in FIG. 3B occurs when actual user QoE feedback 360 (such as "labelled data") is present. The learned functional relationships are then available for subsequent QoE estimation use when that user QoE feedback is no longer present. In certain examples, these QoE estimates then depend on the QoS operational/performance data and possibly any user-preference data 370. Training may update each time additional direct user QoE feedback data 360 is present; the consequent updated QoE-from-QoS functional-estimate relations then continue again when the direct user QoE feedback data ceases to be available. The QoS and QoE data inputs to learned combinations may come from any, combinations of, or all of the sources identified within FIG. 3B. The user preference data 370 can specify, for example, that the QoE estimator prioritize only WFH applications/devices by setting the preferred service category as solely WFH. The estimated QoE data may itself also become training data for a QoE improvement discussed later.

The QoE diagnostic engine 310 and QoE estimator 350 may be tuned by employers to their corporate employee-productivity metrics, including the ASC productivity metric. The consequent system can identify an employee whose metric(s) has dropped because of connectivity issues, as well as identify situations where connectivity may be incorrectly posed as a productivity-loss cause. Experiments with higher quality video, audio, or productivity applications and tools may then be more accurately assessed for productivity effect. An employee's ASC metric drop, when caused by connectivity issues, can be further diagnosed for best corrective action. The employee's WFH device may also be targeted during working hours for higher-priority flow, relative to other devices not using the QoE cognizant WFH applications. In addition, redundancy and alternative connectivity may be applied to further improve performance. For example, interconnectivity between WANs may be provided in case performance of one WAN drops or fails.

The OSI stack and its seven layers, mentioned in FIG. 3A, will be referred to explicitly, or implicitly, throughout this document. An OSI-stack summary appears below.

The Open Systems Interconnect model or OSI model in ITU standard X.200 specifies 7 layers (or levels) for data communication:
 (1) Physical (signals, symbols, codewords)
 (2) Data Link (data framing above physical layer)
 (3) Network (packets of data)
 (4) Segmentation (multiplexing, acknowledgement)
 (5) Session (creates and later removes a session during which groups of packets are exchanged)
 (6) Presentation (translation from application to a service that uses sessions)
 (7) Application (uses application programmer interface or API to translate application's data)

This document refers to the 7 layers or levels to indicate at which level is the QoS or QoE data collected and to which layer is the improved parameter(s) tuned. A profile may contain values for several layers.

QoS Collection—Communication System Performance Data.

Server 270 collects QoS performance data 380 from devices and equipment 205, 210, etc.; such as the home gateways, the Wi-Fi access points, the various home devices including smart phones, as well as DSLAMs, OLTs, cable hubs, routers, peering points, and application servers located beyond the home-based devices.

The term "QoS data" is defined to include operational data 375 and/or performance data 380. One QoS data type collected is performance data, and QoS performance data report on the communication system's function. The non-exhaustive list below provides some examples of commonly collected QoS data. QoS data may be collected at regular intervals; however, the server 270 need not necessarily collect them at regular intervals. Different types of QoS data collections may have different time spans and intervals between those spans. When necessary, intense collection is possible (and may be desirable) for select equipment or devices at shorter intervals. Such rapid, intense collection may be event-driven in response to either equipment alarm reporting or server requests for said more intense data collection. QoS data may be available from any, some, or all of network connections and connectivity points along the end-to-end transmission paths illustrated in FIG. 2A. Some QoS data collections conform to well established standards, others to developing standards/specifications, and yet others to equipment vendors' proprietary formats.

To further illustrate implementation details about QoS data that are collected across these diverse network connections and subsequently analyzed, a mathematical description is provided below. The quantity $X_{i,j,k}(t)$ indicates QoS data, with defined subscripts as:

i denotes the QoS data's operational data type that includes items from a set that may include for example {downlink/uplink data rates and/or throughput, downlink/uplink packet loss, retrain counts, signal-to-noise ratios, signal levels, interference levels, etc.}, which can be current and/or historical. So, for instance, $X_{SNR,j,k}(t)$ would specify the signal to noise ratio associated with indices j, k at time t.

j denotes the device/equipment name type that includes items from a set that may include for example {ALL, smartphone name/brand/type, TV name/brand/type, laptop/desktop name/brand/type, IoT device information and identifier, model numbers, associated internet protocol (IP) addresses or MAC (medium access control) addresses, OLT/DSLAM/CMTS name/brand/type, Wi-Fi Access Point name/brand/type, cell base station name/brand/operator/type, network router name/brand/type, etc.}. Here "ALL" indicates essentially that the data $X_{i,ALL,k}(t)$ is common to all (or essentially therefore independent of) device types. This index may specifically include a link identifier or at least associates with the equipment pair at the link's endpoints, so $X_{i,LINK,k}(t)$ for the operational data type i and application k at time t.

k denotes the application data type that includes items from a set that may include for example {ALL, WFH application brand/version, voice-over-IP (VoIP) service/application/brand/version, similarly video-entertainment, gaming, other in-home applications' identifying data, etc.}, where ALL indicates that the $X_{i,j,ALL}(t)$ applies to all applications.

t denotes QoS data argument, which is the time when the performance data were collected. Time resolution can be different for different data types, and t can be viewed then as a timestamp for the other subscript-indexed data in quantity $X_{i,j,k}(t)$. Thus, $X_{SNR,LINK,WFH-BRAND\ X}$ (2022/05/11 21:00:00) specifies the SNR on a specific LINK when BRAND-X WFH is in use and is collected on May 11, 2022 from 9:00 PM to 9:15 PM. For example, some data types are collected every 15 minutes (as in this example case for illustration) while some data types are collected daily, and yet other metrics are collected as event driven (i.e., only when certain event, like reboot, happens).

$T_{i,j,k}(t)$ associates with the quantity $X_{i,j,k}(t)$ as the time span that $X_{i,j,k}(t)$ covers when all 3 indices and the timestamp are the same. For the above example $T_{SNR,LINK,WFH-BRAND\ X}$(2022/05/11 21:00:00)=15 minutes, 0 seconds means that the interval over which the SNRs were collected (there may be 1 or several if $X_{i,j,k}(t)$ is a vector) correspond to the time interval or span of 15 minutes. As such, a vector of 15 values would be 15 SNRs for LINK and application WFH-BRAND X at 1 minute intervals, taken each minute starting at 9:00 PM.

Specific QoS data types correspond to the index i that may be reported through $X_{i,j,k}(t)$ include, but are not limited to, the following:

Passive data measurements that may occur without alteration of the corresponding WFH Internet link's user data. Thus, passive data help determine performance, but are not a function of any injected testing patterns nor of the specific user data itself. Typically, the equipment itself generates or computes passive data measurements. Many QoS data are passive. The SNR in the examples above is an example of passive data. Other examples include:

Data rate and coding parameters (includes Modulation and Coding Scheme, or MCS). Data rate is the number of bits passed per time unit over a link without regard to whether the bits are user data or other forms of overhead information that may be used for redundancy with the coding scheme employed, for protocol headers, for IP address routing, for application-data segmentation, for flow-priority indication, or for other overhead purposes of the transmission system.

Throughput is the actual user data passed successfully per unit time. In most examples, this is less than the data rate and a more realistic estimate of actual use by applications. Throughput may be more accurately measured actively (see below). Throughput may also be viewed as a generic example of the ASC metric, where the application might be interpreted as "ALL" in the case of throughput or applicable more generally to any application.

Packet-loss rate measures the number of data packets transmitted in error and cannot be recovered at a particular layer over a specified period of time. Typically, packet-lost rate refers to IP packets, but it can also be other segmentations associated with error detection and coding, sometimes called "code violations", for example. These coding redundancy (or inserted check sequences) are part of the interoperable, standardized transmission formats and not injected for testing purposes. As such, these measurements are typically considered passive.

Errored Seconds measures the number of seconds in which at least one packet was lost over a longer time interval.

Signal strength such as RSSI (Received Signal Strength Indication) measures the transmitted signal's power at the receiver, and it can often provide an electrical-equivalent estimate of the length (or distance) of the transmission channel.

Transmit power and/or power-spectral density (PSD) levels at the time when other measurements are taken, and this measurement can be important in resolving interference issues.

Interference strength is often measured when no main signal is present, but it can also be reported indirectly so that the power level of interfering signals can be derived.

Signal quality such as SNR (Signal-to-Noise Ratio) and SINR (Signal-to-Interference-plus-Noise Ratio) measure the power of the desired signal relative to all other interferences and noises, which can be crucial in determining reliably achievable data rates and throughputs, subject to an acceptable threshold error rate.

Scheduling delay and jitter measures are usually derived and reported by equipment from the average transmit-buffer-memory depth relative to data rate, as well as the variation (jitter) in such depth.

ASC productivity metric is an aggregated, employer-related measure of employee value contribution based on their productivity as related to their WFH connectivity.

Active data measurement: These include QoS data that are the result of injected measurement data into an internet link. Again, the following list is exemplary and non-limiting:

Speed-test QoS data measure transmission speed, data rate, or throughput between two selected link points with known inserted patterns. These can include:
  end-to-end or segmented measurement (e.g., Wi-Fi only, access-link only, edge-to-application server, etc.) of raw speed or throughput (for an index j that identifies which link).
  invasive speed tests that flood the connection with data causing other services to be disrupted, which also often reports an exaggerated indication of what a user would see with other users sharing the link.
  non-invasive throughput measurement (test of available throughput while other existing applications remain at their nominal priority)

Connectivity QoS indications of whether a device can connect to another point, particularly a server. Connectivity can be determined for example by checking TCP SYN-ACK exchange between the device and target server(s) using standard TCP ports such as 80/443. In addition, connectivity can also be determined by checking DNS resolution between the device and the server. This DNS resolution information is important for later debugging. If a number of important applications are known, the connectivity (both TCP SYN-ACK and DNS resolution) between an agent in the gateway and the application servers can be periodically checked. For instance, $X_{CONNECT?,PON6\text{-}to\text{-}DEVICE8PORT80/443,WFH}$(test time).

Transmission delay QoS data measures (one-half of) the round-trip time for a known packet to be sent and returned to its origin, while transmission jitter measures variance in such transmission delay within the corresponding link's receive buffer of such round-trip measurements (whereas scheduling jitter is only on the transmit buffer associated with a device/equipment, so index j in both cases, but scheduling jitter is for launch into the link and transmission jitter is for round trip traversal of the link):
  ■ End-to-end, or link-segment specific, so for example, $X_{JITTER\text{-}S,WiFi3toLAPTOP2,WFH}(t)$ Transmission delay can be measured against different measurement servers. For a known application-server list, the delay between the device/agent and the application servers (through index j) as well as DNS resolution delay to the application server can be periodically measured. The application server may then have an explicit fixed index pairing of j with k for transmission-delay and jitter data reporting to associate this jitter with an application.

Application-specific QoS data may often be available from applications' diagnostic registers and have index k. For example, Layer 4 RTP (Real-Time Protocol) and the associated Real-Time Control Protocol (RTCP) and Layer 6/7 WebRTC are protocols/languages used by applications to derive such application-specific QoS data. Applications may collect QoE data, as well as QoS data, for example using RTCP protocol. The application-specific QoS data is active, whether spoofed or normal, and associates with an application. It applies to an end-to-end connection as $X_{Voice\text{-}Packet\text{-}errors,Server\text{-}to\text{-}LAPTOP2,WFH}$ (conference call 3). Many WFH applications collect end-to-end (Layer 7) video conference call specific QoS data for each participant, including the following:
  Audio/video packet loss (uplink and downlink)
  Audio/Video codec data rate (uplink and downlink)
  Some applications may combine these QoS data into application stability measurements and then report these upon query at the application's diagnostic page or information console.

In home Wi-Fi issues are a major source of poor connection quality for WFH applications, and Wi-Fi systems may report various QoS data via standardized interfaces, which can provide data about the nature of such degradations. These data can include, but are not limited to, measurements of interference, data rates achieved (minus coding overhead but not necessarily minus other protocol overheads), possibly as a function of different ports/paths and devices used, as may be indicated by a DSCP (Differentiated Services Cope Point) that is here considered as tied to index k but would likely have the ALL category for indices i and j. Newer multiple antenna Wi-Fi systems can also provide spatial-path indices/information within the same spectrum that are largely distinct, although this information is often internal to the Wi-Fi AP box or chipset today. The path index would correspond to subscript j, while the information to subscript k. Prioritization, discussed in detail below, may assign the spatial path to a specific application. Significant future standards efforts may help encourage box/chip manufacturers to report these types of useful information under i, including these spatial indices/information, known as the "array coefficients", because such reported data could be crucial to improved WFH performance including improved QoE an ASC metric that is not possible via the chip or the Wi-Fi AP box itself directly.

DSL systems provide information and data similar to Wi-Fi (e.g., multi-user, vectored DSL systems already report the array coefficients that are the equivalent of advanced Wi-Fi's MIMO). In fact, DSL systems in the field today go further to indicate a full frequency-by-frequency analysis of the entire channel (or all sub-carriers or bins used), often known as the corresponding bit distribution and channel-response (which have the names Hlog and Xlog and/or Hlin and Xlin in DSL standards). Noise power spectral density may be reported, or it may easily be derived from the other reported information. Cable modems increasingly have followed DSL systems in modulation type and reporting capabilities and thus also advance to include similar quantities.

Cellular 3GPP systems have a rich set of information within the devices that is currently not well or universally reported externally to exterior, remote, or cloud-based management systems. Such reporting would indeed be very useful in WFH situations, where the WFH interference environment is a more random aggregation of signals from several different ISP's and interferences, as opposed to a more controlled office or campus environment when workers are at their desks or within the campus. This would be particularly useful in situations with 4G and/or 5G systems using unlicensed bands that also support Wi-Fi in the home.

As shown above, the ability of the server 270 may rely on standardization-based measurements, measurements that a third-party ISP provides, measurements derived from other network metrics, and other ways known to one of skill in the art in which the server 270 may obtain information about the diverse set of connections within the WFH architecture.

Profiles and Configuration Data

Embodiments of the invention make use of a profile to set and report the system configuration. Management entities often determine the optimal, a near optimal, or a more preferred profile for systems under their management. The server 270 is an example of such a management entity for WFH activities that may provide guidance or policy on profile setting or that actually sets the profile directly, sometimes dynamically based on current and historical performance data 380. The term service profile is a subset of a full profile settings that comprises certain service-related parameters such as data rates and delay. User preference data can be a specific service profile or a set of acceptable service profiles. The term equipment profile means a set of possible tunable parameters. Profile here is used in the broadest sense, and it should be properly interpreted within any specific use case's context. In more restricted situations, the list of possible profiles from which selection can occur come from a limited set.

The quantity $S_{i,j,k}(t)$ denotes a profile, where the subscripts i,j,k have similar interpretations as $X_{i,j,k}(t)$ defined above, but more specifically:

- i denotes transmission format profile data type that is not directly equipment nor application dependent, with examples including Modulation and Coding Scheme (MCS) recommendations or policies (i.e., data rates attempted, associated codes, physical layer modulation constellation size, etc.), carrier-frequency band, specific channel within a frequency band, aggregation of bands, power levels, number of antennas when appropriate, DSCP data types, etc.
- j, again, denotes the device type, model, brand etc. associated with the profile or can be a link indication.
- k, again, denotes the application type associated with the profile.

Data-Collection and/or Profile Configuration Standards

QoS data collection's specific implementations vary widely today in industry. Some WFH, and more broadly connection-management, implementations may favor certain equipment, while others attempt to be open to all. In many cases, those supposedly open may in fact disguise preferences. A variety of standards organizations also attempt to provide widely available, industrially accepted norms for allowable profiles, to varying success.

Fixed-line data collection standards for DSL and GPON have largely converged into a few methods, many (though not all) for example are specified by the Broadband Forum (BBF) through support from international equipment interoperability standards organizations. Similarly, cable management interfaces have increasingly converged to those supported by interoperability standards such as DOCSIS 3.1.

Wi-Fi data collection methods, on the other hand, are less mature, including many proprietary definitions and methods. As a result, Wi-Fi data collection today to a server 270 may require a compatible agent-based API in the Wi-Fi access point (AP) 205 to accommodate equipment and chipset differences. Perhaps the best known Wi-Fi data collection specification is Broadband Forum's TR-069, which many ISP-supplied access points use widely, but it also suffers from known issues with very slow and limited data collection that largely prevent reasonable assistance to Wi-Fi connections. Furthermore, TR-069 provides no visibility into the Wi-Fi AP's subtended client devices. BBF's recently released TR-369 improves the client-device visibility, but it still has speed limitations as well as data collection limitations. The main limitation that remains in TR-369 is that it employs an approach to collection that does not collect most necessary items for effective Wi-Fi management. There exists a companion BBF standard TR-181, which lists the various data elements (DEs) to be collected in XML (Extensible Markup Language); however, the list in TR-181 is also incomplete on needed items for effective management. Lastly, TR-369 is not yet widely deployed, as it is still in early stages of interoperability testing.

The current Wi-Fi Alliance (WFA) EasyMesh work effectively extends the in-home portion of the BBF TR-369 capabilities. However, the two efforts are not viewed as mutually dependent, because EasyMesh is only between access points and mesh points (MPs) or repeater/extender-AP's; as such, it does not extend to servers outside the home equipment. Other inside-AP-agent efforts have emerged through open-source forums such as the Rapid Deployment Kit (RDK) and PrplMesh efforts, and they now appear to be merging through the assistance of the BBF. These attempts to provide an open-source agent API for remote management will likely help the industry. However, there remains a real need for well-understood, data-element definitions appropriate to improved future Wi-Fi management, and one such set of definitions has been proposed in the WFA called "CMDi" (Cloud Management and Diagnostics interface), which would expand data elements monitored and collected to be much more useful and helpful to cloud management of Wi-Fi networks.

Servers that try to assist application servers and ISPs with WFH QoE based methods would benefit from a standardized CMDi definition. These data elements might well be added then to TR-181 (thus potentially included in future versions of TR-369 and EasyMesh, as well as supported by future RDK/Prpl documents, drafts, and proposals).

For applications, the previously mentioned IETF standards allow RTCP diagnostics on RTP traffic that flows on top of multimedia streaming with network layer (3) UDP (User Datagram Protocol) to test or report on actual streaming data. This in turn allows data collection related to the video-streaming quality to be among the collected data here called QoS performance data. This is typically enabled through application-level webRTC initiation of streaming's use. The application's QoS performance data then constitutes the feedback information from the application-service delivery to the application server, and presumably then also to the server 270.

The server 270 may collect data across the diverse set of network connections using one or more of the technologies identified above that will provide visibility into a correspond network connection. One skilled in the art will recognize that other standards and technologies will likely arise in the future which will allow further visibility into network points for the server 270. The server 270 evaluates QoS data types, along with all QoE data described throughout the application, when they are available in any form. This QoE data may be exchanged with the server 270 using a variety of technologies including, but not limited to REST (Representational State Transfer) or legacy SOAP (Simple Object Access Protocol). REST is an architecture that allows computer-to-computer interfaces so that a server 270 could communicate for instance with an application server. Interfaces supporting REST are called RESTful. RESTful interfaces allow faster and more efficient transfer of information that is usually in http formats. SOAP is an older predecessor to REST and manages more device elements than pure data.

QoE Data Collection—User QoE Feedback and User Preference

User QoE feedback data are important to both service providers and application providers, and they are also important to the server's 270 cloud-based remote management system. As previously mentioned, QoE user feedback data may be real time or delayed, and they may be direct or indirect. Dissatisfied customers result in an increase in cost to ISPs such as support calls, technician dispatches, equipment replacements, and ultimately, churns. Application providers, particularly WFH application providers, may find dissatisfied customers turning to other competing application providers who are able to deliver a better QoE. From the perspective of an average customer, poor QoE is typically interpreted by the user as the application simply not working well as designed and not necessarily recognizing the underlying network connectivity problems.

User QoE feedback data help to train; i.e., learn by a ML or AI based method, the proper relationships between the QoS data and the QoE data, so that QoS data can be used in the future to estimate QoE data accurately, when such user QoE-feedback data are not available. Actual user QoE feedback data or QoE estimates from QoS data may assist dynamic improvement methods in supervised or reinforced modes. An example of a dynamic configuration to set the next profile as a learned function of the QoS data is detailed below. One skilled in the art will recognize that other indices may be used within the function or mathematical variants thereof. $F_{i,j,k}(t)$ denotes the user QoE feedback data 360 where the indices are similarly defined as above:

i is the type of user-specific feedback. For example, elements from the set {thumbs-down, thumbs-up, customer complaint and type, net-promoter score, chat complaint, corrective action previously taken, etc.}.

j is the device type, model, etc., as before.

k is again the application type identifier.

Real-time user QoE feedback data 390 may be instantaneous or substantially instantaneous where delays are introduced by transmitting the data from a user interface to the server 270. Types of real-time user QoE feedback may include (1) input from within a collaboration platform application (such as the previously mentioned input of thumbs up/down, star rating, smiley face, etc.); (2) input from a separate application used to provide feedback on collaboration (such as a smart phone application or web-based application used during a collaboration session); (3) comments from chat/messaging streams running within collaboration platform (for instance, streams may be monitored for comments on connection quality, or users make comments with specific keywords); and (4) user's direct comments on their own connection or a specific person).

This user QoE feedback data $F_{i,j,k}(t)$ allows the QoS's and QoE's associated time span $T_{i,j,k}(t)$ to be shorter in determining QoS correlation to QoE. Shorter time span means that any consequent corrective actions as well as any reporting of issues, have the possibility of proactive resolution before a WFH customer becomes dissatisfied with the application and/or the ISP's service. Real-time user QoE feedback data 390 examples may include a "thumbs-down" indication and/or a "thumbs-up" indication, as well as other user ratings such as "1 to 5 stars" at the completion of a session. Such feedback data are examples of direct user feedback data. A "thumbs-down" indication is immediate feedback of a frustrated customer-user who made an effort to provide that indication. Rapid resolution can thus bring financial value to the ISP and also to the application provider. This may be particularly true if the feedback leads the employer paying for the existing WFH service to move to an alternative, improved and more stable, WFH service, or if the ISP's offered fail-over option to ensure stable connection costs significantly more than the default connection.

Real-time user QoE feedback data 390 results also can arise from the immediate use of a chatbot or virtual assistant (e.g., Siri or Alexa, but may be specific to WFH) to request help or to complain. Such feedback data are examples of indirect user feedback data. More sophisticated, evolving systems may even read the user's facial expression (e.g., in a video conference) or voice intonation to flag a real time application or service concern. Certain video-conferencing applications (and other collaboration platforms) have the ability to add third party extensions or bots within their framework. In certain embodiments, these mechanisms may be used to collect data on QoE as it pertains to connectivity and the collaboration platform. Also, certain collaboration applications (e.g., video-conferencing applications) report QoS metrics and embodiments of the invention may use these reported metrics.

WFH productivity is particularly sensitive to any issues with teleconferencing, videoconferencing, and other live-group interactions. Different group members may press "thumbs-down" on another participant's communication because they cannot hear or see, which the sender may not realize. In such situations, other group members can indicate a problem with the thumbs-down indication, and the WFH application can try to correct this through profile change for the affected group member. The server 270, for example, may be able to repair the issue by improving the audio quality (e.g., through a profile change). A similar example can be a new profile's provision $S_{i,j,k}$(next) for video and/or screen displays that are functioning poorly because of poor connectivity. This could be particularly problematic for a lecturer/presenter, or a teacher in distance learning situations, whose valued inputs are lost or impaired to a large group of audience members. All group members' productivity or ASC productivity measure decreases because of repetition, restarts, delay of calls, etc. This is a particularly important form of real-time feedback and a poor-performance icon/indicator can be clicked on the speaker's image or the speaker's name in the video conferencing application.

Substantially instantaneous QoE feedback data includes reaction to comparison of a user's speed with respect to other system users, whether in the same conferencing session or not. Users seeing inconsistent availability of speed equivalent to their peers are also at high risk of changing ISP, application provider, or both. Current information relative to their neighbors, co-workers, and friends are all helpful. Even more valuable would be similar comparisons of ASC productivity measures.

Another example of user QoE feedback occurs with streaming (live) video failure and/or excessive delay, perhaps in a webinar for work or a speaking event or a class lecture from a teacher. Yet another example is the Video "LOADING . . . " message that continues to appear and disrupts the flow of the viewing experience. Video streaming interruptions cause longer viewing time and annoy the viewers. If one group of users finishes 15 minutes faster than another group viewing the same broadcast, and both groups may rejoin for subsequent discussion or events, this is a loss in ASC productivity metric that scales across the group. Even if a stored streaming video is eventually viewed but with multiple interruptions, the viewer loses productivity and can also become frustrated. A user experiencing these delays loses valuable time, and thus has a lowered ASC productivity measure.

Certain real-time user QoE feedback data may be estimated using a model previously learned or perhaps one standardized for QoE estimation. Standardized examples include the ITU-T G.107 E-model that predicts whether a certain connection is sufficient to sustain good-QoE voice traffic. In effect, an advance warning suggests from very recent history that the path can or cannot sustain acceptable voice quality. A similar video-streaming prediction appears in ITU-T standard P.1201.2. Some Mean Opinion Scores (MOS) can also be instantaneously computed and used as estimates of or proxies for QoE. One skilled in the art will recognize that other standards and approaches will likely be developed to predict network connectivity, all of which may be implemented by the server 270 in managing the WFH network architecture.

Delayed user QoE feedback data 385 expands the associated time span $T_{i,j,k}(t)$, and may be valuable within the user feedback data 360. QoE indications 385 that are even days or weeks old, if they can be highly correlated with QoS data 380 in the same time span, may provide valuable learned models for estimating real-time QoE by the QoE estimator 350 when no actual real-time QoE is available. A history of complaint calls or texts may reveal many past outages or frustrations that the user experienced, and they may be correlated with QoS data 380 taken at those same times. Comparisons of these actual, but delayed, QoE data 380 with estimated QoE at those same times can further improve the estimation models. Additional examples of delayed user QoE feedback may be generated by (1) users being prompted at the end of a collaboration session for feedback; (2) users being surveyed occasionally on their connectivity; (3) users commenting on their own connection or their experience with others.

User QoE feedback data 360 may be used to label and consequently help to learn (train) a functional mapping from QoS data to an index-specific reward estimate or Quality Function $\hat{Q}_{i,j,k}(t)$, so QoS $X_{i,j,k}(t) \rightarrow \hat{Q}_{i,j,k}(t)$, of which the ASC productivity metric can be an example for overall WFH productivity. $Q_{i,j,k}(t)$ is described in much more detail below, but this learned functional mapping can and generally occurs through machine learning/artificial intelligence. In certain embodiments, the quality function $\hat{Q}_{i,j,k}(t)$ need not be exactly an estimate of the user QoE feedback data $F_{i,j,k}(t)$, the latter of which may be simply represented as 0/1 for good/bad, net promoter score (say, 0 to 10), mean opinion score (say 0 to 5 stars), etc.

The quality function measures QoE on a related but possibly different scale, for instance an employer's customized ASC productivity metric. More QoE feedback data taken under the same conditions help derive more accurate functional description/mapping. This description may be later used for the estimate $\hat{Q}_{i,j,k}(t\ T)$ based on simultaneous QoS data $X_{i,j,k}(t\ T)$. The functional relationship can be dependent also on the similarly learned, appropriate profile setting $S_{i,j,k}(t\ T)$. Artificial intelligence methods perform better with more input data and more accurately labelled data, for training (supervision) and adaptive tuning (learning). Various embodiments of the invention attempt to improve estimation of functional models and their predicted outputs as well as improve profile settings dynamically.

User preference data 370 is a set of user inputs that indicates user's preference on network operation. This user preference data, identified as $P_{i,j,k}(t)$, sets prioritization rules and/or policies on a connection's devices, users, and/or applications, where the subscript indices again have similar meaning as those described before for X, F, S, discussed above.

This user preference data 370 data is available to the server 270, and user preferences may be set by any, some, or all of the interested parties; i.e., the ISP, the application provider, a regulatory group, and/or the user/employer/customer themselves. The user preference itself may also be learned through actions taken by a user (like hitting the thumbs-down when not satisfied and correlating that against settings). In effect, $P_{i,j,k}(t)$ helps specify a preferred future profile $S_{i,j,k}(t)$ if that profile is permissible. The profile $S_{i,j,k}(t)$ may be directly specified in part (speeds, delays) or in full, the latter of which is unlikely directly specified by the user given the ISP and/or the application provider would likely wish to maintain certain degree of control. The user preference $P_{i,j,k}(t)$ thus combines QoS data $X_{i,j,k}(t)$, existing profile $S_{i,j,k}(t)$, and user QoE feedback data $F_{i,j,k}(t)$ to estimate a next (more optimal/improved) profile $S_{i,j,k}\ T)$.

Learning Methods to Estimate QoE from QoS

The QoE estimator 350 implements learning methods to estimate QoE from QoS data 375 (operational) and/or 380 (performance). Other types of data may also be employed by the QoE estimator during this estimation process. The index-free QoE metric is Q(T) for time span $T=(t_0, t_1)$, where $t_0<t_1$ that is independent of the time span $T_{i,j,k}(t)$, and it is possibly a function of all the QoS operational/performance data $X_{i,j,k}(t)$, the user QoE feedback data $F_{i,j,k}(t)$, and the user-preference data $P_{i,j,k}(t)$. T may span several measurement periods of $T_{i,j,k}(t)$. The QoE metric Q (T) is a single value that represents the overall QoE of all households', or more generally collaborator's households', WFH activity, and thus may encompass many values for the indices i,j,k. Also, Q(T) is normalized (such that data is reorganized in storage to improve utilization in subsequent queries and analysis) in such a way so that users can properly utilize that database for further queries and analysis. One example method of normalization balances or weighs new inputs and updates to the process with older versions of Q(T) previously estimated that also affects the new values. Q(T) is therefore an understood number that can compare one household's QoE to another. So the earlier subscripted $Q_{i,j,k}(t)$ was operational, device, and application specific, and without these subscript indices is an overall function. As such, the concept of ASC metric becomes an aggregate over all the relevant indices and specifics of interest. Thus, Q(T) is:

$$Q(T)=f(F_{i_Fj,k}(\tau)\forall i_F,j,k \text{ with } T_{i_Fj,k}(\tau)\cap T\neq\emptyset,$$

$$P_{i_Pj,k}(\tau)\forall i_P,j,k \text{ with } T_{i_Pj,k}(\tau)\cap T\neq\emptyset,$$

$$X_{i_Xj,k}(\tau)\forall i_X,j,k \text{ with } T_{i_Xj,k}(\tau)\cap T\neq\emptyset).$$

The subscripts on the operational indices i denote that the operational data type may be different for the different user feedback F, user preference P, and operational/performance data X inputs to Q(T), and the boldface indicates there may be several QoS data types all included in a vector of QoS data that is input to the function $f(\bullet)$. The time variable for the data here is $\tau$ to avoid confusion with the time-span's endpoints $T=(t_0, t_1)$. The function $f(\bullet)$ may be a linear combination for each indexed data point in its arguments, and it may attempt to approximate a symmetrically positive (good) and negative (bad) quality index that is often viewed as a log-likelihood ratio.

In this case, the Quality estimator 350 for a QoE metric uses linear regression. Linear regression is a machine learning method that adaptively determines this linear model by estimating the log-likelihood probability based on direct feedback QoE training data. For example, to associate user QoE feedback, as indicated as good or bad in the value of $F_{i_F,j,k}(t)$, with a certain operational/performance data $X_{i_X,j,k}(t)$ and user preference $P_{i_P,j,k}(t)$, it is helpful to know which device j and application k were active at the time of user QoE feedback. Other functional choices and metric scales are possible and may correspond to a variety of learning methods, including, but not limited to, reinforcement methods that project potential further reward for an estimated QoE when actual QoE data is not available, all of which may be implemented within the Quality estimator 350.

Examples of methods employed in the Quality estimator 350 are described below. In a first example, user preference data $P_{i,j,k}(t)$ may indicate that the preferred service category is WFH services. A policy associated with this preferred service category would contain a list of device-and-application pairs for flow prioritization when WFH service is active, indicated by a boldface $P(T)=\{(j_1,k_1), \ldots, (j_M,k_M)\}$, which is this prioritized set of M ordered pairs of device and application indices for the time interval T. QoS data may also have only been collected for a list of N device-and-application pairs active during time interval T, $X(T)=\{(j_1, k_1), \ldots, (j_N,k_N)\}$. Correspondingly, user QoE feedback during time span T is a list of "thumbs-up" (no problem indicated) responses from different device and application pairs, $F(T)=\{F_{TU,j_1,k_1}, \ldots, F_{TU,j_K,k_K}\}$ where each F is a unary data point. Then, the QoE metric during the time span T simplifies to:

$$Q(T) = f(F_{TU,j,k} \text{ for } (j, k) \in P(T) \cap X(T)),$$

where $$f(\cdot) = \begin{cases} 1 & \text{if the set } \{F_{TU,j,k} \mid (j, k) \in P(T) \cap X(T)\} \neq \emptyset \\ 0, & \text{otherwise} \end{cases}$$

and Q(T)=1 means good quality and Q(T)=0 means quality is poor or unknown. This equation bases QoE only on the user QoE feedback that corresponds to the preferred service/devices that were active during the time span T. In this example, user preference and operational/performance data thereby 'filter' the user QoE feedback data.

In general, user preference and operational/performance data can qualify user QoE feedback such that the corresponding QoE metric Q(T) represents that of greatest user concern. In another example, there are two different user QoE feedback data types:

Thumbs-up $F_{TU,j,k}$: again, unary data point equals to 1 if the performance is good, and Thumbs-up-or-down $F_{TUD,j,k}$: a binary data indication that is 1 if the experience is good and −1 if the experience is bad.

Then, the estimated QoE during the time span T aggregates two different scores, which can be denoted as follows:

$$Q(T) = g(f_1(F_{TU,j,k} \text{ for } (j, k) \in P(T) \cap X(T)),$$
$$f_2(F_{TUD,j,k} \text{ for } (j, k) \in P(T) \cap X(T)))$$

where $$f_1(\cdot) = \begin{cases} 1 & \text{if the set } \{F_{TU,j,k} \mid (j, k) \in P(T) \cap X(T)\} \neq \emptyset \\ 0, & \text{otherwise} \end{cases},$$

and $$f_2(x_1, \ldots, x_K) = 2 * \left\lfloor 0.5 + \frac{\left(\sum_{i=1}^{K} x_i\right)}{2K} \right\rfloor - 1,$$

which is the majority function with values 1/−1 if there are more/less 1's than −1's in the K inputs. The overall dual-input aggregation function is $$g(x, y) = \begin{cases} 1 & \text{if } x = 1, y = 1 \\ -1 & \text{if } x = 0, y = -1. \\ 0 & \text{otherwise} \end{cases}$$

These functions $f_1$, $f_2$, and g combine different feedback types to create a consistent QoE estimate $\hat{Q}(T)$ given any specific input data sets.

QoE predictions may also derive from QoS inputs in the absence of user QoE feedback by solving the following functional-optimization problem (which can still be considered as a type of supervised-learning method) to learn a functional estimator $f(\cdot)$ for use when Q(T) cannot be directly computed because of the lack of user QoE feedback:

$$\min_f g(d(Q(T_1), \hat{Q}(T_1)), \ldots, d(Q(T_N), \hat{Q}(T_N)))$$

$$\text{s.t. } \hat{Q}(T_n) = f\begin{pmatrix} P_{i_P,j,k}(\tau) \text{ for } \forall i_F, j, k \text{ and } T_{i_P,j,k}(\tau) \cap T_n \neq \emptyset, \\ X_{i_X,j,k}(\tau) \text{ for } \forall i_F, j, k \text{ and } T_{i_X,j,k}(\tau) \cap T_n \neq \emptyset \end{pmatrix}$$

where $X_{i,j,k}(t)$ is QoS data, d(x,y) is the distance between x and y that represents the prediction error and $g(d_1, \ldots, d_N)$ aggregates such prediction errors. Examples of such aggregation functions include counts of the number of errors larger than certain threshold, a mean-square function, a sum of such mean squared errors, and so on. A simple example of predicted/estimated QoE uses the same assumptions on user-preference and on QoS data as before, namely the pairs of ordered-pair indices set $$\{P(T_n)=\{(j_1,k_1), \ldots, (j_M,k_M)\}, X(T_n)= \{(j_1,k_1), \ldots, (j_N,k_N)\}\}$$

that represent the user preference and operational/performance data for time interval $T_n$. The QoS data then might include:

$X_{1,j,k}(T_n)$, the average packet-error rate of device j for service k during time interval $T_n$, and $X_{2,j,k}(T_n)$, the average delay jitter of device j for service k during time interval $T_n$, d(x,y)=x−y, and $g(d_1, \ldots, d_K)=\Sigma d_i^2$.

the optimization that finds the best QoE predictor $f$ is $$\min_f \sum_{i=1}^{N} (Q(T_1) - \hat{Q}(T_1))^2$$

such that $\hat{Q}(T_n)=f(X_{1,j,k}(T_n)$ for $(j,k)\in P(T)\cap X(T)$, $X_{2,j,k}(T_n)$ for $(j,k)\in P(T)\cap X(T))$.

When the above optimization problem finds the best $f$ among all linear functions, this implements linear regression. When $$d(x, \hat{x}) = \log\left(\frac{p_x}{1 - p_x} \cdot \frac{1 - p_{\hat{x}}}{p_{\hat{x}}}\right),$$

the best $f$ among all linear functions implements logistic regression, and $p_x$ is the probability that the QoE training data is good. In general, the learning may use different computer methods to find the best QoE predictor based on QoS data, given user preference.

Learning may also base the predictor on unsupervised learning methods in the case of rare (i.e., infrequent) user feedback data's availability. One example uses a multi-step approach with the same assumptions and notation as above:

Step 1 designates the QoS data vector as $$X_{i_n,j,k}=(X_{1,j,k}(T_n),X_{2,j,k}(T_n))$$

where $X_{1,j,k}(T_n) \forall (j,k) \in P(T) \cap X(T)$, and $X_{2,j,k}(T_n) \forall (j,k) \in P(T) \cap X(T)$.

In certain embodiments, the vector $X_{i_n,j,k}$ need not correspond to "label" or training data QoE $Q(T_1)$ from user QoE feedback, because that data is not available. Instead, the reinforcement learning training method uses unsupervised learning (e.g., training data is estimate of accumulated expected future QoE) such as clustering. The learning finds clusters of good $X_{i_n,j,k}$ using computer methods such as k-means. Designating $f_{i,j,k}$) as the clustering function that outputs the cluster index given any vector $\hat{X}_{i_n,j,k}$.

Step 2 finds the cluster(s) with highest proportion of feature vectors associated with bad QoE. Here, $X_{i_n,j,k}$ associates with bad QoE if there exist $Q(T_0)=0$ $f$ or $X_{i_n,j,k}$. The set of cluster indices is $C_{Q=1}=\{c_1, \ldots, c_q\}$.

Step 3: predicts the QoE for any feature vector $X_{i_n,j,k}$ as follows:

$$\hat{Q}(X_{i_n,j,k}) = \begin{cases} 1 & \text{if } (X_{i_n,j,k}) \in C_{Q=1} \\ 0 & \text{otherwise} \end{cases}.$$

The method continues to find clusters belonging to good QoE and modifies the prediction rule to include good QoE.

This is a simplified example. Many other clustering methods or un-supervised learning methods are also possible and may be used within the QoE estimator 350. These include, but do not limit to, Q-learning that uses a hidden Markov model (or state machine) to update the clustering performance in a recurrent manner where continuous user QoE estimates project into some infinite future time period over the possible future states and their presumed-stationary Markov probability-transition distribution. The probability distribution may update in time also at each step, while each step presumes that updated distribution is stationary.

Learned Reaction Data

Many WFH applications provide device/application-use indications and some layer-7-based packet-loss data; however, these WFH applications are independent of access connection. WFH solutions view these as active QoS data, and these applications typically do not account for the connection's affect upon application-user's QoE or ASC productivity metric in the WFH case. ISPs generally also fail to provide metrics that relate to worker-collaboration measures and application specific connectivity through the network.

Embodiments of the invention provide a QoE score (such as an ASC productivity score) that gives a company visibility into WFH employees/customers associated with specific ISPs. An example of such a metric is a WFH ISP-rank index or a QoE/ASC score in which data specific to an ISP is provided across a WFH network in which multiple ISPs are operating.

One example of such a metric comprises the following steps:

Step 1: Collection of an ISP's subscribers' WFH QoE or ASC scores from a plurality of their subscribers. (For example, WFH QoE or ASC scores can be categorical data with values from {good (=1), bad (=−1), unknown (0)}.)

Step 2: Aggregation of each subscriber's WFH QoE or ASC score over the specific time period of score measurement. For example, the aggregated metric might be the total time of poor WFH service QoE or ASC score (i.e., =−1) during a predefined period.

Step 3: Computation of a network wide aggregated WFH QoE/ASC score over a plurality of subscribers. An example is the percentage of subscribers with poor QoE (=−1) for longer than some specific time during the measurement period (say 1 day or 1 work week).

Step 4: Ranking of the ISPs according to their aggregated network wide WFH QoE/ASC scores.

In certain embodiments, this ranking may be geographically indexed for different service products (e.g., 100 Mbps downlink, 1 Gbps downlink, etc.). Ranking can therefore be filtered by geographical area, service product, and so on, prior to presentation for a more meaningful comparison. One skilled in the art will recognize that the filtering, categorization, specific metrics, and time may be adjusted in accordance with various embodiments of the invention.

WFH activities may also be associated with specific performance metrics. For instance, WFH QoE/ASC score versus usage intensity on per subscriber basis, possibly also indexed by time and geography. Some examples of such WFH performance metrics include (but not limited to):

WFH-intensity metric: WFH-intensity metric can be defined as WFH app use (e.g., WFH app use time/all apps' combined use time) during work hours. Application usage can be estimated based on network activity. Certain applications use the Internet when idle, while others do not. Each application's activity thus can correspond to use time above a certain (possibly learned) threshold. An application may be active not only at the time of network use, but also for the time interval between two consecutive network usages. This metric may be user sub-indexed.

WFH-distraction metric: WFH-distraction metric can be defined as non-WFH app use (e.g., video, game, social media app use time/all apps' combined use time) during work hours for a given user on a given or set of devices.

If the per-user metric is misleading or not possible, the cause may be another household member's video/game-application use. Therefore, the household size may be estimated based on the number of devices and the device/application usage levels estimated through simultaneous-use review to distinguish the worker from other household members. In some case, the worker mostly use a company issued device, which may allow easier determination of this metric. This metric allows for remote monitoring of employee time use.

WFH-collaboration metric: WFH-collaboration metric can be defined as WFH collaboration app use (e.g., WFH communication application-use time/total work hours) The communication application-use time can include video/auto conferencing, email, and VoIP from the employer's assigned telephone number. This measures whether the employee is more or less collaborative than other employees, which might be further related to employee function and position.

WFH-user impact metric: WFH-user impact metric identifies users most impacting the QoE of others and suggests where to apply connectivity resources to best improve the overall organization effectiveness. This metric allows the WFH system to prioritize participants within a WFH activity and, based on this prioritize, assign resources such as redundancy to participants to improve overall performance of the WFH collaboration.

Overall WFH metric; i.e., ASC Productivity metric: This is an aggregate metric (possibly learned) of the other WFH metrics, possibly filtered by time of day and other factors/parameters.

WFH productivity correlation metric (ASC productivity correlation metric): This metric could map the WFH score(s) to any of the below metrics:
  Number of calls processed by a call-center technician
  Number of deals closed (or total sales volume) by a salesperson
  Number of lines of software code created by a programmer
  Annual performance-review and/or pay-raise percentage
  Bonus earned
  Etc.

Labor-law compliance metric: Here the device/application use time is measured, reviewed, and compared to allowed time, with reporting to human resources or other appropriate authority. Risk of potential noncompliance may possibly be predicted as well.

WFH-network metric: This could be a Wi-Fi quality metric (e.g., Poor Wi-Fi working hours/total work hours). This metric may be filtered by the Wi-Fi problem source (e.g., coverage, interference, etc.) and possibly separated into uplink and/or downlink congestion and related to unstable fixed line connectivity. The Wi-Fi problem's correlation with other WFH metrics may also be of help in estimating productivity loss associated with poor Wi-Fi performance.

All the indices can be tabulated versus time to indicate use schedules. Consistent problematic (or excellent production) patterns that repeat, sometimes called ergodicities, can be learned and exploited to improve future productivity.

Analytic Result Delivery

Figure 4:
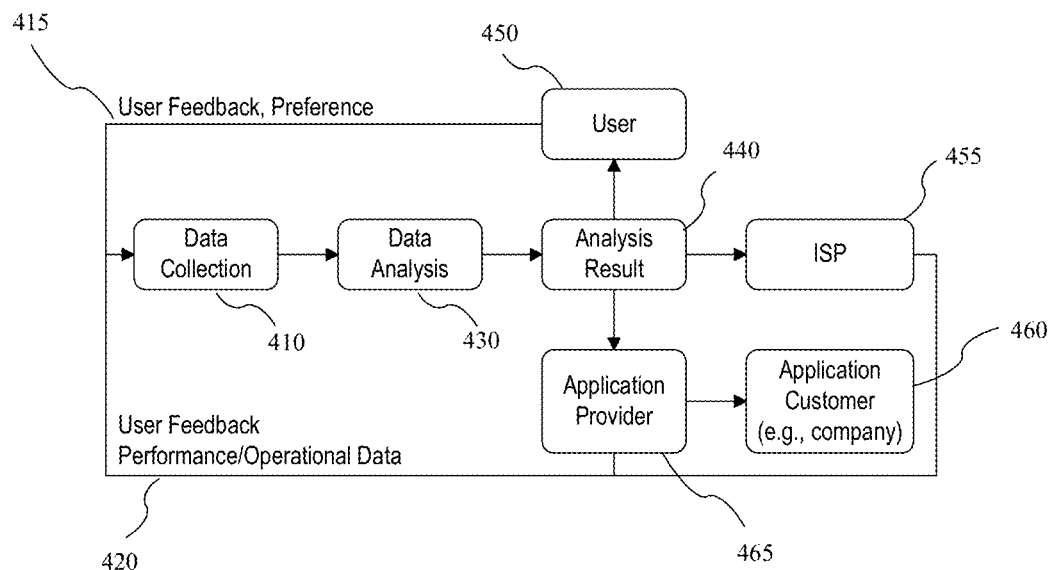
FIG. 4 is a method for the analytics' presentation, delivery and flow of feedback data within the system according to various embodiments of the invention.

FIG. 4 is a method for the analytics' presentation or delivery according to various embodiments of the invention. In certain embodiments, the method presents results of WFH data analytics to any, or all, of the users (consumers/workers), ISP, or application provider. Data collection 410 accepts and formats user feedback and preference 415 together with user feedback, performance, and operational data 420 from any, or all of the sources of data described above. In certain embodiments, this data may be filtered and reduced prior to storage and presentation. Note that one skilled in the art will recognize that the application provider and the company that uses the application may be different or the same.

Data analysis 430 receives the collected data and performs one or more of the data analysis process described within this application. This analysis may generate one or more of the metrics (including the ASC productivity metric) identified and discussed within this application. These generated metric(s) are then formatted in accordance with one or more of the preferred formats, as discussed within this application, and presented to a user 450, an ISP 455, an application provider 465 and/or an application customer 460 The method in which these results are provided may vary such that each entity may receive the results directly or indirectly (as shown in FIG. 4, where the application customer receives results from the application provider). Feedbacks 415, 420 may then be updated; for example, with a new user preference or new operational/performance data over time, and the new feedbacks will then be collected by the data collection 410 block.

The application provider may adjust its audio and video compression schemes to match the user's available throughput. Certain implementations allow such adjustments and may in fact attempt them in real time, while others may allow historical performance to be appropriately added to the decision process on such dynamic matching of the compression scheme to the expected throughput. In particular, applications will not have access to connection performance when they are not active, but the server 270 would have such data and may extract its consistencies and use them. This allows a consequently more consistent QoE to be administered over sessions and during any individual session, resulting in a higher ASC productivity score.

The application may elect also to suggest/disable video if all available bandwidth is needed for good audio QoE alone. Situations where quality is so poor that other WFH indices and ASC scores would be unacceptably low can be flagged and a recommendation for rescheduling of the call may be provided.

A distribution channel for the performance improvements may be the application provider, but by sharing joint analytics with both the application provider and the ISP, it may also be beneficial to the ISP. This improvement may alleviate ISP's trepidation on the shared network-performance reporting and mapping. Alternatively, the ISP may be the application provider itself in certain embodiments.

Dynamic Network Improvement—Self and/or Proactive Help

Dynamic improvement adapts tunable control parameters to improve QoE or ASC metrics according to various embodiments of the invention. These parameters can be, for example, $S_{i,j,k}(t)$. A policy specialized for a preferred service category may dynamically improve the profile as a function of the internet-connection-supported applications'/devices' QoE; for example, improvement of the actual QoE data $Q(T)$ or the estimated QoE data $\hat{Q}(T)$. This improvement, emphasized in certain embodiments, with particular focus on the WFH application and the ASC metric as the utility measure are described in detail below.

The improvement may occur at many layers of the OSI stack. The ISP usually provides its services over layers 1 to 4, while WFH application providers' services usually use layers 4 to 7. The demarcation between ISP and application provider is not always clean or definitive, and either or both may attempt to provide all 7 layers. Improved profiles may specify control parameters at any, a combination of, or all layers. QoE is usually measured at higher layers while most QoS parameters characterize lower layers, with certain exceptions recognized by one of skill in the art. In one example, this relationship may be exploited by connecting the layer 7 QoE feedback data $F_{i,j,k}(t)$, or its estimates $\hat{F}_{i,j,k}(t)$, and/or the estimated QoE data $\hat{Q}(T)$ to the improvement of lower layers' profiles $S_{i,j,k}(t)$. Resulting improvement methods may use this relationship to improve the WFH application's QoEi or ASC metric, examples of which are provided below.

Figure 5:
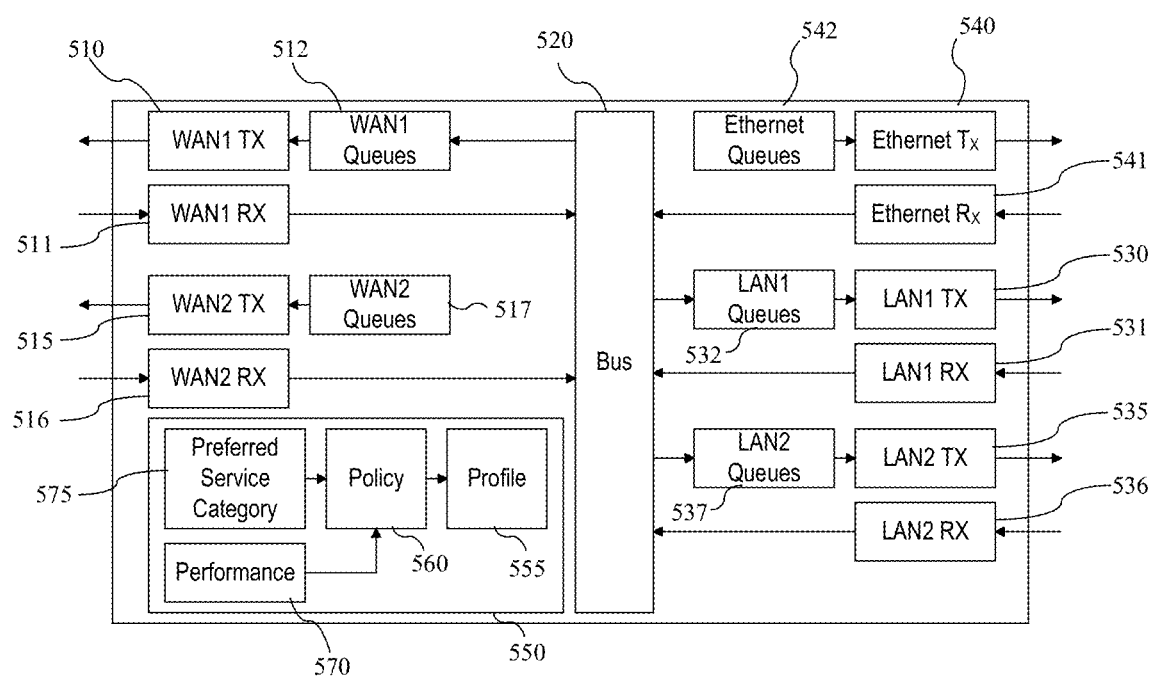
FIG. 5 generically depicts a home gateway that physically sits at the entry or demarcation point between the ISP's to-the-home service and the in-home network in accordance with various embodiments of the invention.

FIG. 5 generically depicts a home gateway 283 that physically sits at the entry or demarcation point between the ISP's to-the-home service and the in-home network in accordance with various embodiments of the invention. The ISP's service often includes supply of the gateway, and this gateway may have local-area-network (LAN) capabilities for Wi-Fi and/or Ethernet connections to the home's application devices. In this ISP-supplied-gateway example, the ISP provides the service to the device(s). In other examples, certain homeowners purchase retail gateways, and then another ISP may provide the in-home service. Such customers often connect their separate retail box to the ISP-provided gateway, but the retail box then provides the in-home device connectivity, usually via a Wi-Fi AP from the retail box.

Referring to FIG. 5, first WAN Tx 510 and Rx 511 interfaces with a first wide area network with a first WAN buffer (Queues) 512 stores data prior to being transmitted on the first wide area network. A second WAN Tx 515 and Rx 516 interfaces with a second wide area network with a second WAN buffer (Queues) 517 stores data prior to being transmitted on the second wide area network. Network management across the first and second WANs is provided by at least one ISP.

A bus 520 interfaces the WAN interfaces with the LAN and Ethernet interfaces. As shown, first LAN Tx 530 and Rx 531 interfaces with a first local area network with a first LAN buffer (Queues) 532 stores data prior to being transmitted on the first local area network. A second LAN Tx 535 and Rx 536 interfaces with a second local area network with a second LAN buffer (Queues) 537 stores data prior to being transmitted on the second local area network. An Ethernet Tx 540 and Rx 541 interfaces with an Ethernet network with an Ethernet buffer (Queues) 542 stores data prior to being transmitted on the Ethernet network.

A WFH software agent 550 allows the WFH architecture to monitor network connectivity issues and metrics as well as employee activity on the network. In certain embodiments, profile prioritization 555 stores, analyzes and improves traffic using profile information, a policy module 560 stores and analyzes policy information which, in certain embodiments receives performance 570 and preferred service category information 575.

FIG. 5's two WANs may correspond to the same ISP who provides, for instance, both a fixed-line connection and a wireless cellular (or fixed-wireless access) connection to the home, but different ISPs are also possible. In FIG. 5, where two different ISPs provide the WAN backhauls to the home gateway, there can be many different combinations, including but not limited to, two separate DSL connections, one DSL connection and one cable-modem connection, one PON connection and one cable-modem connection, one DSL connection and one wireless cellular connection, etc. Multiple-WAN-interfacing functionality need not be fully present physically nor virtually in a single box (or software-defined equivalent thereof). The ISP, for example through the assistance of a server 270, may inform the gateway of the relevant in-home and to-the-home profile settings to use. The gateway may request alternative profiles or reject profiles that it cannot (or does not desire to) implement. The server 270 directly improves the profiles or sometimes supplies improvement policy to a supportive gateway. The gateway may share WAN connectivity between multiple networks (such as two different residential structures, condominiums and/or apartments) to allow WFH users to have the benefit redundant WAN backhaul connectivity.

Bus 520 connects the various queues' WAN packets to/from the local area networks (LANs) that may be wired or wireless. In certain examples, the gateway's bus 520 may be an Ethernet switch that aggregates/de-aggregates such traffic. The Ethernet layer 2 packets will contain the (at least) 6-bytes-each source and destination medium access control (MAC) addresses that are unique to each connected device. In certain optional embodiments under IEEE standard 802.1Q, four additional VLAN (Virtual LAN) bytes after the source/destination MAC fields contain an identifier for a subnet. Applications such as IPTV and VoIP may use a dedicated subnet; thus, VLAN byte is often unique to the application carried on the LAN. This identifier is known as a VLAN tag. In combination, this allows unique identification of source, destination, and type of flow. One skilled in the art will recognize there are other methods in which devices within a LAN or Ethernet network may be identified using embedded tags within a data stream.

In certain embodiments, the wireless LAN (or WLAN) is Wi-Fi in either or both of the 2.4 GHz and the 5 GHz, or in the future other newly arising Wi-Fi in 6 GHz. In other embodiments, the wireless LAN may be one of Bluetooth or Zigbee wireless alternatives as well. In yet other instances, it can be a small cell (e.g., femto, pico and 5G) network supporting low-power cellular in-home connectivity. As previously shown, there are also queues to/from the LANs that prioritize certain application's data to/from the in-home devices, again potentially useful for WFH application prioritization, and thereby able to improve the ASC productivity metrics.

Both WAN and LAN queues can be physically timed and stored in memory, and they also can correspond to the use of different frequency bands, different channels within those frequency bands, different spatial streams simultaneously from multiple memories or paths, etc. These queues introduce connection delay or latency. Some applications tolerate delay better than others, which can also be important in network improvement or optimization. Furthermore, delay tolerance can also be a function of the queue's size or depth (overflowing a queue leads to data loss).

Network improvement may dynamically change the profile consisting of various network component configurations. Again, the profile $S_{i,j,k}(t)$ may have many possible configurations possible for each of many users (human and/or machine), devices, and applications that share the WAN and LAN links. For example, a Wi-Fi channel may be ideal for a user in the living room, but this same Wi-Fi channel's use may interfere with signals to another Wi-Fi user in the kitchen. Therefore, the best configuration often prioritizes the most mission-critical application/device while maintaining reasonable communication quality with the rest.

In certain embodiments, profile prioritization 555 considers at least one or more of the following: (1) best prioritization policy; (2) devices, users, and/or applications that may need prioritization, including to improve ASC productivity metrics; and (3) communication subsystem configuration in prioritization. Prioritization may occur in many OSI layers across many different network sub-systems. For example, an ISP may prioritize profile parameters in layers 1 to 4 in their equipment configuration (sometimes called provisioning).

To improve the in-home network further, the software agent 550 inside a home gateway 283 collects data and manages configurations according to the preferred service category 575 and the policy 560. The agent 550 may also permit direct WFH imposition of a profile 555. The agent 550 can improve network conditions through the following steps in an example embodiment:

The first agent workflow step collects QoS performance and operational data $X_{i,j,k}(t)$. This data collection may be periodic or event driven. Data collection event triggers include a data use change, a service profile change, users'

QoE feedback, etc. The agent 550 may use different collection intervals or event triggers for different data types. If the agent 550 connects directly to a UI, the agent may collect user preference $P_{i,j,k}(t)$ or user QoE feedback $F_{i,j,k}(t)$. The server's policy guides this data collection step in certain embodiments.

The second agent workflow step collects the permitted service profile set $S_{i,j,k}(t)$. The server 270 may recommend the preferred service category after either receiving the user's direct preference through the UI or automatically through service category prediction. When the policy permits the agent to predict the preferred service category based on the performance and operational data, the agent 550 may determine the preferred service category under the server's ASC policy. Alternatively, if the agent 550 connects to the UI, the agent may procure a user preferred profile directly.

The third agent workflow step applies the policy 560 associated with the preferred service category to improve the profile 555. This policy 560 may include various trigger conditions for different profiles' applications.

The fourth agent workflow step monitors system performance, and the agent 550 may use the system performance to trigger re-profiling. Embodiments can estimate the preferred service category's ASC metric periodically to monitor the prioritized applications'/devices' performance. Embodiments may also estimate other service categories' QoE periodically and monitor the de-prioritization's performance degradation for possible UI display. The server 270 may be responsible for estimating ASC metric based on historical data and then recommending profiles or policies to the agent for implementation.

Finally, the agent 550 updates the preferred service category if it receives a new preferred service category 575 or if current preferred service category 575 is no longer desirable. For example, a user can select another service category or disable current preferred service category using the UI, or the agent can switch the service category 575 to another one if the current service category has expired. For the latter, the next service profile 575 may have been specified by the user when current service profile has started or by computer implemented methods described herein.

Figure 6:
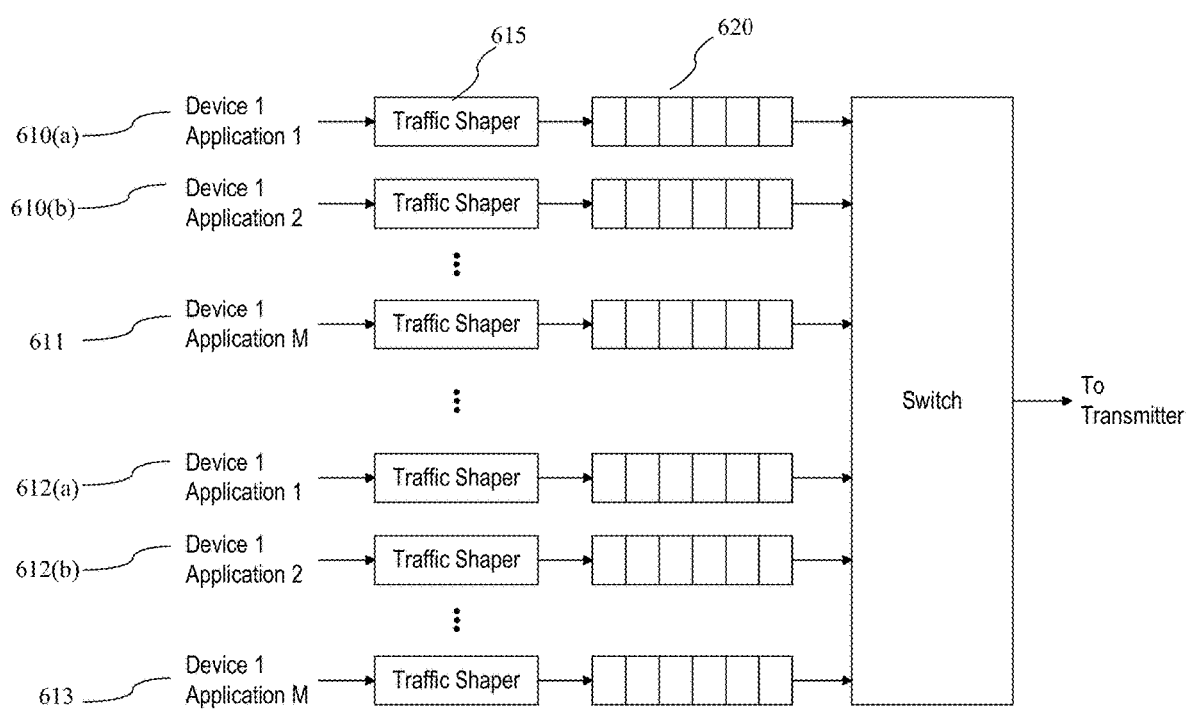
FIG. 6 illustrates a structure to differentiate device and/or application flow and management according to various embodiments of the invention.

To differentiate the devices' and/or applications' QoE, the transmit queues or "buffers" may use priority queues illustrated in FIG. 6 in an example embodiment. Priority queuing provides each device within a home network at least one application queue 610-613. Priority queueing routes packets from different applications and/or devices to different queues and then outputs these according to the priority. Each queue may additionally include a traffic shaper 615 that may limit that queue's input and output data rates. As mentioned above, some priority queues 610, 612 may themselves partition into several queues with different priorities, and the packets from high-priority device or applications pass more quickly through the high-priority queue. In certain embodiments, the queue may implement active queue management (AQM), which preemptively drops packets to prevent congestion or excessive buffering within corresponding buffers 620. Certain gateways may support AQM methods, such as, Random Early Detection/Discarding (RED) that drop packets selectively before the queue is full and controlled delay (CoDel) that limits the delay that prioritized packets may remain in queue.

In certain embodiments, home gateways may prioritize certain applications or devices based on a WFH situation. For example, a WFH user might mandate a WFH tool or application in the associated preferred service category to be prioritized. The server's policy and profile improvement then prioritize profiles for the corresponding WFH application and device. The policy also may specify how to detect and associate the WFH device and application with the preferred service category. The profile further allows prioritization to be implemented within different home network subsystems. For example:

WAN profile can improve WFH applications fail-over only to associated WFH applications and devices.

LAN profile can assign WFH applications and devices to the best QoS paths/links; this may include improving Wi-Fi spatial streams and associated beamforming to better serve the WFH device.

WFH applications' data may be input to higher priority queues.

After prioritization, the WFH system monitors the WFH QoE data (or ASC metric) directly or with the estimated QoE. Learning methods then improve prioritization for best QoE or ASC score. This prioritization may also depend on user preference data or data described herein that may be used to improve one or more network connections or metrics. QoE monitoring of lower-priority applications and devices also maintains improvement's impact; such that, these lower-priority applications and devices experience minimum performance less while retaining acceptable or best ASC score.

Application and Device Prioritization

In certain embodiments, application and device prioritizations typically exist even above Layer 7 and can assist ASC productivity optimization or improvement, or more generally, QoE, optimization or improvement. Different applications may have different network usage behavior. Certain multimedia applications may use non-standard TCP/UDP ports instead of standard ports such as TCP:443 port for HTTPs. In accordance with certain embodiments, particular equipment can detect these applications' message flows based on the communication port use and may thus use WFH provided policy to prioritize some of these flows. Other applications may use standard ports, but they may create different use patterns that are detectable. For example, non-real-time video streaming applications use more downlink than uplink bandwidth, whereas video conferencing applications often exhibit similar bandwidth usage for uplink and downlink. Additionally, some applications may be identified by their IP-destination address. server 270 policies then may direct equipment to prioritize based on port number, usage patterns, or IP addresses.

Layers 2-4: Flow Prioritization

The flow prioritization described in this section may be used instead of or in addition to the application and device prioritization described in the previous section.

OSI layers 2 to 4 packet header information allows traffic flow identification and can be used to optimize or improve prioritization on different communications links. Profiles can dynamically specify various layer 2 to 4 parameters to prioritize or optimize or improve the ASC metric. FIG. 7 illustrates flow identification possibilities within a home gateway. In this Figure, device types 710, media ports 720 and DSCP/WMMMs 730 are configured to support specific flows across a variety of WFH applications 740. One skilled in the art will recognize that there are numerous combinations that can be implemented to support different flows and network performance and associated metrics. Examples of consideration points in determining flow prioritization are given below:

Layer 2 traffic flow type identification may use the VLAN tag because applications such as VoIP or IPTV often use a dedicated VLAN. In addition, certain Ethernet flows allow in-packet header specification of one of 8 priority levels, using IEEE Standard 802.1p CoS (Class of Service), which can identify traffic type, as well as possibly permit WFH packet flows' prioritization (specified or changed in route, for instance, at the gateway).

Layer 3 IP packet headers may contain a Differentiated Service Code Point marking that depends on the packet types. This marking can flag applications, such as VoIP or streaming video, if detected in any link to the end device. A gateway WAN or LAN queue can then prioritize such WFH packets accordingly.

Layer 4 processing may use certain special TCP/UDP ports for media (voice/video) delivery, allowing application identification by port number.

Consequent to the identification, a traffic flow's prioritization can thus occur in Layers 2 to 4 in certain embodiments. Home gateways provide priority queues where the TCP/UDP port number or the DSCP marking permit priority determination. ASC optimization/improvement policy can direct this priority's re-marking. For example, Zoom voice packets' prioritization adds UDP ports 8801-8810 to the supporting gateway's (or router's, more generally in the network) high-priority list.

DSCP re-marking can find use in the priority queue and also in other communication sub-systems. For example, routers with Differential Service Protocol capability prioritize packets with high-priority DSCP marking, and the supportive Wi-Fi gateways can send first these packets in the home before lower priority traffic when Wi-Fi Multimedia is enabled in Wi-Fi gateway. The IP header's DSCP marking can determine this prioritization, which the application commonly sets, and the recommended profile incorporates, if the application supports WFH-management-reprofiling's policy and uses such DSCP marking. However, the gateway can also re-mark the DSCP priority even without the application's support. For example, a gateway may re-mark DSCP 54 for a certain non-audio traffic for time-sensitive, remote-control applications to minimize the control delay. Additionally, to support faster DNS look-up for prioritized applications, the gateway's local host file can add prioritized servers' IP addresses.

WAN interface optimization or improvement can also prioritize a data flow to optimize or improve network performance and associated metrics. Referring to the example in FIG. 5, home gateway may connect to 2 WANs, such as DSL as the main broadband service and a metered LTE as a back-up. When the main broadband service's performance degrades, fail-over can redirect high-priority device's/applications' packets through the back-up LTE link. These packets can also pass through both WANs 510, 515 to increase prioritized application's overall data rate. The consequent multi-path transmission may dynamically use one or more estimated ASC metrics through the server's direct reprofiling, or through policy specification that enables immediate profile change upon the WAN's router's contention sensing. This multi-path control prioritizes the routing within a 2-WAN mesh network. If the WAN additionally supports multiple network slices and the poor QoE or ASC metric results from the current network-slice choice, then the high-priority devices'/applications' packets may switch to another higher-priority slice as a function of the measured WFH QoE or ASC metric. For example, if the WFH QoE or ASC metric that is consequent to a slice (e.g., Enhanced Mobile Broadband) use that is lower than a threshold, the WFH packets may dynamically switch to a different slice such as an Ultra-Reliable Low Latency Communications slice.

The WFH QoE or ASC metric improvement from WFH devices' and applications' prioritization may also arise from less important applications'/devices' de-prioritization. Some WFH user's other home applications/devices need no priority to maintain that user's acceptable WFH QoE or ASC metric. Typically, highly interactive applications need priority and non-interactive applications may safely reduce priority to improve the interactive applications' performance. For example, cloud-storage applications' simultaneous de-prioritization during a video-conferencing session can improve an ASC metric or other-related network connectivity metrics, even if both cloud-storage and video-conferencing applications nominally have high priority. In addition, de-prioritization of some non-WFH applications/devices; such as, gaming and game consoles, can improve ASC metrics and other related network connectivity metrics. In certain embodiments, de-prioritization and prioritization can use the same reprofiling except with packets' reassignment to the lower-priority queue or the lower-priority WAN/slice. In addition, traffic shapers 615 can apply a strict throughput limit on deprioritized devices.

Layer 1-2: Signal Level Improvement

The signal level improvement described in this section may be used instead of or in addition to the application and device prioritization and/or the flow prioritization described in the previous sections.

Profile optimization or improvement can also prioritize applications and devices at OSI Layers 1 and 2 to improve ASC metrics. In certain embodiments, Layer 1 and 2 profile optimization or improvement provides opportunities to prioritize different applications and devices because there is typically not a universal communication signal that can best serve all applications. As such, layer 1/2 profile choices intrinsically consider the specifics of the link, application, and device. For example, a long coding delay may stabilize a DSL link at the cost of increased latency. Such delay may have little consequence for one-way streaming video, but it may degrade interactive video conferencing. Wi-Fi interference may differ within the home, so selecting a channel with less interference for one device may increase the interference for another device.

A particular device's or application's QoE may be highly sensitive to Layer 1 and 2 profiles settings. WFH application providers may consider such optimization or improvement as a way to improve their products' user QoE or ASC metric, even if the issue is in the network, because a competitive application provider who does address this Layer 1/2 QoE or ASC metrics effect will consequently have a better product take rate as well as a better customer retention rate. In other instances, two relatively higher prioritized applications may be operating concurrently across different users within the same household or network. For example, a household may have a first user engaged in WFH activity, such as a videoconference, and a second user engaged in online education. Embodiments of the invention may learn to improve prioritization across these two applications based on different, yet competing ASC metrics such that the overall performance of the shared network is improved.

The following examples suggest possible prioritizations of Wi-Fi's physical or PHY layer (layer 1) and the MAC layer (layer 2) for different applications/devices:

Channel Selection: Wi-Fi can operate in 11 different channels in the 2.4 GHz band that IEEE 802.11b/g/n/ax standards specify. These different channels can have different propagation, and particularly interference, characteristics. The interference characteristics depend on location and proximity to other Wi-Fi systems (e.g., a neighbor's Wi-Fi). A Wi-Fi AP can measure (through IEEE standard 802.11k specified measurements) connectivity and related information to all devices, and this becomes part of the QoS performance data. This data's careful evaluation then permits channel selection through profiles that best support most (though possibly not all) devices with reasonable performance. Wi-Fi-device applications' prioritization can affect this profile selection as well. For example, if there is no clear best channel, the Wi-Fi spectrum-optimization or improvement reprofiling can instead select a channel with the least interference for the profile's prioritized WFH device. The optimized/improved profile policy then reserves this selected channel by creating more traffic in this channel so that a neighbor's Wi-Fi management Dynamic Frequency Selection (used to avoid existing licensed spectra, like satellite signal bands, that may vary with user jurisdiction, so the Wi-Fi system will avoid a heavily used channel because DFS presumes that channel is protected) will then avoid this channel. Similar advanced Wi-Fi systems, such as Wi-Fi 6, also have "coloring" schemes that allow otherwise independent APs to agree to use their own "colors" (i.e., frequency channels). Profile settings also can manage these colors.

Band Steering: Some WLANs can use any, some, or all of the 900 MHz, 2.4 GHz, 5 GHz, and 6 GHz bands, with conventional Wi-Fi today largely in the 2.4 GHz and 5 GHz bands. Furthermore, some support multiple bands and then the server 270 can steer devices to use certain bands through re-profiling. Typically, the band-steering profiles are such that each device uses a different band. Instead of prioritizing certain device, QoE profile optimization or improvement can also move the remaining devices to share a different band so that the prioritized device(s) no longer competes for its assigned band's usage. A new profile could prioritize a device that only uses 2.4 GHz because this band performs better at that device's longer distance from the AP than would higher-frequency 5 GHz band. The other devices/links optimized/improved profiles might then all have profiles that specify the 5 GHz band. Band-steering can be generalized within a band to channel steering, particularly within the 5 GHz band that has many channels, or within the new 6 GHz band that has even more channels. As a result, one radio can be dedicated to the prioritized device(s) through the profiles selected.

Bandwidth: Many Wi-Fi APs today can support up to a 160 MHz-wide individual-channel bandwidth. More narrow choices of 20 MHz, 40 MHz, and 80 MHz are also possible. A wider bandwidth however spreads the available power over a wider frequency spectrum. Using wide bandwidth can improve the data rate, but it can also become more vulnerable to the interference and coverage issues through the power spreading, as well as a larger probability of overlap with other uncoordinated Wi-Fi systems. This option trades off between rate and reliability. This trade-off can be used to prioritize applications/devices through the optimized/improved profiles' specification of channel bandwidth. For example, an optimized/improved profile could manage an AP to reduce its bandwidth from 160 MHz to a best 20 MHz channel if the prioritized device requires stable high reliability. Any single 20 MHz Wi-Fi channel without interference is more than sufficient to support high quality voice and video for a WFH videoconference.

MIMO: Wi-Fi systems can support different MIMO (Multiple Input Multiple Output) configurations; such as, spatial multiplexing, space-time coding, transmit beamforming, etc. To prioritize the application that requires high reliability, Wi-Fi profile optimization or improvement can select MCS space-time profile parameters to improve reliability at reduced transmission rate, essentially through redundancy spread across the multiple transmission links virtually created by MIMO signal processing, which are often called spatial streams. Wi-Fi profile optimization or improvement thus can specify multi-user MIMO (MU-MIMO) profiles that assure best performance for the prioritized device. Multi-User can direct spatial streams independently in the same frequency band to devices in different locations. These different device locations can receive different power in their spatial beams (as the sum of all transmit beams' power is the only constraint). A prioritized WFH application's device can have a profile that allocates more power to it than to other lower priority devices.

Mesh Routing: A Wi-Fi mesh comprises of one or more mesh nodes (or mesh points, MP) that relay packets between the AP and the devices. Mesh points are similar to "Multiple Access Points" (MAPs), where the MAP may assume the responsibility of being a master access point. The MPs or MAPs may use overlapping channels and thus cause interference between them. When a prioritized (WFH) device connects to an MP, the other MPs' profiles may reduce their transmit power or may specify a different channel's use to prioritize the AP to/from WFH-device link. If the prioritized device requires very low latency, the optimized or improved profile may cause this device to connect to the AP with its maximum power, bypassing rest of the mesh.

Airtime fairness: Airtime fairness is a feature in WLAN APs that assigns different resource use to devices or SSIDs which may depend on the location and need of the device. In certain instances, the fairness setting may be dynamically set. This can occur in Wi-Fi MAC management or in cellular systems' scheduler. In general, this penalizes a device that is far from the AP or that has an older version of Wi-Fi chipset that cannot support very high-speed transmissions because the transmission speed is low for such devices. If the device that needs to be prioritized is at such low speed locations, airtime fairness can provide profiles that allocate more time to prioritized devices. Alternatively, the profiles may disable other devices to prevent them from further reducing the transmission speed and degrading the prioritized devices' QoE or ASC metric.

Many wireline communications offer similar PHY/MAC profile configuration that can prioritize different devices and applications. For example, DSL systems allow a profile to specify the interleaver depth and FEC coding rate. Additionally, DSL profiles can specify margin and power back-off parameters to enable the trade-off between data rate and reliability, as well as reduce power from crosstalk generating connections. If the prioritized applications require low latency, these codes' profile configurations can be set to reduce the latency. In cable modems, an uplink scheduler can specify a service profile that prioritizes certain applications through an associated queue filter, which is a set of rules that classifies the packets. The filter may use source/ destination IP address or port number and may be part of a cable modem configuration.

Layer 4-7: Application Improvement

The application improvement described in this section may be used instead of or in addition to the application and device prioritization and/or the flow prioritization and/or the signal level improvement described in the previous sections Optimization or improvement may also adapt application profile's parameters; such as, video frame/bit rate and/or audio bit rate to improve WFH applications' QoE or ASC metrics. There are a variety of ways to adapt the application profile using performance/operational data, two of which are provided below.

In a first example, WFH/ASC optimization or improvement may indirectly exploit the application's configuration adaptation rules through profile settings. WFH application prioritization results from non-WFH applications' de-prioritization. Many non-WFH applications use application layer (layer 7) adaptation rules that react to lower layer network performance degradation; such as, excessive delay or packet losses. When WFH QoE or ASC metrics start to degrade, these non-WFH applications' rules can inject delay into, or delete data from, their application server queues.

Inducement of this delay injection may occur through reprofiled layer 4 traffic shapers that lower the non-WFH input queue's data rates. This lowering occurs through the server's re-profile instruction to a cooperating AQM to drop some non-WFH packets. As a result, the non-WFH application's layer 7 response lowers its frame rate and/or bitrate; thus this induced non-WFH action frees useful bandwidth for the WFH application. Similarly, when the server 270 anticipates degraded communication performance for a scheduled upcoming video conferencing session, the WFH video conferencing application's new profile can then implement this non-WFH spoofing to provide consistent quality for the upcoming WFH video conferencing session.

In a second example, an application profile method directly adapts the profile for the WFH application. Through its historical QoS application performance data collection, the server 270 anticipates certain recurrent network environments and thus proactively supplies a correspondingly optimized/improved application profile. Other QoS performance data (typically at lower layers) can augment the historical upper layer data so that the resultant WFH profiles or policies improve the application server's video and/or audio encoders or alter/enlarge its set of available profiles to the server 270 for consideration and use.

The server's computer methods can predict a home network's expected throughput/delay based on previous WFH sessions' observed QoE and/or QoS consistencies (i.e., QoS may also be predicted based on past observed QoE and/or QoS in some embodiments). The server's profiles and policies can correspondingly set the frame rate and bit rate to levels that reduce future WFH application-use degradation. If the server 270 predicts an upcoming scheduled session's home network quality degradation, the application profile could specify SD video instead of HD video. This SD-for-HD profile substitution may occur because the WFH learned previously that the WFH user is less likely to be unproductive with SD video than with disrupted HD video. Another WFH re-profiling opportunity occurs when the home network's QoS performance data include a WFH-prioritized device list. In this use case, the server's profiles can update the application's configuration to use the prioritized ports in the layer 4 RTC headers or layer 7+ webRTC commands. Similarly, the WFH optimization/improvement system can provide the port list. The home network QoS performance data can also include problem alerts that lead to WFH profile imposing solutions; such as, connecting audio via phone service instead of Internet voice.

Neighborhood-Level Network Improvement

The neighborhood-level network improvement described in this section may be used instead of or in addition to the application and device prioritization and/or the flow prioritization and/or the signal level improvement and/or the application improvement described in the previous sections.

Figure 8:
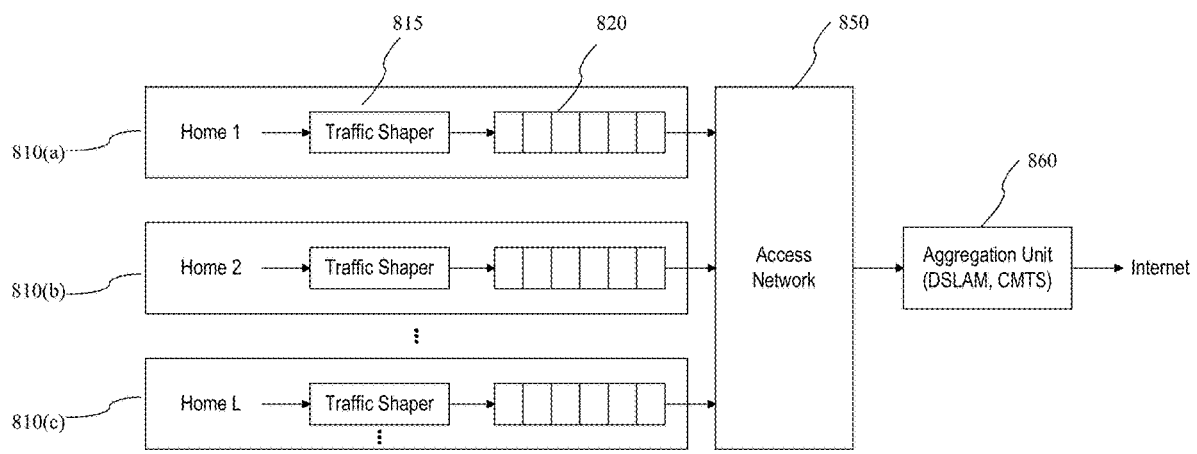
FIG. 8 illustrates a neighborhood uplink network access architecture according to various embodiments of the invention.

FIG. 8 illustrates a neighborhood uplink network access architecture according to various embodiments. This figure illustrates that many households may share a neighborhood's physical access medium. Examples include cable modems, wireless backhaul systems, or PONs. A plurality of access lines 810 are provided with each having corresponding traffic shaper 815, and 820 buffer that interface with the access network 850. The network access may couple with the Internet/public network via an aggregation unit 860 such as a DSLAM or CMTS.

The different households' traffic may be scheduled. As illustrated in FIG. 8, the aggregation unit 850 (e.g., cable headend or PON OLT) collects and schedules uplink communication demand from network termination points that connects the customer's home network to an ISP's line, which may result in scheduling delay. Consequently, the aggregate uplink channel 810 may become congested, which reduces individual lines' uplink capacity. Moreover, many access networks offer lower uplink rate than downlink rate that often causes an uplink buffer bloat problem more frequently in WFH's more likely symmetric bandwidth application use.

These uplink problems traditionally have been addressed by two methods: scheduling or AQM. Uplink schedulers monitor the queue length and/or flow's priority and accordingly assign the service flow's uplink bandwidth with longer queue and/or higher queue-exit priority. In the architecture shown in FIG. 8, this assignment occurs through feedback to the aggregation unit 860.

In another method, AQM can drop packets when it expects excessive queueing delay for certain service flows. The queuing delay is QoS-performance data, but it may not be accurate because of burstiness and time-varying nature of other households' uplink traffic. Inaccuracy increases when the uplink congestion occurs in the shared link. Thus, the use of AQM may penalize its lower priority neighborhood line/service flows so that the prioritized line/service flows will occupy the vacated bandwidth.

To prioritize certain WFH (or other mission-critical) applications or lines, the server 270 may re-profiles the shared-lines' uplink queues dynamically. For example, optimized or improved WFH profiles can reconfigure DOCSIS 3.1 cable modems' to different links to prioritize different service/lines through DOCSIS-3.1-supported AQM, which provides at least the following tunable parameters: enable/disable AQM per service flow, per-flow latency targets, and per-flow buffer sizes. Consider when WFH line/service flow's QoE is low, AQM can then shorten a non-WFH service flow's target latency to initiate more aggressive non-WFH packet dropping. Simultaneously, AQM actions can initiate TCP flow control to reduce TCP flow rate for the affected flow. Alternatively, if similar prioritization occurs instead in the uplink scheduler, TCP flow control will not be triggered until a buffer overflows, so the uplink latency for the de-prioritized user will continue to increase. Therefore, the WFH's AQM optimization/improvement likely maintains better QoE for all connections, even those deprioritized. In general, uplink prioritization can be better managed by jointly optimizing/improving all links.

In certain embodiments, a WFH location may have multiple uplink queues that can support network uplink connectivity. For example, a dual uplink queue may have a WFH queue and a best effort queue. At a neighborhood level, prioritization between queues may be supported such that WFH queues may be serviced first and then best effort queues follow. This queue prioritization may be under control of the service provider and allows the service provider to sell a differentiated service to consumers.

Preferred Service Category Identification

WFH service QoE or ASC network profile optimization or improvement associates the preferred service category with the applications and devices. Many households may use the same WFH application, so the WFH-application QoS data may consequently have shared values. However, each household's WFH devices may need identification because they may also be used for other applications.

Collaborative household users may provide the WFH device list as user preference data $P_{i,j,k}(t)$, where the boldface is used because there is a neighborhood of such data (or a data vector instead of a data point). Similarly, QoS data $X_{i,j,k}(t)$, profiles $S_{i,j,k}(t)$, user QoE feedback data $F_{i,j,k}(t)$ also become vectors. The server 270 then becomes vectored for the WFH users' neighborhood. The quality function may still be a scalar for the neighborhood, but there can also be individual quality functions applied. The vectored WFH system then applies vector profiles $S_{i,j,k}(t)$ that best optimize or improve the overall WFH situations. This can lead to better QoE for all the users than if each individual user performs independent, individual optimization/improvement. However, such vectored user preference data $P_{i,j,k}(t)$ may not initially be available, or user-provided lists may become obsolete. Instead the vectored server 270 can estimate device type probabilities based on other network WFH devices' statistics among similar situations and/or within the vectored neighborhood. For example, laptops are commonly used for WFH; however, a household user may use the same or different laptops for remote learning and/or other applications. Therefore, the WFH server 270 can run a computer process on other more easily collected QoS performance data to identify devices that are used for WFH and those that are not.

FIG. 9 shows a simple example computer process that identifies the WFH devices based on the following user preference and QoS operational data. In this example, a plurality of devices 910 are analyze in respect to (1) whether the WFH device type is confirmed 920, (2) the probability the device is used for WFH 930, (4) the probability an application is being used 940, (4) a mathematical operation (e.g., multiply) combining the two probabilities into a single value 950, and (5) an analytical conclusion whether the device is currently a WFH device 960. One skilled in the art will recognize the values illustrated in FIG. 9 are for illustration purposes only and a variety of different values and variable may be employed:

User's device type input within user preference 920
Network/region wide WFH device statistics, such as a laptop's probability of being a WFH device.
Application usage per device.

The following explains the mathematical process illustrated in FIG. 9:

$P_A$ is the probability that a household device uses WFH applications 930. The server 270 estimates $P_A$ from network-wide WFH-device QoS data statistics, per device type or individual device model. The probability can be computed as $$P_A = \frac{N_1}{N_1 + N_2},$$

where
$N_1$ is the device model's (or type's) number of WFH appearances in the user-preference data.
$N_2$ is the device model's (or type's) number of non-WFH appearances in the user-preference data.
$P_B$ is the probability that a household's specific WFH-supporting device is active for the WFH purpose 940, which can be computed as $$P_B = \frac{T_1}{T_2},$$

where
$T_1$ is the time duration when the device has at least one WFH application active.
$T_2$ is the time duration when the device was active or connected to the network.
If a WFH application cannot be detected, $T_1$ can be estimated by subtracting non-WFH use time when the device was used for known non-WFH applications; such as, playing a game, streaming a video, downloading files using Bit-Torrent, etc., from $T_2$.
$P_A \cdot P_B$ is the probability that the household has an active WFH device 950. Then, a simple method declares there is an active WFH device if $P_A \cdot P_B > P_T$. The threshold $P_T$ may be learned from network-wide statistics such as the device's average WFH-application use time. This learned probability uses the user-preferences specified for the WFH device. If user sets a device as WFH category, its label denotes WFH device even if $P_A P_B < P_T$.

Learning methods can improve the preferred service profile's identification. For example, a supervised learning process could use the following features:

Device type: Device types include laptop, desktop, smartphone, and so on. This feature is useful because certain device types are more likely to have dedicated uses, e.g., an Xbox is mostly for gaming, and laptops are more likely for WFH than are TV consoles.

Device manufacturer: Device manufacturer may be derived from the MAC address. This feature is useful because businesses often use laptops from certain well-known brands, and companies may issue laptops from a single brand (or a limited number of brands) to all their employees based on negotiated discounts from the brand(s).

Network device name: The network device name can also be obtained from a variety of sources and methods including an ARP name, (i.e., associate IP addresses with devices through layer 5 session activity), NetBIOS name (i.e., allows entities on a LAN to communicate directly, and thus may associated IP addresses for the devices with MAC addresses) and other methods known to those of one skilled in the art. Sometimes, the device name indicates whether it is work-related equipment or not.

Type of applications used by the device: This assumes that the server 270 knows or learns the used application set, and presumably knows the WFH applications already. Example application types include WFH, remote learning, entertainment, IoT, and so on. Based on the known mapping, the application type can be transformed to a Boolean variable that indicates whether at least one WFH application was used or not. This feature expands to be a set of numbers that indicate the time duration that each application type's use by the device.

Device usage/connection at different time and day: This feature shows whether the device use correlates to working hour.

Device location: Device location information includes the devices' GPS coordinate or other AP-distance indications. If location data is not available, this feature may be derived from operational data indicating the location. For example, RSSI, channel estimates, antenna array gain, and other radio channel related parameters indicate the device's location relative to the AP.

To train a supervised learning model, the server 270 labels features using user preference data, especially the primary device use. Learning methods may have intermediate derived/calculated entities called "features" that are intermediate to the QoE quality data like ASC metric and may appear at stages within the learning system, for instances stage within a deep neural network. For example, the weighted addition of 2 or 3 QoS data elements prior to thresholding might create some internal partial indication of the ASC metric as a feature. The features may not yet include other QoS data's influence, which instead occurs in later learning stages that aggregate features before the final stage provides the QoE estimate. Standard supervised-learning-based classifiers can be used to derive the supervised-learning model and its internal features' stages. The following models are useful to get a good classification results: Generalized Linear Models (GLM) including logistic regression, boosting methods such as gradient boosting, deep-learning processes such as long short-term memory (LSTM), and so on. Alternatively, unsupervised (reinforcement) learning methods can use the same feature set to identify a device's preferred service category when that user-preference data is unavailable. For example, clustering processes such as k-means can estimate a natural device cluster and then classify the preferred service category as WFH if this cluster's most frequent known preferred service category is WFH. This user preference data estimate internally may act as a feature when combined with other QoS performance data to estimate QoE or ASC metrics.

WFH Traffic Separation Workflow

Preferred service category identification explained service- and/or device-based WFH-traffic identification according to various embodiments of the invention. WFH traffic's identification, along with its associated performance measurement, allow measurement of various important work-from-home statistics and/or WFH traffic prioritization. In an embodiment, WFH traffic identification can separate identified WFH traffic from other traffic for prioritization and privacy protection, particularly when WFH users do not wish to share network use information with WFH service providers or with their employer. This separation permits the WFH traffic and the other traffic to be treated differently.

WFH traffic's separation may follow the following example workflow:

First, the software agent 550 identifies the service and/or device type.

Second, the software agent 550 may route the two traffic types differently. In one embodiment, the WFH traffic and the other traffic may use different Wi-Fi SSID and/or different VLANs, which allows WFH traffic's prioritization. In another embodiment where multiple WANs connect to the home network, the WFH traffic and other traffic may connect to different WANs; alternately, only the WFH traffic may fail-over to the other traffic's chosen WAN.

Third, the software agent 550 collects and records the different types of, and/or amounts of, WFH traffic data and other non-WFH traffic data. In one embodiment, the agent 550 collects more detailed information; such as, application name, usage time, and duration from WFH traffic. In another possible embodiment, the agent 550 can send each of the recorded information on the WFH data to a server and the recorded information on the other, non-WFH data to another server (e.g., private data server).

Finally, different aggregation levels or methods can be applied to WFH traffic and to the other data. For example, embodiments can aggregate the collected WFH traffic data per employee and other data more coarsely; this may include such specifics as different time of day or employee group (like department). Different aggregation levels can thereby protect the employee's privacy.

Traffic separation can also apply to other preferred service categories. In an embodiment, if the preferred service category is remote health (telehealth), the agent can separate the telehealth traffic from other traffic and apply similar separation and data treatment disclosed in this document.

Policy-Based Device & Application Joint Prioritization

A policy is a function that describes changes to a profile $S_{i,j,k}(t)$ based on the server's 270 available QoS, current profile, user QoE feedback, and user preference data that also include the (potentially estimated) QoE quality function Q. The policy would supply all information to implement the prioritization through local profile choice. The server 270 may provide the policy for profile optimization/improvement to a local device like a Wi-Fi AP 205. Policy information include, but not limited to, the following:

Data collection method: A policy may specify how to collect QoS data. This may include the QoS data list, the collection period, and the format. When the server 270 shares some data with a third-party partner like an application provider, the WFH policy will cause the profile to specify the type and period of information sharing between the server 270 and the application server.

Trigger condition: Even when a user provides a certain service category preference, prioritization may not be necessary because the existing QoE performance level for the preferred service category is sufficient. When the network is underused, mission critical applications like WFH should work well without any prioritization. Re-profiling policy can specify various trigger conditions for prioritization to avoid unnecessary negative impact to non-preferred applications and devices. In one preferred embodiment, the QoE levels for the preferred service category may have several trigger thresholds. For one trigger level, only low-priority devices would be deprioritized when the WFH QoE is less than a corresponding threshold. At a second more serious trigger threshold, then both low- and medium-priority devices would be de-prioritized, and so on.

Prioritization targets: This is the prioritized (ordered) list of applications/devices when the WFH service category is active. Each listed device could have a high/medium/low/lowest priority, which will determine the level of (de-)prioritization at different QoE or ASC levels. For example, referring to FIG. 10, a plurality of devices 1010 are correlated to a plurality of applications 1020 by a priority ranking or value. In one instance, laptop 1 is set to high priority and desktop 1 is set to low priority for the WFH service categories and desktop 1 is usually for gaming and laptop 1 is for WFH.

Prioritization methods: These are the sub-systems' allowed methods to prioritize certain application/devices. The reprofiling policy might have the list of TCP/UDP ports that can be prioritized to support certain WFH applications. This list's source/destination IP address pairs permit packet re-marking to a high-priority DSCP label. Alternatively, the re-profiling policy might limit AQM configuration such that the AQM's detrimental effect can occur only on the low-priority devices. Prioritization method selection depends on the current communication performance. If the network performance slightly degrades for WFH devices/applications, the server's policy might first apply a mild (de-) prioritization; such as, an airtime-fairness method. If the network performance degrades further, the server's 270 policy might then request more aggressive de-prioritization such as enforcing low maximum speed limit to non-WFH devices using a traffic shaper.

End-to-end diagnostics: The policy might request end-to-end communication performance monitoring to assess the policy-imposed optimization's/improvement's effectiveness and to provide evidence to third-party partners.

Prioritization effectiveness: The applied prioritization's effectiveness may need measurement to assess if best/sufficient or further optimization/improvement should occur. The ideal effectiveness metric is user's feedback $F_{i,j,k}$ (t) on the perceived QoE (or ASC metric) improvement, which may be available real time or estimated, if not.

Impact to un-prioritized applications/devices: Policy impact on the non-WFH devices/applications assesses any negative impact to those devices/applications. If the streaming video application QoE degrades sufficiently, then the disadvantage of the corresponding poor entertainment application QoE may outweigh the ASC benefit.

Diagnostics information: The re-profiling policy may prescribe how to detect WAN congestion (e.g., insufficient uplink bandwidth for cable/PON) for certain WFH devices, such that extreme prioritization triggers upon WAN congestion's detection. The policy may prescribe a video conferencing application's maximum uplink latency, above which the policy de-prioritizes all non-WFH devices. The policy can also use long term observation of the network's operational/performance/use data $X_{i,j,k}(t)$ and user QoE feedback $F_{i,j,k}(t)$.

The server 270 determines prioritization targets and illustrates a priority matrix in accordance with various embodiments. Some embodiments prioritize applications through their communication ports or the destination IP addresses for the uplink packets. Other embodiments may instead prioritize devices through uplink packets' source IP/MAC addresses or by using airtime-fairness methods. Pairing of these two prioritizations in different ways may improve WFH QoE or ASC metric. When policy separates application and device priorities, learning processes may offer better ASC metrics. FIG. 10 also illustrates a medium priority service (e.g., web) for non-WFH device as low priority, whereas the same medium priority service for WFH device is medium priority. This exemplary priority matrix may allow Layer 1 device priority optimization/improvement to pair with the Layer 4 application prioritization by TCP port and illustrates that a high priority may be given only to the application and device pair where both application and device are high priority.

The server's policy specifies the priority matrix. In FIG. 10, an example pairing of laptop 1 and Zoom has high priority. An embodiment may prioritize the airtime fairness for laptop 1 while Zoom's communication port (i.e., "UDP 8801-8810") is set to high priority. Consequently, the server's 270 policy specifies automatic setting of the laptop 2 (low priority device) and Zoom pair to medium priority, despite Laptop 2's low priority. This priority elevation is due to Zoom's communication port was already prioritized (for laptop1 and Zoom). The priority matrix' entries interdepend through these implementation limitations. Before applying the priority matrix, the server 270 may check feasibility. Feasibility checking may start from the high priority device/application pair and then continue for consistency to the lower priority device/application pairs. The policy may also depend on home gateway's available prioritization capabilities.

In certain embodiments, the policy optimization/improvement supports the ergodic spectrum management framework as set forth in U.S. patent application Ser. No. 16/804,000, filed on Feb. 27, 2020, entitled "Ergodic Spectrum Management Systems and Methods," which application is incorporated herein by reference in its entirety. ESM uses QoE function as one of constraints during the spectrum optimization/improvement, and the policies depend on the ergodic properties of WFH use and behavior. QoE reward functions thereby become specific to the subset of WFH applications and devices, in particular for the ASC metric. This QoE reward function or ASC metric again may be learned from QoS performance data obtained from devices labeled as WFH devices.

Meta Improvement Training

The QoE and ASC metrics, described herein (individually or aggregated), could themselves become inputs to training as a form of metadata according to various embodiments of the invention. The objective would be profile adjustment that learns from them to improve worker productivity, as measured by ASC metrics or other WFH-related metrics. Worker productivity or ASC metrics depends on certain (learned) QoS parametrizations and profiles and thus improves with proper optimization/improvement. Some workers' performance depends more on high priority connection flows—for instance, employees or consultants that use sophisticated computer-aided design tools that incorporate data from these at home workers. Dependency is particularly high for work that transfers large files, which could motivate these workers' corresponding applications and devices to have higher relative prioritization. A worker producing more lines of debugged/qualified software code because of better latency and bandwidth to/from a server would have higher ASC productivity contribution.

WFH Improvement Based on ASC Workflow

The WFH service ASC metric may relate to various WFH metrics described herein and may be used to improve WFH metrics and/or features. An example of how a network may be optimized or improved for ASC productivity metrics follows.

First, in a data collection workflow step, the server 270 collects data from various sources, which can include the LAN(s), WAN(s), application customers, and application providers. In an embodiment, the software agent 550 may collect QoS data from the LAN and the WAN, the application provider may collect application use data via an API or logs, and the application customer may collect employee information such as employee job function, work schedule, etc.

Second, in a performance evaluation workflow step, various metrics measure the WFH-service's performance. Since user feedback is sometimes hard to obtain, machine-learning techniques described herein that predict QoE from QoS data, even without user feedback, may be used. Machine-learning methods such as logistic regression, deep learning, and boosting computer methods may implement learning or prediction using available user feedback as labels and collected data as features. Similar machine learning methods can derive other metrics such as the network stability during WFH, work hours lost from poor communication performance, the teleconferencing quality, and so on.

In an embodiment, application-use logs and teleconference participants' feedback permit prediction of teleconferencing quality as a function of communication performance. The user feedback may include thumbs up/down (or absence thereof) as well as an exit score (smiley faces to frown faces) of all or a participant subset. The teleconferencing quality may be a vector quantity if it uses data from multiple teleconference participants. An embodiment may aggregate the vector quantity's elements into a single value to denote all (or a subset of) participants' overall teleconferencing quality. An embodiment may graph the remote workers' communication patterns, and then a metric such as PageRank can identify the employee(s) with the largest influence. Computation of participants' influence level may weight their contribution to the aggregated teleconference quality. A dashboard may display identified communication patterns to give better insight to employees' communication behavior.

Third, in an aggregation workflow step, the various performance metrics may be combined to compute an aggregated, overall WFH metric referred to as the ASC metric. This aggregated ASC metric is an overall work-from-home metric that is an aggregation derived from other WFH metrics; such as, WFH intensity metric, WFH distraction metric, WFH collaboration metric, etc. Embodiments can derive the ASC metric that measures the productivity gain or loss caused by WFH communication performance. The ASC productivity more generally can be the ratio of an economic output (e.g., revenue, profit, production quantity, etc.) to the inputs (e.g., labor cost, investment, raw material, etc.).

The economic inputs and outputs can be measured over variable time intervals. If longer time intervals are employed, this delay would allow measured economic input and output over longer periods. Performance metrics may need aggregation over the same time interval as the productivity metrics, such that embodiments of the invention may derive these performance metrics' relationships through machine learning and/or heuristic techniques. In one example, an average is used as the aggregation function for metrics discussed in step 2 and then use a generalized linear model, such as logistic regression, to relate these metrics to the productivity changes.

Fourth, in an workflow step, an embodiment can optimize or improve the WFH system to maximize the ASC product metric.

Vector Turboing

For neighborhoods with multiple WFH workers, the previous vectored neighborhood methods can also share multiple WAN systems to improve (accelerate the speed of) one or a few worker(s) temporarily based on need. This acceleration amplifies the previous fail-over or bonded solution through multiple connections' use, and these multiple connections may include multiple devices and/or access points bonding multi-Wi-Fi radio links and accessing multiple parallel WANs to increase total available bandwidth substantially. This intelligent bandwidth sharing can accentuate in situations with distributed antenna system (DAS) behavior, where different access points direct several spatial beams at a single multi-radio device (like a work-from-home station/computer) to accelerate its bandwidth through these streams' multipath-TCP aggregation at layers 2 to 4.

Pictorial Description

Figure 11:
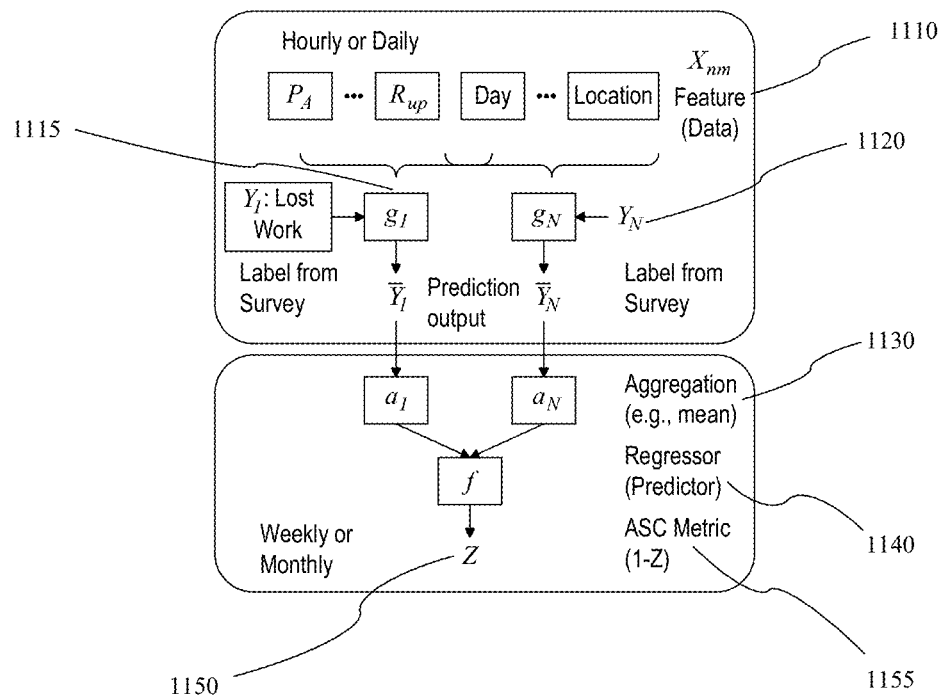
FIG. 11 pictorially illustrates application specific connectivity ("ASC") metric improvement through machine-learning methods according to various embodiments of the invention.

FIG. 11 pictorially illustrates ASC metric optimization/improvement through machine-learning methods according to various embodiments of the invention previously described in more general terms. As shown, productivity is analyzed as a ratio of an economic output (such as revenue) to an input (such as labor hours). In certain embodiments, productivity measurement may have low-time resolution (such as monthly, quarterly) and/or high-time resolution (such as hourly, daily). If low-time resolution is used, the need to correlate short events (such as bad conference calls, etc.) is reduced. If Z 1150 is defined in this embodiment as hours lost/total hours for all employees due to connectivity issues, then the ASC metric may be defined as 1-Z 1155.

In this embodiment, variables ($X_{nm}$) 1110 may be used as inputs for the method. These variables may be observable measurements such as performance (e.g., packet loss, up/down rate, latency, etc.), usage (e.g., up/down usage, application software type, etc.), and contextual information (e.g., day of the week, time of the day, # of attendees on a call, etc.). An intermediate (short-term) variable ($Y_n$) 1120 may be used as a label with fine resolution such as labeling survey information or special measurements. Examples of information that may be labeled include lost work hours, employee satisfaction, QoE, etc.

The method identifies g( ) 1115 and coefficients $K_{nm}$ such that $Yn=g(K_{n1}X_{n1}+ \ldots +K_{nM}X_{nM})$, which is used to train coefficients. In certain embodiments, g( ) 1115 determines a type of predictor such as GLM or Generalized Linear Model (e.g., exponential if using Poisson regression) used within the learning method. Aggregation 1130 is employed to the prediction output and a regressor 1140 is applied to generate Z 1150, from which an ASC metric 1155 is derived. As will be understood, a regressor enables prediction of a continuous outcome variable (here Z) based on the value of one or multiple predictor variables (here $a_i$). Briefly, the goal of a regression model is to build a mathematical equation that defines the outcome (Z) as a function of the predictor variables ($a_i$). The regressor may be a linear regression model, or a logistic regression model, as previously discussed. Other regressors are also possible. In this example, the ASC metric 1155 is a normalized non-negative measure that represents an employee's, or a group of collaborating employees', productivity. If Z 1150 is (normalized to max) hours lost for all employees due to connectivity issues (for instance on conference calls), then 1-Z 1155 is proportional to the productivity, which has a certain revenue value for each employee group.

User Interface Workflow

Figure 12:
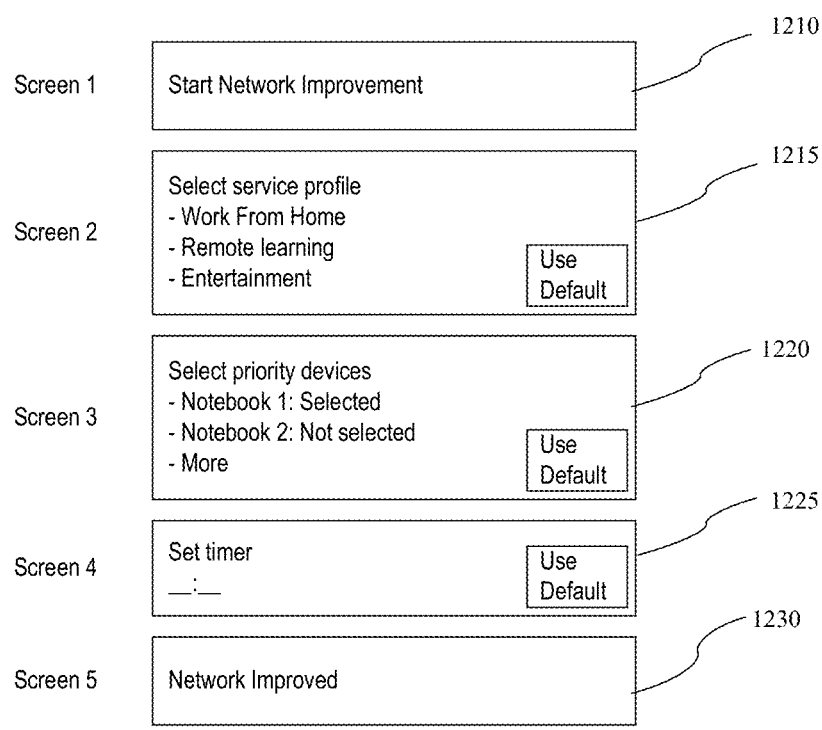
FIG. 12 illustrates a simple user interface workflow according to various embodiments of the invention.

A user interface (UI) collects user preference data $P_{i,j,k}(t)$ and user QoE feedback $F_{i,j,k}(t)$. The UI may alert the user to improvement needs and/or prompt the user to start improvement processes. FIG. 12 illustrates a simple UI workflow according to various embodiments for WFH. This workflow has 5 steps, and each step may occupy a separate page or may share workflow components; such as, sliders, frames, columns/rows, cards, and similar components, on a common smartphone app or web page.

Referring to FIG. 12, a first UI workflow step (Screen 1) starts network improvement 1210. If the server 270 supports only one preferred service category, the user may start optimization/improvement by pressing an application software's menu-bar button. The server 270 entity can also prompt a user to start network improvement through an email, app, text, or other alert forms. The device's use pattern then indicates the prioritization need. Use patterns may include the application type, network data use indications (e.g., the ratio of uplink/downlink bandwidth consumption), the used network port, and so on. The following example use patterns may trigger such an alert:

Application/Device use: Certain application software's/hardware device's use may indicate user preference and suggest its consequent prioritization. For example, the server 270 can associate applications and devices using association methods described herein. Upon such preferred application/device pair's detected activity, a user alert may recommend an estimated, better preferred service category. Embodiments can compare subsequent and historical application/device use, under the applicable or estimated preferred service category, for consistency. For example, if the user played the Xbox only when the preferred service category was entertainment before, but then begins such use under WFH service category, it may indicate that the service category preferred by the user is not to WFH.

Data-use change: A data use pattern change may indicate an user's need for a different network profile. For example, the ratio of uplink to downlink data consumption may indicate the application type; therefore, a change in this ratio may indicate a different application's use and consequent re-profiling need. To detect an application change, the server 270 can compare the predicted and the actual ratio of uplink to downlink data consumption (i.e., a predicted QoS data point and an actual QoS data point). The server can also predict this ratio from historical observations through time series analysis; such as, linear prediction, exponential smoothing, ARMA (Auto-Regressive Moving Average) filtering, etc. In the case of ARMA models, the future values are determined as a linear combination of both past observations as well as past predicted values, which could be past predicted QoE and/or QoS data. A simple example is an application change at roughly 5 PM each work-day, an often-encountered work stop time.

WFH schedule: The server 270 can learn the WFH user's schedule from previous service category selections and/or from historical application/device use. When the WFH starts according to the learned schedule, the server 270 may send an alert to the employer. When actual user QoE feedback data are available, a supervised learning method can predict the best service category for profile (or policy) distribution to the appropriate implementation points in the device, gateway, router, etc. The following features can assist prediction:

Device use: This data indicate whether a certain device was active simultaneous with the corresponding collected data. The device use list maps to an integer vector, where each element indicates the data use level. For example, 0 means the device is not connected, 1 means the device is connected but the data usage was less than 1 MB during the sampling interval, 2 means between 1 MB and 2 MB, and so forth. When uplink/downlink uses are separated, this feature produces two corresponding integer vectors.

Application use: This data indicate whether a certain application software is active simultaneous with the corresponding collected data. The application use list maps to an integer vector where each element indicates the device's application use level. Jointly sampled device and application use allows formation of a matrix where the rows correspond to the devices and the columns correspond to the applications.

Time information: This timestamp data may include the time of the day, the day of the week, and so on. This data map to a Boolean variable that indicates whether the timestamp is in working hours or not, based on a known work schedule (or pattern). Operational use data permit learning of work schedule, or the schedule can be set by the user. When the connection supports multiple service categories, different schedules correspond to the different service categories.

Network-wide statistics: Network-wide statistics derive from network-wide QoS operational data. These statistics can include the probability that a certain service category is set or active on other lines in the same network or on neighboring lines. To improve the relevance of network-wide statistics to the individual line/connection, the server 270 can use statistics that derive from similar lines/connections in the same geographical location (e.g., based on IP address), the same home network type (e.g., # of devices), the same broadband network type (e.g., service product), the same household type, and/or other clusters of meaningful common characteristics, and so on.

User-defined scheduling: WFH schedules may be based on direct feedback from the user where the user sets the schedule itself. In this example, WFH scheduling may be directly defined by one or more users and/or stakeholders.

The server 270 may periodically collect the above data. This data permits predictor training by using the preferred service category selection history as a label. This learning may use methods such as (generalized) linear regression, boosting computer methods, tree-based methods such as random forest, etc. The preferred service category predictor can run periodically or may be triggered upon a certain condition. For example, simpler methods can transition to more sophisticated methods upon certain quantity and quality of data availability. In addition, unsupervised learning methods, such as hidden Markov Models (HMMs), may instead predict the preferred service category when training data is not available. Finally, the service category prediction can track working hours, which can provide insightful information on WFH behavior.

Based on the use pattern analysis, the first workflow step provides analytics. An alert may show proposed service category and the analytics that support its choice. For example, embodiments may use an alert to compare a new use pattern to an old use pattern to justify optimization/improvement using a new service category. In addition to user initiation, optimization/improvement can start automatically if certain conditions are met. Embodiments may not rely 100% on the automatic optimization/improvement start because users' manual triggers could also be a good QoE label for prediction method training. When the optimization/improvement starts automatically, the server 270 may send an alert to the user as a reminder and may ask for the user's opinion on whether the automatic start is desirable (before proceeding). This feedback is also important to train the prediction method(s). Finally, the alert may provide some diagnostic information.

A second UI workflow step 1215 (Screen 2) requests the user to select a preferred service category manually from a supported list. The supported list should be sorted according to service category popularity or likelihood of user preference. The popularity depends on how often the preferred service category was used in the home network or by the user. Embodiments may compute likelihood through the association of currently active application software/devices with the preferred service category, for example using methods described in the preferred service category discussion. The user may also press "Use default" button to skip this second step. Similarly, embodiments may select a preferred service category from the list based on predictions of its likelihood, in which case the user provides no input directly.

The third UI workflow step 1220 (Screen 3) in this embodiment prioritizes devices. The user may manually select a device, such as an initial selection. The initial manual selection is a valuable label for computer training methods. In Screen 3 1220, the user may select the prioritization target device from a sorted list based on the likelihood of association with the preferred service category. Embodiments may also display the priority device list separately, so that the user can select devices only from the devices with unknown user preference. The workflow may skip this third step if all devices' preferred service categories become known or learned and automated, for example using training methods described in the preferred service category discussion.

The fourth UI workflow step 1225 (Screen 4) selects the time when the selected service category expires. This step prevents any unnecessary negative impact to deprioritized application software/devices after the prioritization becomes unnecessary. For example, most users do not work an entire day and may forget to exit WFH prioritization. To facilitate this exit, the UI can display a default expiration time. The server 270 may estimate a default WFH expiration time based on the WFH schedule and historical data. In addition, the user may select the service category that will be applied when the selected preferred service category expires. In any case, the user will be alerted when a preferred service category expires, and the next preferred service category will then become active if set. The UI sends all user preference data collected in workflow steps 1 to 4 to the server 270. Then, the server 270 will confirm that a new preferred service category is active.

Finally, the UI displays the confirmation in the final workflow step 1230 (Screen 5). The UI can display the service category and QoE diagnostics; such as, the optimization's/improvement's performance gain, any network problems, the prioritized application software and devices (and perhaps also those de-prioritized), etc. The UI may be accessible outside the home, which gives more flexibility to managing the home network even when the user is not home.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using application specific integrated circuits (ASICs), programmable arrays, digital signal processing circuitry, or the like. Accordingly, the terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks; optical media such as CD-ROMs and holographic devices; magneto-optical media; and hardware devices that are specially configured to store or to store and execute program code, such as ASICs, programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Clauses Describing Exemplary Embodiments

Clause A1. A method comprising: (a) accessing data relating to one or more network devices and/or connections, the data comprising at least quality of service (QoS) data and quality of experience (QoE) data, the QoS data providing an objective measure of connection quality for an associated network connection, and the QoE data providing a measure of user experience for an associated network connection or application software; and (b) training a QoE estimator model for generating estimated QoE data from QoS data, wherein the QoE estimator model uses a machine learning method in which the QoS data are used as input data and the QoE data are used to define one or more labels such that the QoE estimator model determines a respective estimator for each of the one or more labels based on the input data.

Note that "accessing" may comprise receiving (passively) or collecting (actively) or simply retrieving from memory. Note also that the QoE data may provide an indirect measure of connection quality for the associated network connection. For example, "thumbs down" user feedback during a user video conferencing session may be indicative that the associated connection is poor, thereby leading to a poor user experience. Thus, given sufficient data, a correlation would be expected between the QoE data and the QoS data.

Clause A2. The method of clause A1 wherein the accessed data comprise current and/or historical data relating to the one or more network devices and/or connections.

Note that "current data" are the most recent data available for a particular data type over a recent time period. The most recent time period may represent more than one measurement cycle of that data type, and may vary between data types. For example, for one data type, all data from the past day may be considered to be "current"; for other data types, shorter or longer time periods (e.g. 15 minutes, 30 minutes, 1 hour, 2 hours, 3 hours, 6 hours, 12 hours, multiple days, 1 week, multiple weeks, 1 month, multiple months, or events occurring since the last complete measurement ended, etc.) may be more appropriate to define what is "current." In contrast, "historical data" are any data that are no longer considered to be "current."

Clause A3. The method of clause A1 or A2 wherein the input data further comprise timing data which provide time spans and/or time stamps associated with the QoS data and the QoE data.

Clause A4. The method of any one of clauses A1-A3 wherein the QoS comprises data from one or more OSI layers.

Clause A5. The method of any one of clauses A1-A4 wherein each label is based on one or more types of QoE data.

Clause A6. The method of any one of clauses A1-A5 wherein the QoE data comprise real time user feedback data and/or delayed user feedback data Clause A7. The method of any one of clauses A1-A6 wherein the QoE data comprise direct user feedback data and/or indirect user feedback data Clause A8. The method of clause A7 when dependent on clause A6 wherein real time direct user feedback data comprise one or more of "thumbs-up" user feedback, "thumbs-down" user feedback, "like" user feedback, "star rating" from the user, "smiley face" user feedback, other opinion scores and comments from chat/messaging streams.

Note that real time direct user feedback include input from within the collaboration platform application software and/or input from a separate application software used to provide feedback on collaboration (e.g., a smartphone app or web-based app) that is used during a collaboration session. Furthermore, a user can provide feedback on their own experience and/or on a specific person the user is collaborating with at the time of the feedback.

Clause A9. The method of clause A7 when dependent on clause A6 wherein delayed direct user feedback data comprise one or more of mean opinion scores, and exit/other survey scores.

Note that delayed direct user feedback can be from users commenting on their own experience, as well as their experience with others.

Clause A10. The method of clause A7 when dependent on clause A6 wherein real time indirect user feedback data comprise user activity data from a user activity monitor such as a keystroke counter, an audio activity monitor, a video activity monitor, a facial expression monitor, etc.

Clause A11. The method of clause A7 when dependent on clause A6 wherein delayed indirect user feedback data comprise one or more of information regarding help calls, information regarding help chat-box attempts, information regarding technician dispatches, information regarding complaints, information regarding equipment replacement, information regarding permanent disconnection of service by a user, information regarding refusals to use a particular application software, and information regarding excessive repeats of collaborative sessions.

Clause A12. The method of any one of clauses A1-A11 wherein the QoE data comprise estimated QoE data previously generated by the QoE estimator model.

Clause A13. The method of any one of clauses A1-A12 wherein the QoS data and/or the QoE data are normalised for use in the QoE estimator model.

Clause A14. The method of any one of clauses A1-A13 wherein the QoS data and/or the QoE data are aggregated for use in the QoE estimator model.

Clause A15. The method of clause A14 wherein the aggregation is over one or more time periods.

Clause A16. The method of clause A14 or A15 wherein the aggregation is over one or more home networks associated with at least one of the one or more network devices and/or connections.

Clause A17. The method of any one of clauses A1-A16 wherein the QoE estimator model is able to be updated based on additional data relating to the one or more network devices and/or connections.

Clause A18. The method of clause A17 wherein the additional data are additional QoE data.

Clause A19. The method of any one of clauses A1-A18 wherein the QoE estimator model is optimized/derived over all linear functions of the input data, possibly under certain constraints.

Clause A20. The method of clause A19 wherein the QoE estimator model is optimized/derived using linear regression or logistic regression, possibly under certain constraints.

Clause A21. The method of any one of clauses A1-A20 wherein the QoE estimator model is further based on user preference data which provide user preferences associated with a particular network device or connection of the one or more network devices and/or connections.

Clause A22. The method of clause A21 wherein the accessed data are filtered based on the user preference data such that the QoE estimator model may be associated with particular user preference data.

Clause A23. The method of any one of clauses A1-A22 wherein the QoE estimator model is further based on application software data which provide data regarding one or more application software associated with a particular network device or connection of the one or more network devices and/or connections.

Clause A24. The method of clause A23 wherein the accessed data are filtered based on the application software data such that the QoE estimator model may be associated with one or more selected application software.

Clause A25. The method of any one of clauses A1-A24 wherein the accessed data are filtered based on one or more home networks associated with the one or more network devices and/or connections such that the QoE estimator model may be associated with one or more selected home networks.

Clause A26. The method of any one of clauses A1-A18 further comprising using the QoE estimator model to subsequently generate estimated QoE data from new QoS data.

Clause A27. The method of clause A26 wherein the one or more labels may further be defined based on the estimated QoE data.

Clause A28. The method of any one of clauses A1-A27 further comprising using the QoE estimator model to subsequently generate predicted QoE data from predicted QoS data.

Thus, the QoE estimator model may additionally be used to make predictions of future QoE if predicted future QoS data are used as inputs. Also, it will be appreciated that estimated and/or predicted QoE data may be generated based on a reduced set of QoS data. Not all of the QoS data types need be present as inputs for each prediction/estimation. Nonetheless, a larger number of inputs will generally lead to a better or more accurate predictions/estimation.

Clause A29. The method of clause A28 further comprising generating the predicted QoS data from current and/or historical QoS data.

Thus, if for example a user has a high, uplink user packet transfer rate every afternoon at a particular time due to a regular video-conference call, this can be predicted.

Clause B1. A system comprising one or more processors configured to carry out the method of any one of clauses A1-A29.

Note that the system is most likely to be located at the previously described Application Specific Connectivity server (e.g., a server 270). However, at least part of the system could be located in a home network software agent in a local embodiment, as well as possibly at the ISP or the application software server in different embodiments. For example, the QoE estimator model could be trained at the Applications Specific Connectivity server, but the steps of generating estimated or predicted QoE values (as per clauses A26 and A28) could potentially be performed at the home network software agent 283, at the application server running application software 285, or at the ISP 281.

Clause C1. A non-transient computer readable medium storing one or more instructions which, when executed by one or more processors, cause the one or more processors to carry out the method of any one of clauses A1-A29.

Clause D1. A method comprising: (a) accessing data relating to one or more network devices and/or connections, the data comprising quality of service (QoS) data and further comprising quality of experience (QoE) data and/or productivity data, the QoS data providing an objective measure of connection quality for an associated network connection, the QoE data providing a measure of user experience for an associated network connection or application software, and the productivity data providing a measure of user productivity for an associated network connection; and (b) training a productivity estimator model for generating estimated productivity data from QoS data, wherein the productivity estimator model uses a machine learning method in which the QoS data are used as input data and the QoE data and/or productivity data are used to define one or more labels such that the productivity estimator model determines a respective estimator for each of the one or more labels based on the input data.

Note that "accessing" may comprise receiving (passively) or collecting (actively) or simply retrieving from memory. Note that the QoE data may provide an indirect measure of connection quality for the associated network connection. For example, "thumbs down" user feedback during a user video conferencing session may be indicative that the associated connection is poor, thereby leading to a poor user experience. Thus, given sufficient data, a correlation would be expected between the QoE data and the QoS data.

Clause D2. The method of clause D1 wherein the accessed data comprise current and/or historical data relating to the one or more network devices and/or connections.

Note that "current data" are the most recent data available for a particular data type over a recent time period. The most recent time period may represent more than one measurement cycle of that data type, and may vary between data types. For example, for one data type, all data from the past day may be considered to be "current"; for other data types, shorter or longer time periods (e.g. 15 minutes, 30 minutes, 1 hour, 2 hours, 3 hours, 6 hours, 12 hours, multiple days, 1 week, multiple weeks, 1 month, multiple months, or events occurring since the last complete measurement ended, etc.) may be more appropriate to define what is "current". In contrast, "historical data" are any data that are no longer considered to be "current".

Clause D3. The method of clause D1 or D2 wherein the input data further comprise timing data which provide time spans and/or time stamps associated with the QoS data, the QoE data and the productivity data.

Clause D4. The method of any one of clauses D1 to D3 wherein the QoS comprises data from one or more OSI layers.

Clause D5. The method of any one of clauses D1 to D4 wherein each label is based on one or more types of QoE data and/or productivity data.

Clause D6. The method of any one of clauses D1 to D5 wherein the QoE data comprise real time user feedback data and/or delayed user feedback data Clause D7. The method of any one of clauses D1 to D6 wherein the QoE data comprise direct user feedback data and/or indirect user feedback data Clause D8. The method of clause D7 when dependent on clause D6 wherein real time direct user feedback data comprise one or more of "thumbs-up" user feedback, "thumbs-down" user feedback, "like" user feedback, "star rating" from the user, "smiley face" user feedback, other opinion scores, and comments from chat/messaging streams.

Note that real time direct user feedback include input from within the collaboration platform application software and/or input from a separate application software used to provide feedback on collaboration (e.g., a smartphone app or web-based app) that is used during a collaboration session. Furthermore, a user can provide feedback on their own experience and/or on a specific person the user is collaborating with at the time of the feedback.

Clause D9. The method of clause D7 when dependent on clause D6 wherein delayed direct user feedback data comprise one or more of mean opinion scores, and exit/other survey scores.

Note that delayed direct user feedback can be from users commenting on their own experience, as well as their experience with others.

Clause D10. The method of clause D7 when dependent on clause D6 wherein real time indirect user feedback data comprise user activity data from a user activity monitor such as a keystroke counter, an audio activity monitor, a video activity monitor, a facial expression monitor, etc.

Clause D11. The method of clause D7 when dependent on clause D6 wherein delayed indirect user feedback data comprise one or more of information regarding help calls, information regarding help chat-box attempts, information regarding technician dispatches, information regarding complaints, information regarding equipment replacement, information regarding permanent disconnection of service by a user, information regarding refusals to use a particular application software, and information regarding excessive repeats of collaborative sessions.

Clause D12. The method of any one or clauses D1 to D11 wherein the QoS data and/or the QoE data and/or the productivity data are normalised for use in the productivity estimator model.

Clause D13. The method of any one or clauses D1 to D12 wherein the QoS data and/or the QoE data and/or the productivity data are aggregated for use in the productivity estimator model.

Clause D14. The method of clause D13 wherein the aggregation is over one or more time periods.

Clause D15. The method of clause D13 or D14 wherein the aggregation is over one or more home networks associated with at least one of the one or more network devices and/or connections.

Clause D16. The method of any one or clauses D1 to D15 wherein the productivity estimator model is able to be updated based on additional data relating to the one or more network devices and/or connections.

Clause D17. The method of any one or clauses D1 to D16 wherein the productivity estimator model is optimized/derived over all linear functions of the input data, possibly under certain constraints.

Clause D18. The method of clauses D17 wherein the productivity estimator model is optimized/derived using linear regression or logistic regression, possibly under certain constraints.

Clause D19. The method of any one or clauses D1 to D18 wherein the productivity estimator model is further based on user preference data which provide user preferences associated with a particular network device or connection of the one or more network devices and/or connections.

Clause D20. The method of clause D19 wherein the accessed data are filtered based on the user preference data such that the productivity estimator model may be associated with particular user preference data.

Clause D21. The method of any one or clauses D1 to D20 wherein the productivity estimator model is further based on application software data which provide data regarding one or more application software associated with a particular network device or connection of the one or more network devices and/or connections.

Clause D22. The method of clause D21 wherein the accessed data are filtered based on the application software data such that the productivity estimator model may be associated with one or more selected application software.

Clause D23. The method of any one or clauses D1 to D22 wherein the accessed data are filtered based on one or more home networks associated with the one or more network devices and/or connections such that the productivity estimator model may be associated with one or more selected home networks.

Clause D24. The method of any one or clauses D1 to D23 further comprising using the productivity estimator model to subsequently generate estimated productivity data from new QoS data and/or performance data Clause D25. The method of clause D24 wherein the one or more labels may further be defined based on the estimated productivity data.

Clause D26. The method of any one of clauses D1 to D25 further comprising using the productivity estimator model to subsequently generate predicted productivity data from predicted QoS data.

Thus, the productivity estimator model may additionally be used to make predictions of future productivity if predicted future QoS data are used as inputs. Also, it will be appreciated that estimated and/or predicted productivity data may be generated based on a reduced set of QoS data. Not all of the QoS data types need be present as inputs.

Clause D27. The method of any one of clauses D1 to D26 wherein the productivity data comprise data such as hours lost by a user due to a bad connection, or number of calls made by a sales/marketing user, or number of hours worked by a user, etc.

Clause D28. The method of any one of clauses D1 to D7 wherein the QoE data comprise estimated QoE data generated according to the method of clause A26.

Clause E1. A system comprising one or more processors configured to carry out the method of any one of clauses D1 to D28.

Note that the system is most likely located at the Applications Specific server (e.g., server 270). However, at least part of the system could be located in a home network software agent in a local embodiment, as well as possibly at the ISP or the application software server in different embodiments. For example, the productivity estimator model could be trained at the Applications Specific server (e.g., server 270), but the steps of generating estimated or predicted productivity values (as per clauses D24 and D26) could potentially be performed at the home network software agent, in the gateway 283, at the application server 285, or at the ISP 281.

Clause F1. A non-transient computer readable medium storing one or more instructions which, when executed by one or more processors, cause the one or more processors to carry out the method of any of clauses D1 to D28.

Clause G1. A method comprising: (a) accessing data relating to one or more network devices and/or connections, the data comprising at least quality of service (QoS) data, the QoS data providing an objective measure of connection quality for an associated network connection; (b) using a productivity estimator model trained according to the method of any one of clauses D1-D28 to generate estimated productivity data from the QoS data; (c) aggregating the estimated productivity data over a time period; and (d) based on the aggregated estimated productivity data, generating an application specific connectivity (ASC) metric for the time period.

In some embodiments, the ASC metric may be considered to be "application specific" in the sense that it relates to one or more specific application software (i.e. a subset of all application software). For example, an ASC metric relevant to WFH may relate to all application software associated with WFH (e.g. video conferencing applications, audio conferencing applications, web browsers, etc.).

Clause G2. The method of clause G1 further comprising training the productivity estimator model according to the method of any one of clauses D1 to D28.

Clause G3. The method of clause G1 or G2 wherein the ASC metric is generated using a regressor.

Clause H1. A system comprising one or more processors configured to carry out the method of any one of clauses G1-G3.

Note that the system is most likely located at the server 270. However, at least part of the system could be located in a home network software agent in the gateway 283, in a local embodiment, and at least part of the system could also be located at the application server running application software 285 or at the ISP 281.

Clause I1. A non-transient computer readable medium storing one or more instructions which, when executed by one or more processors, cause the one or more processors to carry out the method of any of clauses G1-G3.

Clause J1. A method comprising: (a) accessing data relating to one or more network devices and/or connections, wherein each datum is associated with one or more applications from a plurality of applications; (b) selecting at least one application of interest from the plurality of applications; and (c) analysing the data to determine an application-specific connectivity (ASC) metric that is indicative of the effect of connection quality on user productivity for the at least one application of interest; wherein the ASC metric is determined using an ASC model trained on ASC training data, the ASC training data comprising current and/or historical data relating to the one or more network devices and/or connections, the ASC training data comprising at least quality of service (QoS) data and associated quality of experience (QoE) data, the QoS data providing an objective measure of connection quality for an associated network connection, and the QoE data providing a measure of user experience for an associated network connection or application software.

Note that "accessing" may comprise receiving (passively) or collecting (actively) or simply retrieving from memory. Note that the QoE data may provide an indirect measure of connection quality for the associated network connection. For example, "thumbs down" user feedback during a user video conferencing session may be indicative that the associated connection is poor, thereby leading to a poor user experience. Thus, given sufficient data, a correlation would be expected between the QoE data and the QoS data.

Clause J2. The method of clause J1 wherein the at least one application of interest comprises one or more application software associated with WFH activities.

Clause J3. The method of clause J1 wherein the at least one application of interest comprises one or more application software associated with remote learning/teaching and/or telemedicine and/or other virtual gatherings and/or distribution of streaming entertainment media and/or security-camera systems and/or sensors and/or smart-home appliances.

Clause J4. The method of any one of clauses J1-J3 wherein the at least one application of interest comprises one or more video conferencing application software (e.g. Zoom, WebEx, GoToMeeting, Skype for Business, JoinMe, Slack, Teams, Google Meet, Google Hangouts, etc.)

Clause J5. The method of any one of clauses J1-J3 wherein the at least one application of interest comprises one or more video-gaming applications.

Clause J6. The method of any one of clauses J1-J5 wherein the ASC metric for the at least one application of interest may further be determined based on an ASC metric for at least one other application of interest.

Clause J7. The method of any one of clauses J1-J6 wherein the ASC metric is individually determined for each network connection associated with the at least one application of interest.

Clause J8. The method of any one of clauses J1-J6 wherein the ASC metric is aggregated over multiple network connections associated with the at least one application of interest.

Clause J9. The method of clause J8 wherein the multiple network connections over which the ASC metric is aggregated comprise those network connections associated with a single home network.

Clause J10. The method of clause J8 wherein the multiple network connections over which the ASC metric is aggregated comprise those network connections associated with home networks of a group of users associated with a particular stakeholder or business entity.

Clause J11. The method of clause J10 wherein the ASC metric is further determined based on HR-related/employer productivity data for the particular stakeholder or business entity.

Clause J12. The method of clause J8 wherein the multiple network connections over which the ASC metric is aggregated comprise those network connections associated with home networks located in a particular geographical area.

Clause J13. The method of any one of clauses J1-J12 wherein the accessed data comprise one or more of: data from one or more internet service providers (ISPs); data from one or more home networks; data from one or more application servers; data from one or more user devices; and data from one or more stakeholders (e.g. employers).

Clause J14. The method of any one of clauses J1-J13 wherein the accessed data comprise QoS data from one or more OSI layers.

Clause J15. The method of any one of clauses J1-J14 wherein accessed data comprise one or more of: QoS data; QoE data; productivity data which provide a measure of user productivity for an associated network connection; user preference data which provide user preferences associated with a particular network device or connection; configuration data which provide configuration settings associated with a particular network device or connection; and timing data which provide time spans and/or time stamps associated with particular types of data.

Clause J16. The method of any one of clauses J1-J15 wherein the accessed data relate to a plurality of network devices and/or connections.

Clause J17. The method of any one of clauses J1-J16 wherein the ASC training data further comprise one or more of: user preference data which provide user preferences associated with a particular network device or connection; configuration data which provide settings associated with a particular network device or connection; timing data which provide time spans and/or time stamps associated with particular types of data; productivity data which provide a measure of user productivity for an associated network connection; and contextual data.

Clause J18. The method of clause J17 wherein the productivity data comprise data such as hours lost by a user due to a bad connection, or number of calls made by a sales/marketing user, or number of hours worked by a user, etc.

Clause J19. The method of any one of clauses J1-J18 wherein the ASC model uses machine learning and/or artificial intelligence.

Clause J20. The method of clause J19 wherein the ASC model uses a machine learning method in which the QoS data of the ASC training data are used as input data to the ASC model and the user feedback data of the ASC training data are used to define a label.

Note that other types of data (e.g. performance data and/or contextual data) may also be used to define the label.

Clause J21. The method of clause J20 wherein the ASC model determines an optimal/preferred estimator for the label based on the input data, uses the optimal/preferred estimator for the label to output an estimation per home network, aggregates the estimations of each label over a time period, and uses the aggregated estimations in a functional estimator to generate a value from which the ASC metric is derived.

Clause J22. The method of clause J21 wherein the functional estimator is optimized/improved over all linear functions.

Clause J23. The method of clause J22 wherein the functional estimator is optimized/improved using linear regression or logistic regression.

Clause J24. The method of any one of clauses J1-J23 wherein the ASC training data further comprise a previously determined ASC metric.

Clause J25. The method of any one of clauses J1-J24 wherein the input data further comprise timing data which provide time spans and/or time stamps associated with particular types of data.

Clause J26. The method of any one of clauses J1-J25 wherein the ASC model uses a supervised learning method.

Clause J27. The method of any one of clauses J1-J25 wherein the ASC model uses an unsupervised learning method.

Clause J28. The method of any clause J27 wherein the unsupervised learning method uses clustering.

Clause J29. The method of any one of clauses J1-J28 wherein the ASC model uses one or more of: boosting methods such as gradient boosting; deep-learning processes such as long short-term memory (LSTM); and neural networks.

Clause J30. The method of any one of clauses J1-J12 wherein each network device and/or connection has associated configuration settings, and the method further comprises determining updated configuration settings for at least one of the one or more network devices and/or connections, wherein the determining comprises improving the ASC metric aggregated over the data associated with the at least one application of interest.

Clause J31. The method of clause J30 further comprising communicating at least some of the updated configuration settings to a software agent located on a network device of the plurality of network devices or at the gateway.

Clause J32. The method of clause J31 further comprising, by the software agent, implementing one or more of the updated configuration settings associated with the respective network device.

Clause K1. A system comprising one or more processors configured to carry out the method of any one of clauses J1-J32.

Note that the system is most likely located at the server. However, at least part of the system could be located in a home network software agent, at the ISP, or at the application server.

Clause L1. A non-transient computer readable medium storing one or more instructions which, when executed by one or more processors, cause the one or more processors to carry out the method of any of clauses J1-J32.

Clause M1. A method at a software agent located on a home gateway network device, the home gateway network device associated with a home network, the home network comprising one or more associated network devices, the method comprising: (a) accessing updated configuration settings for the network device; and (b) implementing the updated configuration settings for the network device.

Note that the selected application software to be prioritized may include at least one of the applications of interest referred to in clauses J1-J32.

Clause M2. The method of clause M1 further comprising receiving at least some of the updated configuration settings from a device outside the home network.

Clause M3. The method of clause M1 or clause M2 further comprising determining at least some of the updated configuration settings at the home gateway network device in accordance with the method of clause J30.

Clause M4. The method of any one of clauses M1-M3 wherein the implementing comprises: based on the updated configuration settings, prioritizing selected application software and/or network devices as compared to other application software and/or network devices by at least one of: (i) identifying the selected application software and/or network devices and subsequently prioritizing associated message flows, and (ii) identifying the other application software and/or network devices and subsequently deprioritizing associated message flows.

Clause M5. The method of clause M4 wherein the selected and/or other application software and/or devices are identified based on communication port usage.

Clause M6. The method of clause M4 or M5 wherein the selected and/or other application software and/or devices are identified based on usage patterns.

Clause M7. The method of any one of clauses M4-M6 wherein the selected and/or other application software and/or devices include video-conferencing applications which are identified based on similar bandwidth usage for uplink and downlink.

Clause M8. The method of any one of clauses M4-M7 wherein the selected and/or other application software and/or devices are identified based on destination IP addresses.

Clause M9. The method of any one of clauses M4-M8 wherein the selected and/or other application software and/or devices are identified based on OSI layers 2-4 header information of the associated message flows.

Clause M10. The method of M9 wherein the OSI layers 2-4 header information comprises a layer 2 VLAN tag.

Clause M11. The method of M9 or M10 wherein the OSI layers 2-4 header information comprises a layer 2 priority level.

Clause M12. The method of any one of clauses M9-M11 wherein the OSI layers 2-4 header information comprises a layer 3 DSCP marking associated with VoIP or streaming video.

Clause M13. The method of any one of clauses M9-M12 wherein the OSI layers 2-4 header information comprises a layer 4 port number.

Clause M14. The method of any one of clauses M4-M13 wherein the prioritizing comprises changing the queue priority of the associated message flows.

Clause M15. The method of clause M14 wherein the queue priority is changed based on TCP/UDP port number or DSCP marking.

Clause M16. The method of any one of clauses M4-M15 wherein the prioritizing comprises the home gateway network device remarking a DSCP priority of the associated message flows.

Clause M17. The method of any one of clauses M4-M16 wherein the prioritizing comprises the home gateway network device adding an IP address of an application server associated with at least one of the selected application software to a host file of the home gateway network device to support faster DNS look-up.

Clause M18. The method of any one of clauses M4-M17 wherein the prioritizing comprises failover and/or load balancing of the message flows associated with the selected application software and/or devices from a first WAN associated with the home gateway network device to a second WAN associated with the home gateway network device.

Clause M19. The method of any one of clauses M4-M18 wherein a WAN associated with the home gateway network device supports multiple network slices, and wherein the prioritizing comprises switching the associated message flows to a network slice having a different priority level.

Clause M20. The method of any one of clauses M4-M19 wherein the prioritizing comprises prioritizing layer 1 or 2 of the Wi-Fi link for the selected and/or other application software and/or devices.

Clause M21. The method of clause M20 wherein the prioritizing comprises one or more of Wi-Fi channel selection, Wi-Fi band steering, changes in Wi-Fi bandwidth; changes in Wi-Fi MIMO configurations, changes in Wi-Fi mesh routing, and changes in Wi-Fi airtime fairness profiles.

Clause M22. The method of any one of clauses M1-M21 wherein the implementing comprises, based on the updated configuration settings, adapting profile parameters of one or more selected application software and/or communication link.

Clause M23. The method of clause M22 wherein the profile parameters include video frame rate, video bit rate, and/or audio bit rate.

Clause M24. The method of clause M23 wherein the one or more selected application software are lower priority application software, and wherein the adapting comprises adapting OSI layer 4 traffic shapers by dropping some packets such that an OSI layer 7 data rate of the one or more selected application software is reduced.

Clause N1. A home gateway network device comprising a software agent configured to carry out the method of any one of clauses M1-M24

Clause O1. A non-transient computer readable medium storing one or more instructions which, when executed by one or more processors, cause the one or more processors to carry out the method of any of clauses M1-M24.

Clause P1. A method at an ISP server, the ISP server managing one or more network devices and wireline and/or wireless connections, the method comprising: (a) accessing updated configuration settings for the network devices and wireline and/or wireless connections; and (b) implementing the updated configuration settings for the network devices and wireline and/or wireless connections.

Clause P2. The method of clause P1 further comprising receiving at least some of the updated configuration settings from a device not managed by the ISP.

Clause P3. The method of clause M1 or clause M2 further comprising determining at least some of the updated configuration settings at the ISP device in accordance with the method of clause J30.

Clause P4. The method of any one of clauses P1-P3 wherein the implementing comprises specifying an interleaver depth and/or FEC coding rate in a DSL system associated with the ISP.

Clause P5. The method of any one of clauses P1-P3 wherein the implementing comprises specifying margin and/or power back-off parameters in a DSL system associated with the ISP.

Clause P6. The method of any one of clauses P1-P3 wherein the implementing comprises using an uplink scheduler of a modem associated with this ISP to specify a service profile that prioritizes particular applications through an associated queue filter.

Clause P7. The method of any one of clauses P1-P3 wherein the filter uses source/destination IP address or port number to prioritize the particular applications.

Clause Q1. An ISP server comprising a software agent configured to carry out the method of any one of clauses P1-P7.

Clause R1. A non-transient computer readable medium storing one or more instructions which, when executed by one or more processors, cause the one or more processors to carry out the method of any of clauses P1-P7.

What is claimed is:

1. A method for improving remote collaboration, the method comprising:
   receiving QoE data from at least one of a user or an application;
   receiving data comprising user preference data and at least one of operational data or performance data;
   providing the data to a quality of experience (QoE) estimator model to obtain estimated QoE data;
   using the estimated QoE data and the data to determine a correlation between the data and QoE data; and
   using the correlation to adjust at least one of network or application parameters to improve at least one of a network performance or a QoE performance.

2. The method according to claim 1, wherein the data has been collected by at least one of a software agent or a server.

3. The method according to claim 2, wherein the collected data comprises quality of service (QoS) data.

4. The method according to claim 3, wherein the QoS data has been collected by using a real-time control protocol.

5. The method according to claim 3, wherein the at least one of the software agent or the server analyzes the collected data to obtain analyzed data and uses the analyzed data to control one or more network parameters.

6. The method according to claim 5, wherein controlling the one or more network parameters comprises prioritizing one of an application or a device.

7. The method according to claim 2, wherein the data comprises feedback data that has been collected by the software agent or the server.

8. The method according to claim 7, wherein the feedback data has been collected from an application.

9. The method according to claim 1, wherein the user preference data comprises user feedback data.

10. The method according to claim 1, wherein the QoE estimator model has been trained to generate estimated QoE data from QoS data.

11. A system for improving remote collaboration, the system comprising:
    a processor; and
    a non-transitory computer-readable medium comprising instructions that, when executed by the processor, cause steps to be performed, the steps comprising:

receiving QoE data from at least one of a user or an application;

receiving data comprising user preference data and at least one of operational data or performance data;

providing the data to a quality of experience (QoE) estimator model to obtain estimated QoE data;

using the estimated QoE data and the data to determine a correlation between the data and QoE data; and using the correlation to adjust at least one of network or application parameters to improve at least one of a network performance or a QoE performance.

12. The system according to claim 11, wherein the data has been collected by at least one of a software agent or a server.

13. The system according to claim 12, wherein the collected data comprises quality of service (QoS) data.

14. The system according to claim 13, wherein the QoS data has been collected by using a real-time control protocol.

15. The system according to claim 13, wherein the server analyzes the collected data to obtain analyzed data and uses the analyzed data to control one or more network parameters.

16. The system according to claim 15, wherein controlling the one or more network parameters comprises prioritizing one of an application or a device.

17. The system according to claim 12, wherein the data comprises feedback data that has been collected by the software agent or the server.

18. The system according to claim 17, wherein the feedback data has been collected from an application.

19. The method according to claim 11, wherein the QoE estimator model has been trained to generate estimated QoE data from QoS data.

* * * * *